United States Patent [19]

Dockal

[11] 4,377,853
[45] Mar. 22, 1983

[54] PERIPHERAL CONTROLLER WITH SEGMENTED MEMORY BUFFER FOR INTERFACING 80 COLUMN CARD READER WITH HOST COMPUTER

[75] Inventor: Ronald J. Dockal, San Clemente, Calif.

[73] Assignee: Burroughs Corporation, Detroit, Mich.

[21] Appl. No.: 185,489

[22] Filed: Sep. 9, 1980

[51] Int. Cl.³ ........................... G06F 3/00; G06F 5/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,868,648 | 2/1975 | Levin | 364/900 |
| 4,074,352 | 2/1978 | Cook et al. | 364/200 |
| 4,106,092 | 8/1978 | Millers | 364/200 |
| 4,135,241 | 1/1979 | Stanis et al. | 364/200 |
| 4,162,520 | 7/1979 | Cook et al. | 364/200 |
| 4,189,769 | 2/1980 | Cook et al. | 364/200 |
| 4,327,408 | 4/1982 | Frissell et al. | 364/200 |
| 4,334,287 | 6/1982 | Wiedenman | 364/900 |

OTHER PUBLICATIONS

A. Ralston, Encyclopedia of Computer Science, 1976, Litton Educational Publishing Co., Inc., p. 672.

Primary Examiner—James D. Thomas
Assistant Examiner—Archie E. Williams, Jr.
Attorney, Agent, or Firm—Alfred W. Kozak; Nathan Cass; Kevin R. Peterson

[57] ABSTRACT

In a peripheral controller for a card reader in an I/O subsystem, there is provided a buffer memory for storing, in separate dedicated portions, raw data from the card reader and translated data processed by a translator circuit means. Multiplexer means provide for the receipt and storage in memory of raw card data and/or receipt and storage of translated data which has been processed into selected formats for later transmittal to a main host system. A shift register translator, operating under commands from said host system, operates to take raw card data from said buffer-memory, and to format it into a desired word structure for re-storage in said buffer memory. The multiplexer means and a data register can then select the formatted data for transmittal to the main host system.

11 Claims, 16 Drawing Figures

DLP MODULE ASSEMBLY

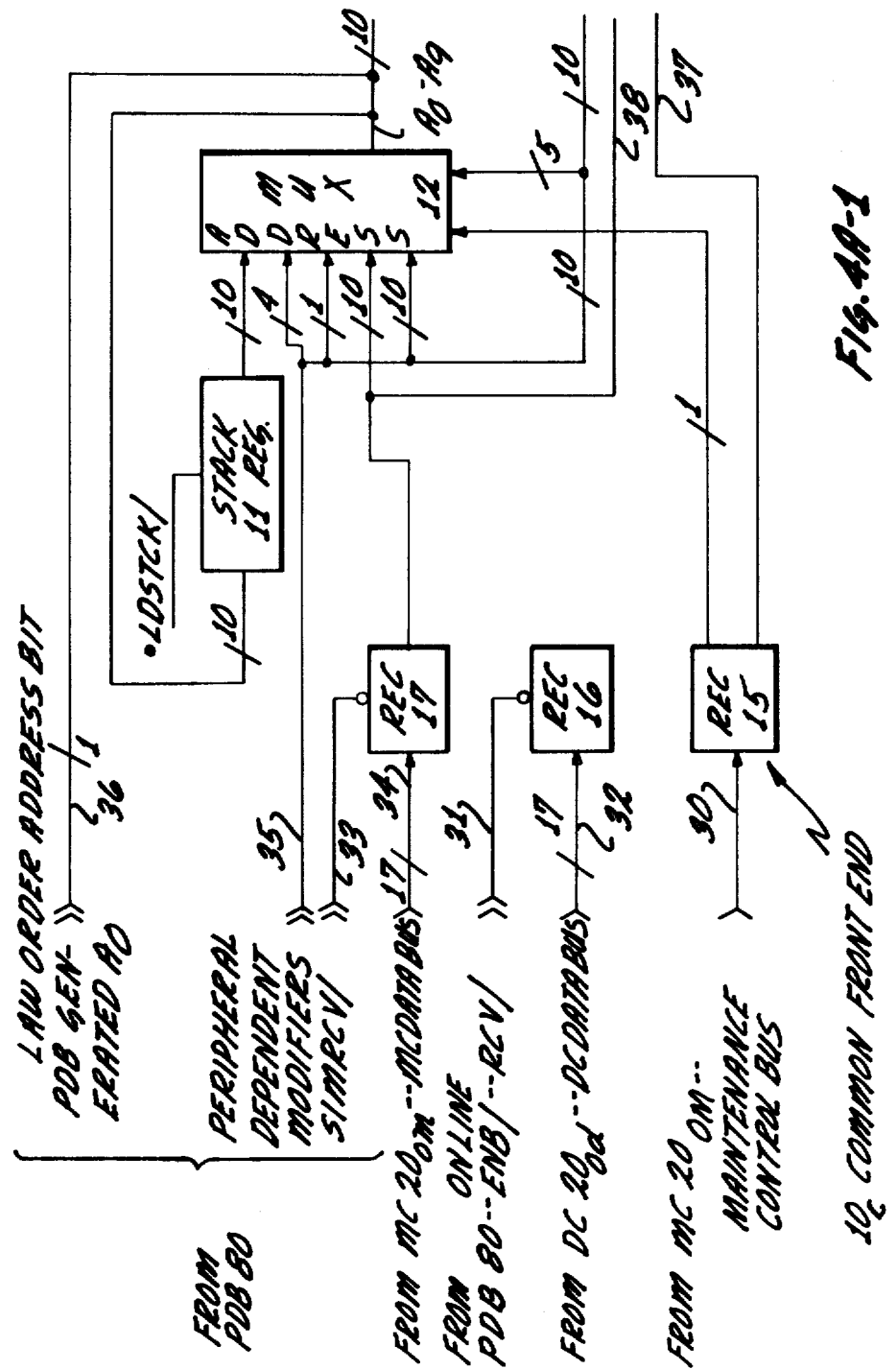

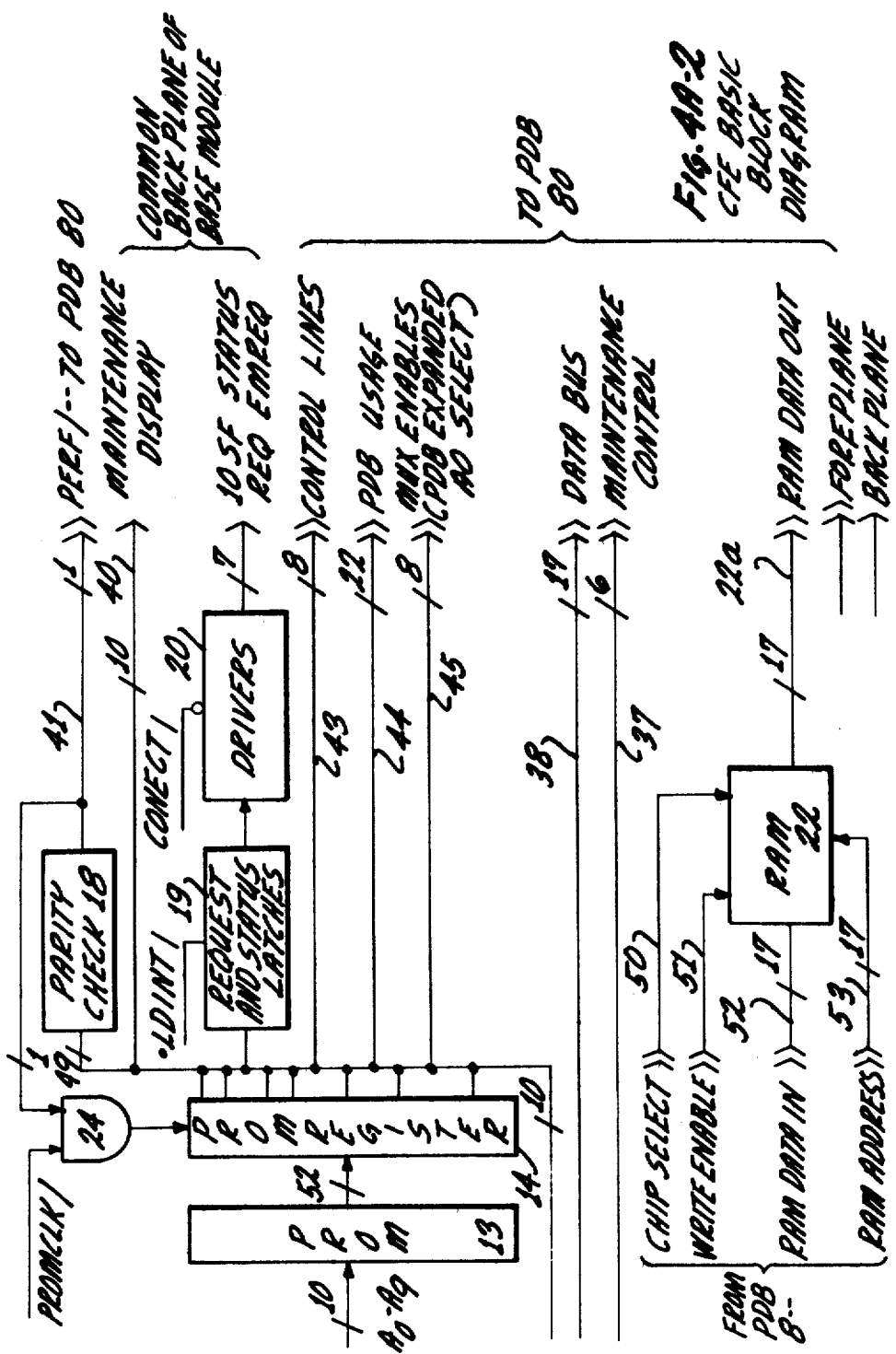
FIG. 4A-2 CFE BASIC BLOCK DIAGRAM

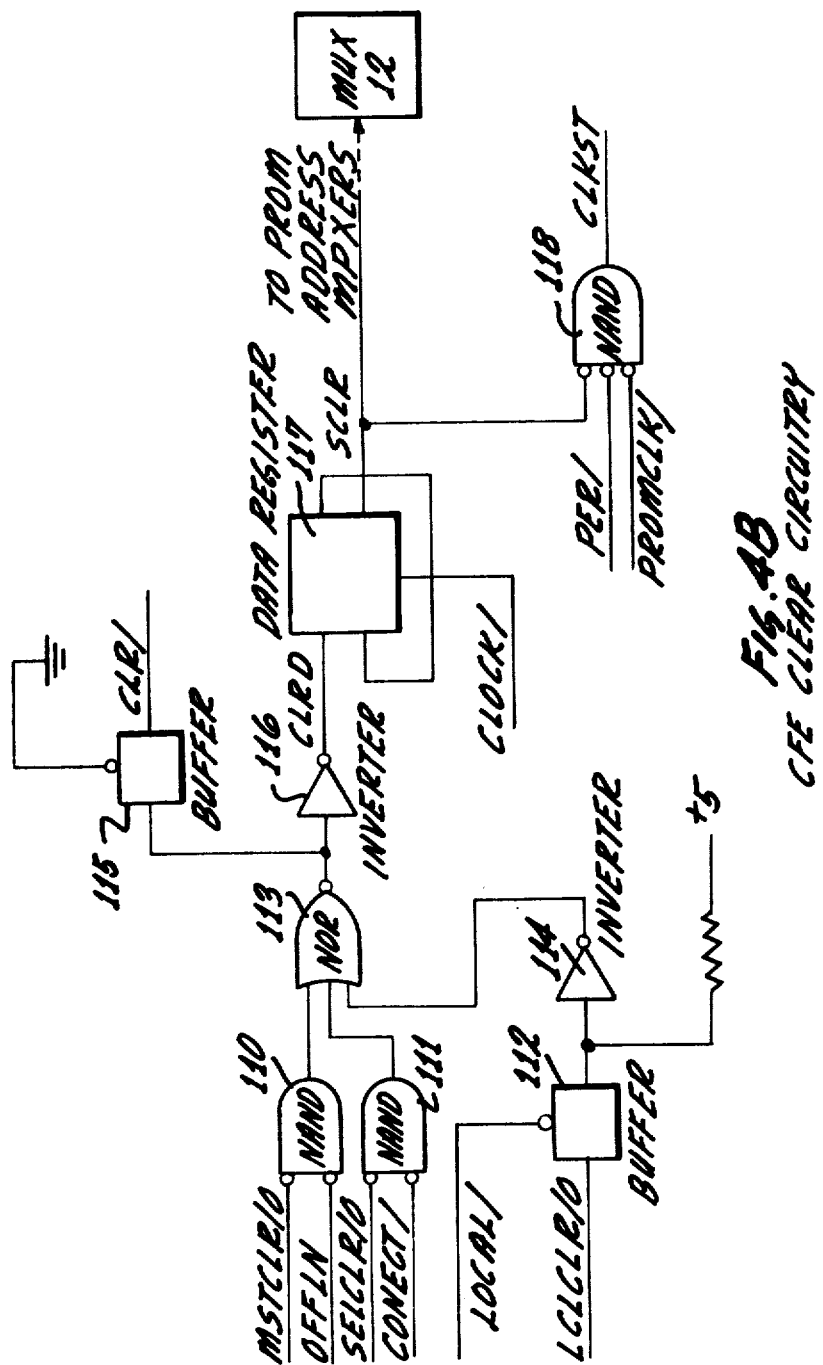
Fig. 4B CFE CLEAR CIRCUITRY

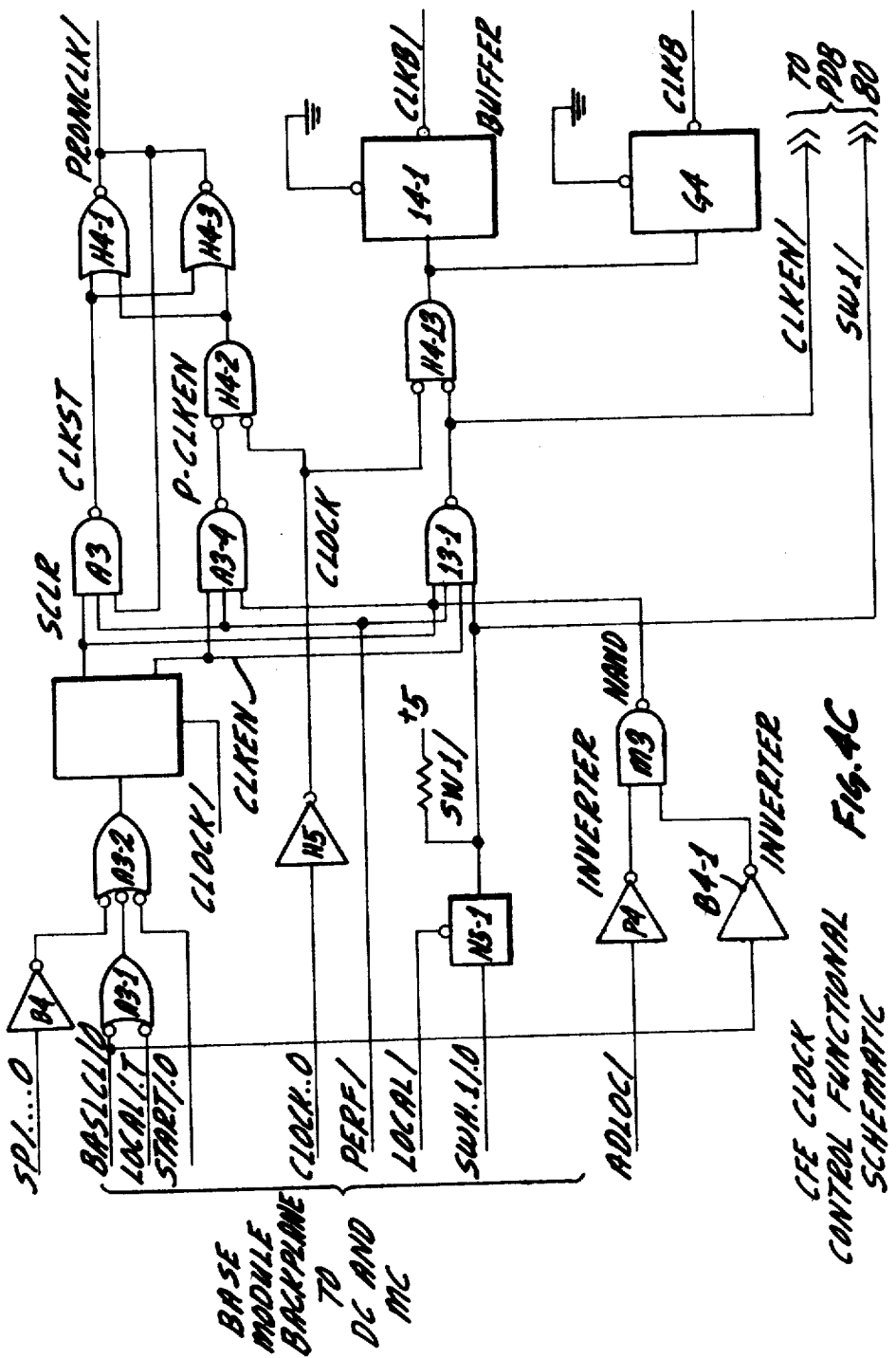

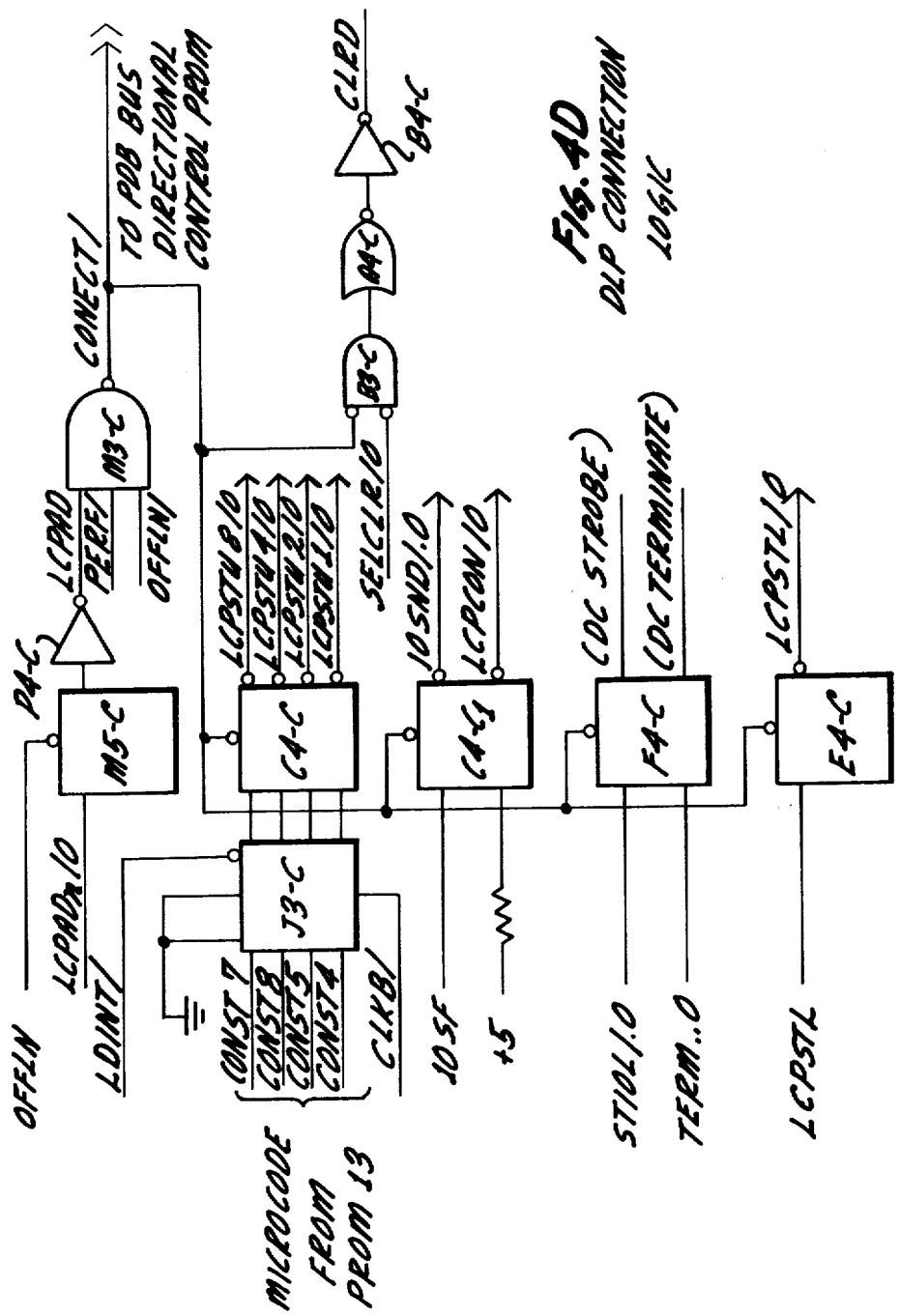
Fig. 4D DLP CONNECTION LOGIC

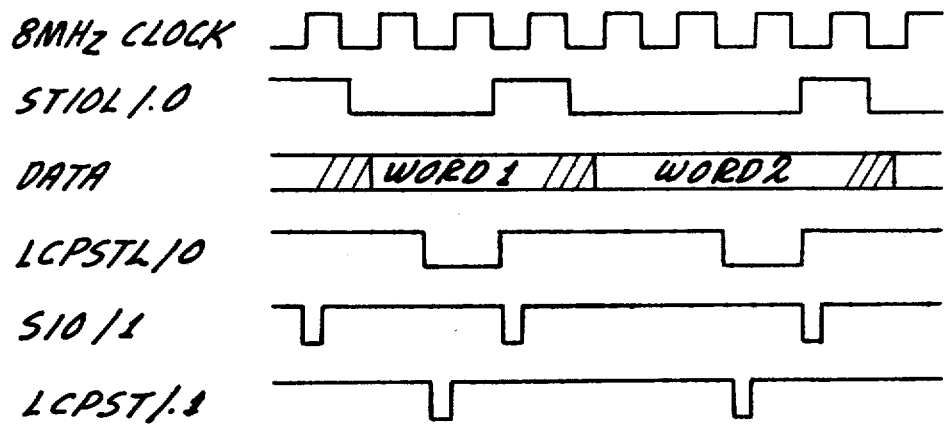
FIG. 4E TRANSFER TIMING DIAGRAM DISTRIBUTION CARD-DLP INTERFACE
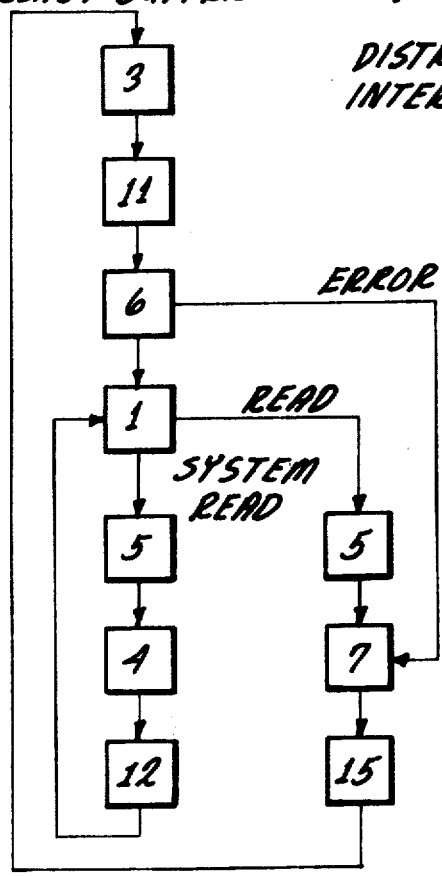
FIG. 8 READ BUFFER

FIG.4F

CARD READER-DLP
RAM BUFFER MEMORY (22)

| ADDRESS (DECIMAL) | PARITY | BOTTOM CHARACTER | | | | | | | | TOP CHARACTER | | | | | | | | |
|---|---|---|---|---|---|---|---|---|---|---|---|---|---|---|---|---|---|---|
| | | D1 | D2 | D4 | D8 | C1 | C2 | C4 | C8 | B1 | B2 | B4 | B8 | A1 | A2 | A4 | A8 | |
| 0 | | SCRATCH PAD | | | | | | | | VERTL PARTY FOR R/D ID LPW | | | | | | | | |
| | | | | | | | | | | | | | | | | | | |
| | | STORAGE OF TRANSLATED DATA | | | | | | | | | | | | | | | | LOWER RAM |
| 80 | | | | | | | | | | | | | | | | | | |
| | | | | | | | | | | | | | | | | | | |
| 127 | | | | | | | | | | | | | | | | | | |
| | | STORAGE OF UNTRANSLATED DATA | | | | | | | | | | | | | | | | UPPER RAM |
| 206 | | | | | | | | | | | | | | | | | | |
| | | | | | | | | | | | | | | | | | | |
| 250 | | ID WORD | | | | | | | | | | | | | | | | |
| 251 | | LAST TRANSLATED OP | | | | | | | | | | | | | | | | |
| 252 | | PRESENT OP | | | | | | | | | | | | | | | | |
| 253 | | DESCRIPTOR LINK | | | | | | | | | | | | | | | | |
| 254 | | DESCRIPTOR LINK | | | | | | | | | | | | | | | | |
| 255 | | DESCRIPTOR LINK | | | | | | | | | | | | | | | | |

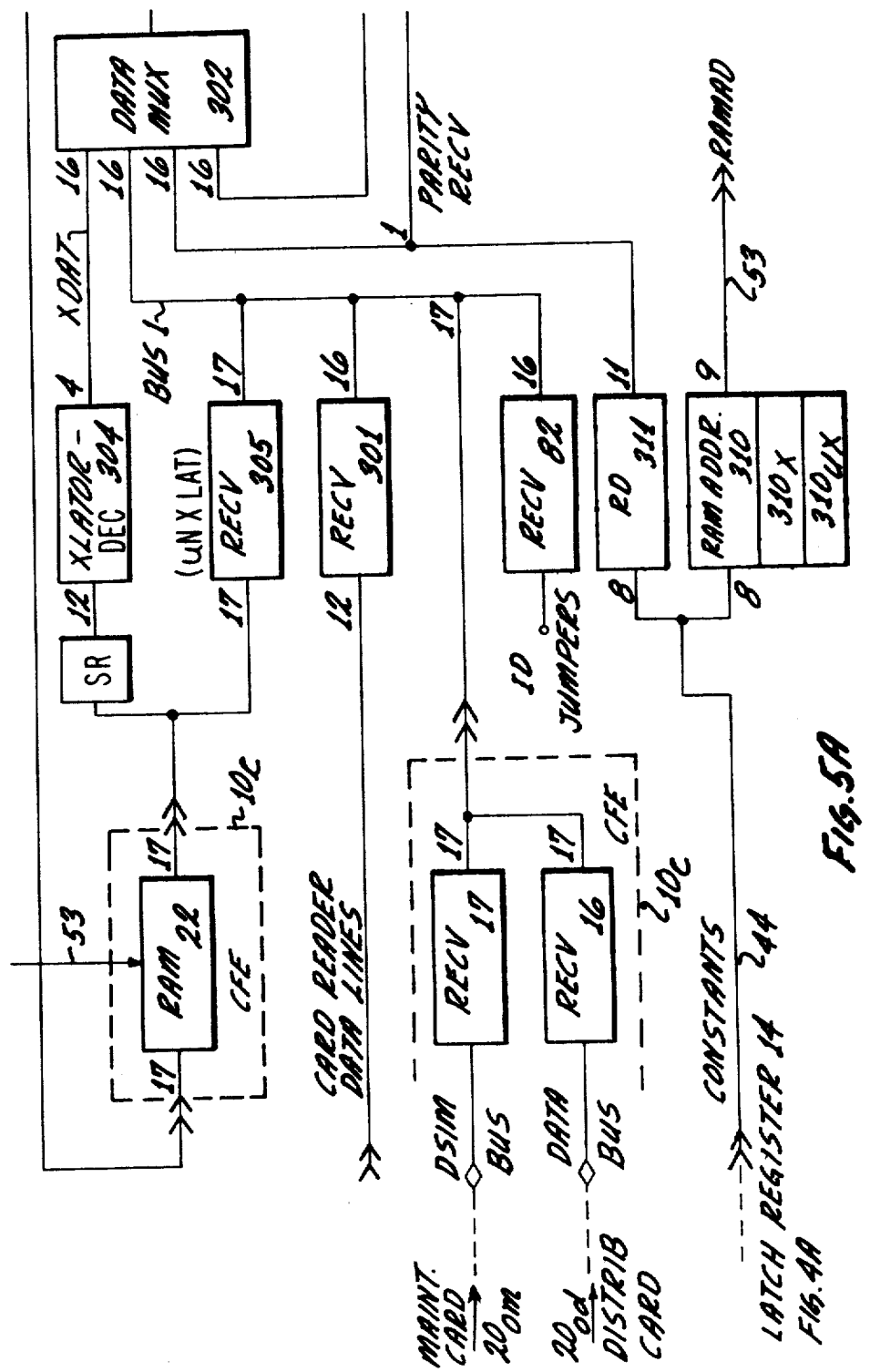

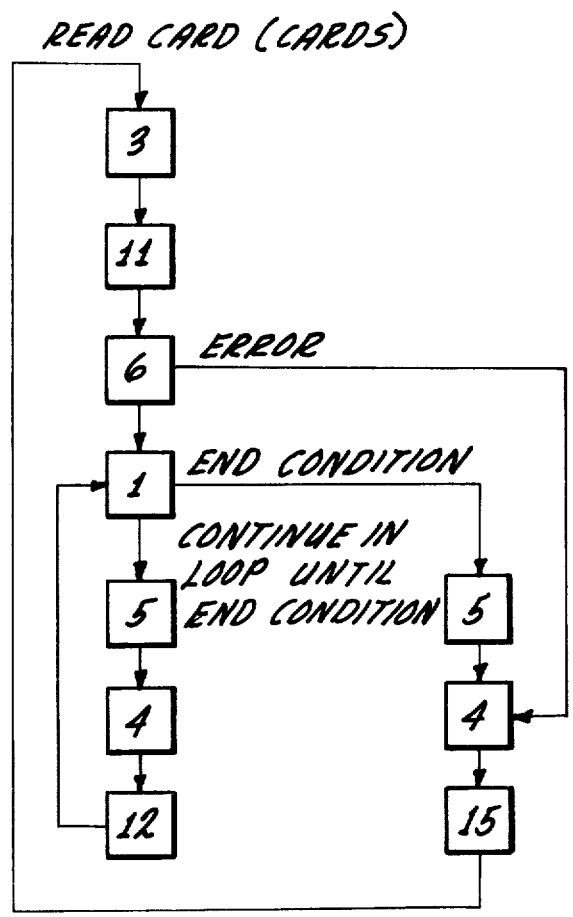
Fig. 7 READ CARD(S)

PERIPHERAL CONTROLLER WITH SEGMENTED MEMORY BUFFER FOR INTERFACING 80 COLUMN CARD READER WITH HOST COMPUTER

FIELD OF THE INVENTION

This disclosure relates to the field of devices called peripheral-controllers and specialized format-control circuitry therein, and is specifically applicable to a Data Link Processor used as an I/O Controller for a host computer in order to operate a peripheral unit known as a Card Reader Mechanism.

CROSS REFERENCES TO RELATED APPLICATIONS AND PATENTS

The following cases which involve the use of an input-output subsystem connecting a main host computer and various peripheral units are included herein by reference:

U.S. Pat. No. 4,162,520 entitled "Intelligent Input-Output Interface Control for Input-Output Subsystem", inventors Darwen Cook and Donald Millers, II. The case described the peripheral-controller known as a Line Control Processor which controlled and handled data transfers between a given peripheral terminal unit and the main host system.

U.S. Pat. No. 4,074,352 entitled "Modular Block Unit for I/O Subsystem", inventors Darwen Cook and Donald Millers, II. This case described a base module unit which housed and supported a group of eight peripheral-controllers and interfaced them to a main host computer system.

U.S. Pat. No. 4,106,092, entitled "Interface System Providing Interfaces to Central Processing Unit and Modular Processor-Controllers for I/O Subsystem", inventor Donald Millers, II. This patent described a unit in the main host system, designated as an I/O translator or "IOT", which controls and regulates data transfer between the main host system and a plurality of base modules and their peripheral-controllers.

U.S. Pat. No. 4,189,769, entitled "Input/Output Subsystem for Digital Data Processor System", inventors Darwen Cook and Donald Millers, II. This case describes a subsystem wherein a plurality of peripheral-controllers are organized in base modules for data communications with a main host system. The peripheral-controllers and the base module form an input-output subsystem for controlling data transfers to/from a large number of peripheral units to the main host computer system.

A patent application U.S. Ser. No. 103,451, now U.S. Pat. No. 4,322,792, entitled "Common Front End Control for Peripheral Controller", filed Dec. 14, 1979, inventor Kenneth Baun.

A patent application U.S. Ser. No. 103,739, now U.S. Pat. No. 4,313,162, entitled "I/O Subsystem Using Data Link Processors", filed Dec. 14, 1979, inventors Kenneth Baun and Donald Millers, II.

The above issued patents form a foundation and background for the present application and are included by reference into this specification.

Other related patent applications include:

Card Reader-Data Link Processor, Ser. No. 185,430, filed Sept. 9, 1980, inventor Ronald J. Dockal.

Input/Output Subsystem Using Card Reader-Peripheral Controller, Ser. No. 185,422, filed Sept. 9, 1980, inventors Jeffrey Horky and Ronald J. Dockal.

SUMMARY OF THE INVENTION

The basic functions of a data link processor (or intelligent I/O interface control unit as it was previously called in the cited patents) is to provide the specific processing and control functions for data transfers between a specific peripheral and a main host computer system.

There has newly been developed an improved peripheral controller (data link processor) which, instead of being individually designed and oriented for one particular type of peripheral, now has isolated certain common function elements for all types of peripheral-controllers to form a data link processor of improved capability. The common-to-all unit is designated as the Common Front End (CFE) which forms a basic part of the data link processor. This Common Front End, when used in conjunction with a Peripheral Dependent Logic Board (PDB) (which adapts the data link processor to a particular peripheral unit) is known as a Common I/O data link processor.

Described herein is a card reader-peripheral controller (for controlling readout from a Card Reader Mechanism) which provides circuit means, for storage of raw data and translated data, working in conjunction with a shift-register translator which can be commanded by a main host computer to process raw data from the card reader into specially designated formats for later transmittal to the main host system. The peripheral-controller is designated as a Card Reader-Data Link Processor (CR-DLP) to denote its function of storing and returning data-link words for each task commanded by the host system. The circuit means provides for receiving data from data cards for storage in a first dedicated portion (upper RAM) of a buffer-memory. This raw data can then be processed by a shift register translator into 16 bit words of either unpacked or packed format, or else translated into EBCDIC format for storage in a second dedicated portion of buffer-memory (lower RAM) for subsequent transmittal to the main host system through a distribution-control-circuit and message level interface bus. A data multiplexer and data register select raw data for entry into the buffer memory, and select translated data for transmittal to the main host system.

The line control processor (peripheral-controller) in U.S. Pat. No. 4,162,520 was described as an input-output interface data transfer control unit. While many of the general overall operating functions remain the same in regard to following the commands of I/O descriptors from the main system and the returning of Result Descriptors to the main system, the improved peripheral-controller now designated as the "data link processor" (DLP) provides a PROM with micro-code words for use of the required control functions rather than the complexities of processor logic and plurality of multiplexers used in the peripheral-controller line control processor described in U.S. Pat. No. 4,162,520.

BRIEF DESCRIPTION OF THE DRAWINGS

FIGS. 4A-1 and 4A-2 are a circuit diagram of the Common Front End (CFE) card of the data link processor; FIG. 4B is a circuit of the Common Front End clear circuitry; FIG. 4C shows the clock control circuitry for the CFE; FIG. 4D shows the connection logic circuitry of the Common Front End; FIG. 4E is a timing diagram showing how data transfers are effectuated during certain clock periods; FIG. 4F shows the organization of the RAM buffer memory.

FIGS. 5A and 5B are a block diagram of the Peripheral Dependent Board, PDB 80, showing its relationship to the Common Front End Card, CFE $10_c$.

FIG. 7 shows the status count signals for a Read Card(s) operation as explained by Table XVII.

FIG. 8 shows the status count signals for a Read Memory Buffer operation as explained by Table XVII.

OVERALL SYSTEM DESCRIPTION

Figure 1:
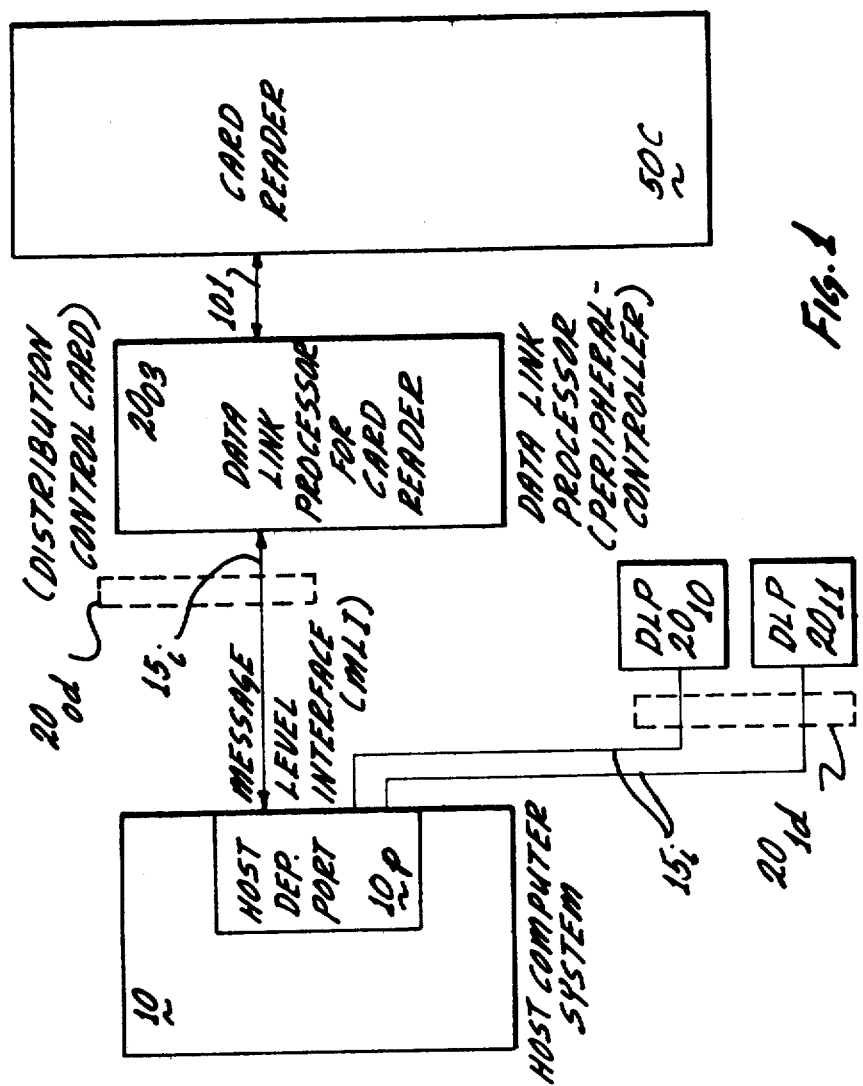
FIG. 1 is an overall system diagram showing the relationship of the data link processor to the main host system and the peripheral terminal unit, designated as the Card Reader.

The overall environment or system configuration in which a data link processor, such as a Card Reader-Data Link Processor (CR-DLP) operates, is shown in FIG. 1. The main host computer system 10 having a host dependent port $10_p$, connects message level interface buses $15_i$ to specialized peripheral-controllers such as data link processor (DLP) $20_{10}$ and $20_{11}$ through a distribution control card $20_{1d}$. Likewise, the message level interface $15_i$ connects to a distribution control card (DC) $20_{0d}$, which supports a plurality of other data link processors, such as the Card Reader-DLP, $20_{03}$, FIG. 1.

In the particularly preferred system embodiment for the Card Reader-Data Link Processor, the DLP $20_{03}$ (FIG. 1) is connected by bus 101 to a Card Reader mechanism (peripheral) such as is described at page 672 in the Encyclopedia of Computer Science, A. Ralston, Copyright 1976 by Litton Educational Publishing, Inc., Van Nostrand Reinhold Co., New York, N.Y.

Figure 2:
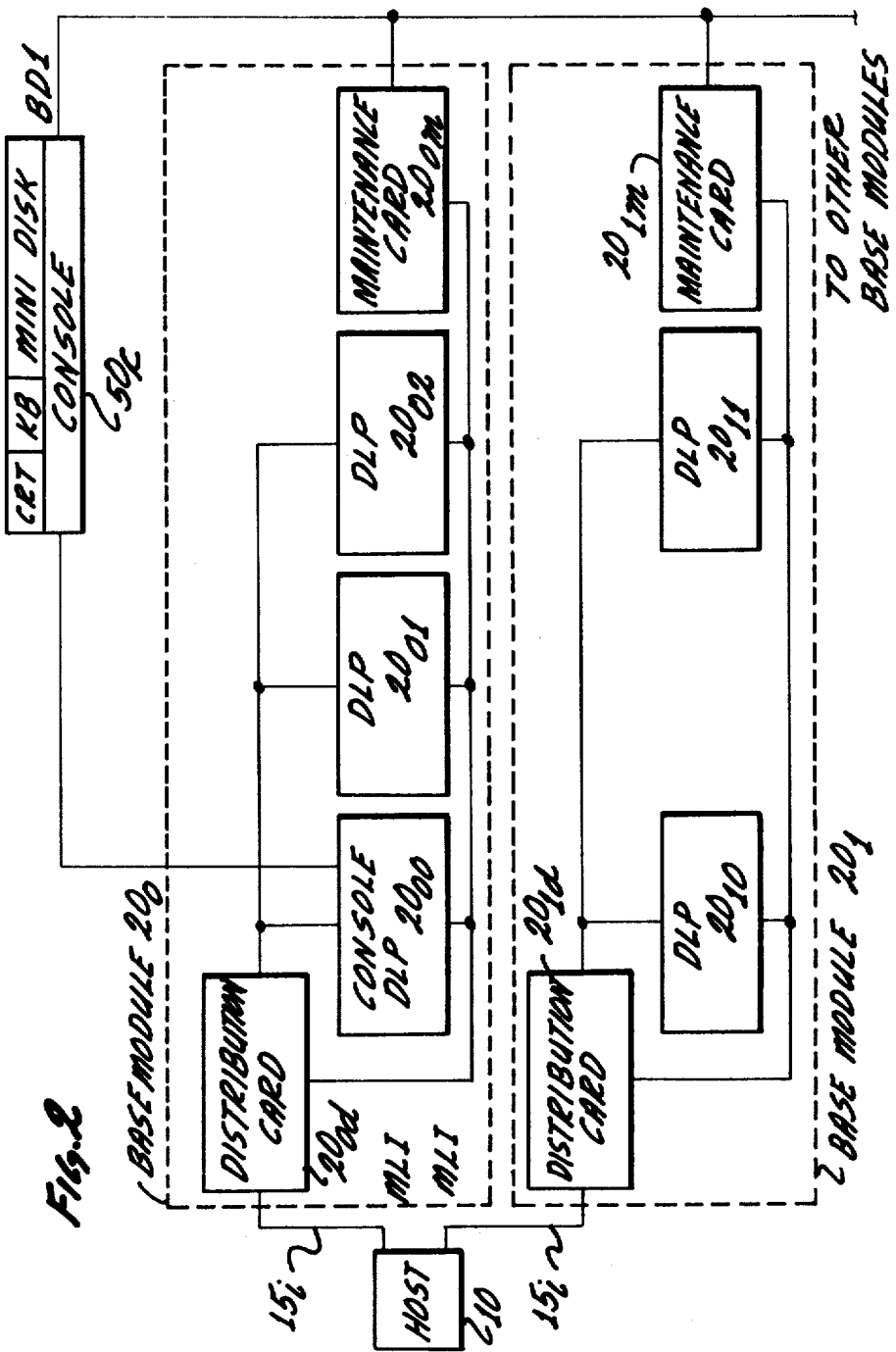
FIG. 2 is a block diagram of a plurality of typical base modules which house and support a plurality of data link processors.

FIG. 2 shows a more generalized situation in which a host computer 10 is connected by a message level interface $15_i$ to two base modules $20_0$ and $20_1$. Each of these base modules has its own respective distribution cards (DC) respectively designated $20_{0d}$ and $20_{1d}$.

Each base module supports a plurality of data link processors (peripheral-controllers). For example, base module $20_0$ may have a console data link processor $20_{00}$ which controls a console unit $50_c$. Likewise, data link processors $20_{01}$, $20_{02}$ may respectively handle the control of and data communication transfers between items such as a train printer, card punch or other peripheral units. Each particular data link processor is specifically oriented for serving the requirements of each type of peripheral unit.

Likewise, base module $20_1$ has its own distribution card (DC) $20_{1d}$ which can connect to data link processors such as $20_{10}$, $20_{11}$, each of which data link processors is specifically tailored to handle the data transfer and control operations for a particular type of peripheral terminal unit. Each base module will be seen to have its own maintenance card unit ($20_{0m}$ for base module $20_0$ and maintenance card $20_{1m}$ for base module $20_1$).

The maintenance card provides diagnostic and maintenance operations for the data link processors of a given base module.

As previously described in U.S. Pat. Nos. 4,106,092 and 4,162,520, each base module has a series of backplane connectors and grooved slides whereby a large number of printed circuit-component cards may be inserted and slid-in for connection to the backplane of the base module. Thus, the distribution card $20_{0d}$, the maintenance card $20_{0m}$ and other printed circuit cards which constitute the peripheral-controllers or other function cards, may be inserted and connected into the common backplane of the base module.

Figure 3:
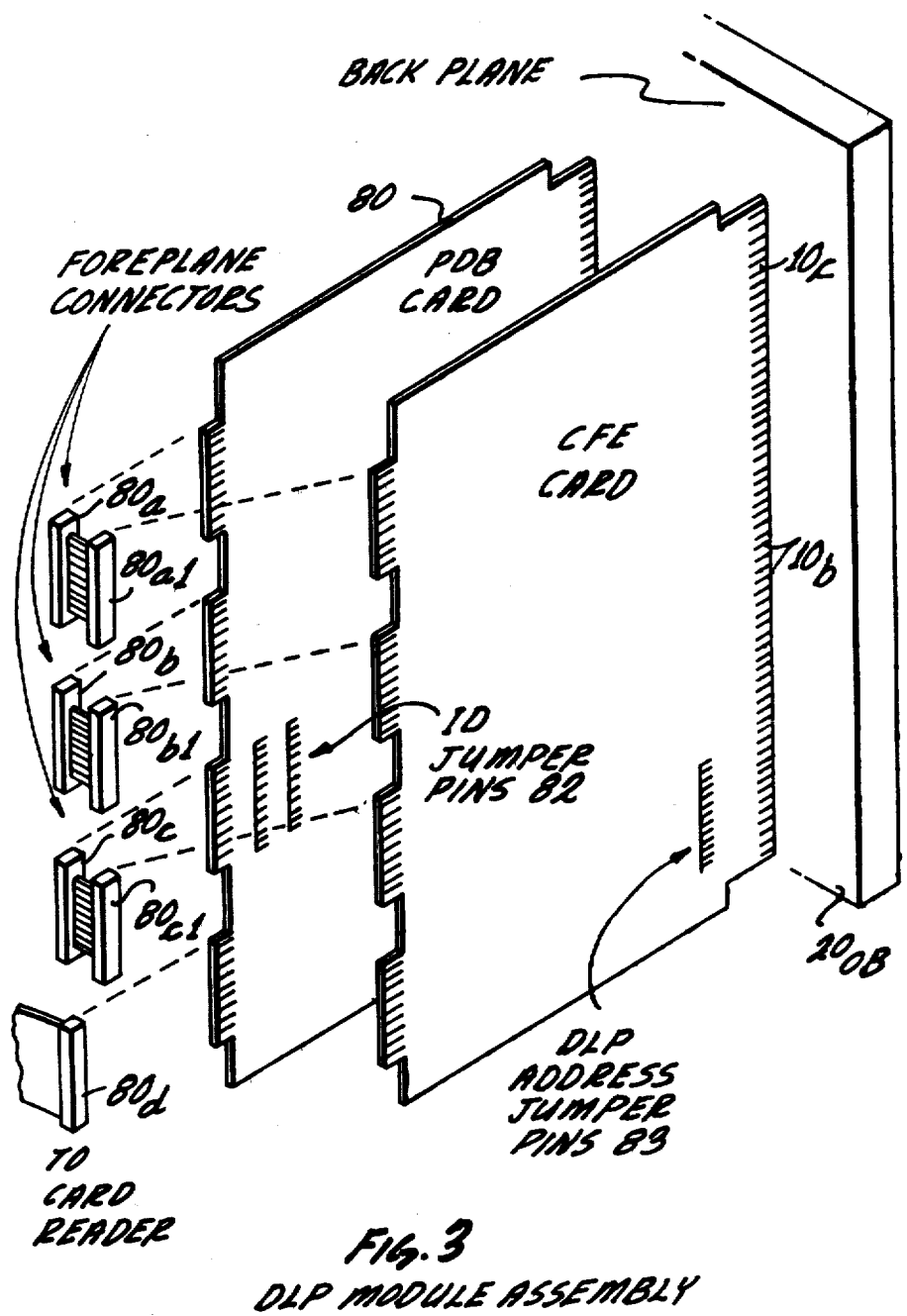
FIG. 3 is a schematic drawing of the printed circuit cards which make up the data link processor.

FIG. 3 is a schematic illustration of how a specific data link processor (peripheral-controller) may be physically structured with slide-in printed circuit cards. Thus, a Common Front End card $10_c$ is seen having a series of backplane connections $10_b$, for connection to the motherboard of the base module, and having frontplane or foreplane connectors $80_{a1}$, $80_{b1}$, $80_{c1}$, and DLP address jumper pins 83 which are used to set the specific address of the particular data link processor (DLP) involved.

Connected to the CFE card $10_c$ by means of the foreplane connectors is the Peripheral Dependent Board (PDB) card 80. This card has foreplane connectors $80_a$, $80_b$, $80_c$, which connect to its associated Common Front End (CFE) card $10_c$. The Peripheral Dependent Board 80 also has a foreplane connector $80_d$ for connection to the Card Reader Peripheral unit. The PDB card 80 has jumper pins 82 for identification (ID) whereby an encoded identification signal for the particular Data Link Processor can be effectuated.

Thus, the specialized data link processor (peripheral controller) as $20_{03}$ (FIG. 1) can be seen to comprise two slide-in cards, one of which, the Common Front End card $10_c$, is common to all types of peripheral controllers, while the Peripheral Dependent Board, PDB card 80, is a specialized card providing the circuitry functions required for the control, handling and specialized protocols particularly required for a specific type of peripheral unit.

As previously discussed in U.S. Pat. Nos. 4,162,520 and 4,106,092, use was made of an input/output subsystem operating between a main host computer and one or more peripheral devices. The input/output subsystem used a plurality of base module cabinets, each of which supported a group of base modules. The base modules consisted of up to eight "Line Control Processors" (peripheral-controllers) which were designated as intelligent input/output processing units which controlled data transfers between any specific peripheral device and the main host system. Since these Line Control Processors (LCP) provided an identification code or "data link" for each task assigned by the main host system, these Line Control Processors came, in subsequent design, to be known as Data Link Processors (DLP) and henceforth will be referred to by the term of Data Link Processors.

The data link processor I/O subsystem interfaces a variety of peripheral (I/O) devices with one, or more than one, host system. This setup simplifies the I/O device maintainability by allowing maintenance of the I/O subsystem to be performed without being specifically tailored to the vagaries of main host systems. The data link processor subsystem is distinguished by its adaptability to any host computer system having the MLI (message level interface) capabilities described in U.S. Pat. Nos. 4,162,520 and 4,106,092.

The data link processor I/O subsystem can be utilized by host systems having totally different internal characteristics, for example, the same I/O subsystem may be shared by any combination of different Burroughs B 900 systems, as the B 2900, B 3900, B 4900 and the B 6900 system.

The message level interface is a connected line discipline by which the host system or host systems communicate with the I/O subsystem. In the preferred embodiment of the latest configuration, each of the host systems utilizes a unit called a Host Dependent Port (HDP) to achieve the message level communication.

The peripheral devices which are attached to and operate with a data link processor I/O subsystem operate in a semi-autonomous environment, that is, a host system must initiate a peripheral device to perform an operation, by sending the data link processor an I/O descriptor. After the DLP is initiated, it (DLP) performs the operation (OP) independently of the host system. At the conclusion of the operation, the DLP reconnects back to the host system which initiated the operation and returns information called a "result descriptor" (R/D). During this operation, the DLP can "reconnect" to the host system to transfer data via the data link processor.

The ability of a DLP to disconnect from a host system and proceed with an I/O transfer operation frees the host system to perform other operations during the time that an I/O transfer operation is in progress within the data link processor subsystem.

The ability to reconnect to a host system requires the data link processor to contain a "linking mechanism" to re-establish the communication path between the peripheral device and the host system that initiated that peripheral device. The logic circuit that provides for this reconnection is contained in the data link processor. Alternatively the logic circuit that provides for this connection and reconnection may be contained in a system controller (SC) or a unit such as the IOT (input-/output translator unit, described in the aforementioned U.S. Patents). Every peripheral device that is connected to the DLP I/O subsystem uses one of this type of "connection-reconnection" control devices.

The message level interface that connects the host system to a DLP I/O subsystem is capable of conducting all communication between the host system and the peripheral subsystem including connection, reconnection and disconnection.

Two types of communications are made use of between the host system and the I/O subsystem. These are (a) "control" communications done by control levels and (b) "data transferring" communications. In both types of communication information (either control levels or data) pass between the host system and the peripheral subsystem.

When information passes from the main host system to the DLP I/O subsystem, the operation is described as a "Write" operation. When information is passed from the I/O subsystem to the main host system, the operation is described as a "Read" operation. For example, when a peripheral device requests to be reconnected to the main host system or to another available main host system, the communication starts in the I/O subsystem with information passed on to the host system and is, therefore, a "Read" type of operation. When a host system initiates a peripheral device and the communication starts from the host system with information being passed from the host system to the peripheral, this is called a "Write" type of operation.

Those peripheral devices of the "input" type, such as a Card Reader, will produce only "Read" data for the host system. Those peripheral devices of the "output" type will only receive data from the host system, i.e., a "Write data" operation. Thus, input or output peripheral units require either a "Read data" or a "Write data" operation. Read data and Write data are not the same thing as "read or write" operations because "read or write" only describes the direction of the flow of information on the message level interface. A read function performed by an input peripheral device requires a "Write" operation to initiate the peripheral device first, followed by a "Read" operation to pass the data to the host system.

As described in U.S. Pat. No. 4,074,352, the LCP base module is the basic building block for an input-output subsystem. In the case where a universally "Common Front End" card is used in each data link processor (DLP), the subsystem can be designated as the "Universal I/O Subsystem". The DLP base module consists of a backplane which connects slide-in cards, any two of which form a DLP. A base module consists of one to six Distribution Cards (DC) for communication to/from the system and houses from one to eight data link processors (DLP's), each of which handles data communications to/from a specific peripheral terminal unit. Each base module also includes one Maintenance Card (MC), two termination boards and space for additional cards for specialized purposes, but which are not essential to a normal operating situation.

Each data link processor (DLP) consists of a Common Front End card (CFE) and peripheral dependent logic which is located on a separate circuit board known as the Peripheral Dependent Board (PDB). Read only memories designated as PROMs located on the Common Front End card contain micro-code words which are the only elements dependent on the type of peripheral device used, the remainder of the elements being standard independent components. The Common Front End card and the Peripheral Dependent Board communicate to each other via three 50-pin frontplane connectors seen in FIG. 3.

The data link processor ($20_{03}$, FIG. 1) contains the hardware required to interface the host dependent port $10_p$ of the main host system 10 with a plurality of peripheral devices 53. The hardware of the subsystem consists of a base module as $20_0$, FIG. 2, which include the following:

1. A control console ($50_c$, FIG. 2).
2. The message level interface cabling (MLI), $15_i$.
3. The base backplane $20_{0B}$ for the data link processors, FIG. 3.
4. The base modules which fit into the cabinet and connect to the base backplane.
5. The data link processors (DLP) which are typically organized such that 8 data link processors are supported by each of the base modules (FIG. 2).

As described in the heretofore mentioned patents, the base modules were fitted with one or more Distribution Cards (DC) depending on the number of host systems which could be connected to that base module, plus 2 termination cards and a Maintenance Card (MC).

As described in the afore-cited patents, the "poll test" is defined as the procedure used by a host system and its host dependent port to establish communication with a DLP subsystem. The host system initiates a connection to a data link processor by performing a "poll test" sequence. The result of this sequence is as follows:
1. A connection is made from the host system to the data link processor that also includes the status condition of the addressed data link processor.
2. A signal indication that a particular data link processor is "not active" in that particular DLP address, that is, the DLP is not physically present, or it has been taken off-line by the Maintenance Card, or it is unavailable because of a PROM parity error.
3. A signal indication that another Distribution Card (DC) is actively engaged in the particular base module and thus a path to the requested DLP is not available at this time.
4. A signal indication that the address word requesting connection to a DLP did not carry the proper parity.

To begin a "poll test", the host system 10 sends a Channel Select to the particular base module that it has selected to be connected. The Channel Select signal provides an indication to the Distribution Card (DC) that it has been selected for a poll test. The host system sends the address of the DLP on data lines D-8 (MSB, most significant bit) through D-1 (LSB, least significant bit).

A LEM (line expansion module) card can be connected to a base module to enable 16 DLPs to be connected to a single MLI 15ᵢ. A BCC (base control card) can be used to provide identity signals for a base module.

If a line expansion module (LEM) is in use, the host system sends the Distribution Card the address of the requested base module on data lines C-8 (MSB) through C-1 (LSB). If a base control card (BCC) is to be addressed, then bit A-8 is used. The host dependent port (HDP) then sends Address Select to all of its base modules. This causes the Distribution Cards that receive the Channel Select to begin a poll test, and signifies to all other Distribution Cards that the host system interface is busy. This busy indication is needed by non-connected Distribution Cards to resolve Distribution Card priority in handling DLP requests for connection in situations where there is a multiple Distribution Card base environment.

The Distribution Card (DC), which is selected by the Channel Select and the Address Select signal, acknowledges by returning a DLP strobe signal back to the host system 10. If another Distribution Card is actively engaged on the base module backplane, or a Distribution Card of higher priority is also taking a poll test connection, then a "port busy" indication accompanies the acknowledge signal. If the vertical parity carried on the address is incorrect, a parity error indication accompanies the acknowledged signal. If the base module is available for connection and the address parity is correct, then the host system receives only the acknowledge signal. The Distribution Card addresses and connects to the addressed DLP.

The Distribution Card connects with the selected DLP by decoding the DLP address and driving one of eight address lines. The DLP specified by the address line has the address receiver jumpered to the correct address line. The DLP receiving this address sends a DLP connected signal (LCPCON) back to the host system to indicate its presence.

Upon receiving an "acknowledge" signal, and no indication of a port busy or parity error signal, the host system drops its Channel Select signal. This makes all lines available for connected communication. However, if an exception condition is reported, the host system must disconnect from the DLP.

When the Distribution Card detects the absence of a Channel Select, it sends another acknowledge (strobe signal). If the DLP addressed has responded with LCPCON, the Distribution Card "enables" the DLP's status signal to the host system with this second "acknowledge". With the second acknowledge, the DLP and host system are connected via the Distribution Card. If the selected DLP did not respond (because it was off-line or not installed) the host system receives (together with the acknowledge signal) a DLP status signal of "zero" indicating that the DLP is not available.

If the DLP is unable to handle a poll test at this time (because it is busy) the DLP status indicates this condition. It is the function of the host system to detect and to respond to this condition by "disconnecting" or converting to a poll request. The connection established with this "poll test" remains intact as long as "address select" remains true.

The DLP participation in the poll test-host system connection routine is minimal. The DLP only receives its unique address line and returns LCPCON in acknowledgment and enables the status line. If there are multiple Distribution Cards installed in a base module, then access to the backplane of the base module is achieved by a request granted mechanism in the path selection module (PSM). The PSM also provides for Distribution Card priority resolution.

POLL TEST TO POLL REQUEST CONVERSION: If the host system 10 is performing a poll test, and the initial DLP status indicates that the DLP desires access to the host system for information exchange because of a previous I/O descriptor, the host system has three options:
 (a) Disconnect
 (b) Selectively clear a DLP
 (c) Handle and service the DLP.

If the option (c) is selected, the host system converts to a "poll request". A "poll request" is defined as the procedure used by a data link processor to establish communication with a host system. A "poll request" is the opposite of a "poll test" because the origination of the communication is reversed, that is, with the DLP being the transmitter and the host system being the receiver and responder.

In conjunction with any initial status in the "read" direction (information flow toward the host system) the Distribution Card sends the DLP data toward the host system. If the initial status is "Send descriptor link", this data is the first word of the descriptor link and contains the host return field. The host system must check this field to be certain that it can handle the DLP information transfer. If the host system cannot handle it, the DLP must "disconnect" before sending any host system strobes.

DLP INITIATED CONNECTION (POLL REQUEST): When access is required to the host system and a disconnection has occurred, the DLP re-establishes connection by initiating a "poll request" sequence. Because all DLP's may request connection at the same time, a decision is made on a priority basis. Priority is partitioned into two types—(a) global priority and (b) base module priority. The global priority of a DLP is based on the type of peripheral device which it services. There are six standard levels of global priority for DLPs. The global priority of a particular DLP is assigned with regard to the host system access requirements of the peripheral device, such as speed, stream mode, etc.

An additional and higher level of global priority is provided to designate an emergency request. This is designated as global priority equal to 7. An emergency request is defined as a condition requiring immediate access to the host system in order to avoid difficulty in error receovery or operator action. Global priority is used by the main host system to determine the priority of each requesting Distribution Card. Base module priority is the priority of each DLP within the base. Base module priority is used by the Distribution Card to determine the priority of each requesting DLP.

Base module priority is determined by the DLP number of each DLP in the base module. This number corresponds to the DLP address jumpered on each DLP, for example, the DLP address 7 is equal to DLP number 7 which is equal to the base module priority equal to 7. The established priority levels are arranged such that the highest base module priority is 7 while the lowest is 0. Only one DLP within each base module is assigned to each priority number. Thus, a base module has been organized to contain a maximum of up to 8 DLPs.

To begin a poll request, the DLP raises the "request" level jumpered to one of eight DLP request lines in the DLP, depending upon and equal to the address of the DLP. Upon detecting a DLP request, if the host system is idle, the Distribution Card raises an interrupt request to the host system. When the host system detects "Interrupt Request" it sends "Access Granted" to all the base modules and begins a poll request sequence. Access Granted allows all Distribution Cards that have requests on-line to begin poll requesting. Access Granted also signifies that the message level interface (MLI) is busy to all Distribution Cards that are not requesting.

CONNECTED STATE: In the connected state, the Distribution Card (DC) provides the communication path between the host system and the selected data link processor. All communication between the host system and the base module is asynchronous. This requires that send/acknowledge on the message level interface be pulses rather than levels. The host system send/acknowledge (AG+SIO) and the DLP send/acknowledge (LCPST/) are pulses on the message level interface (MLI).

The base module of the I/O subsystem can support up to eight data link processors which are mounted on slide-in cards which connect to the backplane of the base module. In each base module facilities are provided for slide-in cards which can be installed and which work with the data link processors and the main host system. These cards may be summarized as follows:

DISTRIBUTION CARD (DC): The Distribution Card provides an electrical and functional interface between a given DLP base module and a host system. The circuitry of this card provides host system connection for 1-8 data link processors (DLPs). The routines for establishing a connection between a given DLP and the host system are implemented by logic circuitry contained on the Distribution Card. A connection can be initiated by either the host system or by a data link processor. When the host system initiates the connections, this is designated as "poll test"; when the data link processor initiates connections, these are designated as "poll requests".

All communications between a host system and a base module are asynchronous. The Distribution Card synchronizes this communication. The Distribution Card provides for the capabilities of up to six transfer paths into a base module from one or more host systems. Each separate path into a base module requires a separate Distribution Card. If a multiple configuration is used, then a card known as the PSM or path selection module is required. Once a Distribution Card has provided a connection between the host system and a selected data link processor, the Distribution Card assumes a "connected" state and then becomes practically transparent to communication transfers between the host system and the selected data link processor.

PATH SELECTION MODULE (PSM): The path selection module is a card inserted into the base module and is required when the base module contains two or more Distribution Cards. The path selection module governs access to the base backplane, and it selects and routes the DLP request to a main host system when several host systems are connected in the network. In addition, the PSM also handles Master Clear of all base modules in addition to Selective Clear of selected base modules.

BCML/TTL CONVERTER (BURROUGHS CURRENT MODE LOGIC/TRANSISTOR TYPE LOGIC) CONVERTER: This optional converter card is used to interface a main system host dependent port (HDP) that is using Burroughs current mode logic architecture with the standard transistor type logic format of the data link processor subsystem.

TERMINATION CARDS: Each DLP base standardly requires two termination cards (TC). These cards are designated as numbers 1 and 2 and contain the required transistors and capacitors in order to properly balance and load the base module backplane lines.

MAINTENANCE CARD: Since a single backplane is provided in common for all of the data link processors of a given base module, this permits a large proportion of the DLP maintenance to be centralized. This centralized maintenance circuitry is located on the Maintenance Card that is installed at one end of the DLP base module (opposite from the position of the Distribution Card). The Maintenance Card contains the clock generation circuitry for the entire base module, in addition to other maintenance circuitry, such as circuitry for diagnostic procedures. These diagnostic procedures include the ability to simulate the peripheral interface, to control the clock to the data link processor, and to access the storage elements of the data link processor for comparison with standardly expected results.

As stated, the clock generation logic circuitry of the entire base module is located on the Maintenance Card. Since every card in a given base module receives this signal, the actual signal distribution has been divided into two lines in order to halve the driver requirements. The actual clock is an 8-megahertz, 50% duty cycle positive pulse on the DLP backplane.

DATA LINK PROCESSOR (DLP): A data link processor provides the control logic and the host system interface functions for the associated peripheral units which it services. The DLP logic that controls the peripheral device is device-dependent; therefore, some DLPs contain different hardware and/or different micro-codes. Communication with the main host system is via the message level interface by way of the Distribution Card. Requests for host system access originate from a data link processor. The DLP disconnects from the host system while transferring information to or from the peripheral device it services. A DLP consists of two or more cards (generally 10 by 13 inches each). Each card can contain a maximum of 96 TTL chips arranged in a 6×16 array. The cards plug into adjoining slots in the base module backplane. A data link processor is made up of a Common Front End card (CFE) and one or more Peripheral Dependent Boards (PDB). The CFE and first PDB are connected together by three foreplane connectors, containing 50-pins each (FIG. 3). If more than one PDB is required for a CFE, then the PDB cards are connected to each other by a fourth 50-pin foreplane connector. The CFE card contains the necessary logic to store and execute the micro-code that is dictated by the particular Peripheral Dependent Board being used. Random access memory (RAM) chips and programmable read-only memory (PROM) chips are located on the Common Front End card. The unique logic required by a particular peripheral device is located on the PDB 80 and can vary according to the particular type of peripheral device being serviced. On the other hand, the CFE $10_c$ is a standardized card which provides functions common to all types of Peripheral Dependent Boards and peripheral devices serviced.

The function of the DLP is to interface a particular peripheral device to the main host system. The required communication between the host system and the DLP is standardized in method and content. Every DLP communicates to the main host system using this standard discipline. The DLP makes the peripheral idiosyncrasies from the host system. Thus, the DLP is independent of the host system because of this. The data link processor performs its peripheral-controlling functions in response to information received over its interface to the host system.

Data link processor communication with the host system is accomplished by use of standard DLP "status" states. These status states indicate to the host system the requirements of the DLP (at any given unit of time). Once a connection is established between a data link processor and a host system, all information transfers are performed as indicated by the DLP "status" signal. Thus, the entire communication process is oriented about the DLP and is "DLP status driven". The "status state signals" are common for every type of data link processor. This has been described in detail in U.S. Pat. No. 4,162,520.

Every data link processor contains a message buffer of a size sufficiently applicable to its associated type of peripheral device. Data transmissions between the DLP and the host system operate to and from this message buffer. This eliminates access errors for peripherals having fixed record lengths such as card readers, printers or card punches. Stream mode devices such as tapes and disks contain and utilize two or more buffers to accomplish variable length message transfers.

DLP STATUS FLOW SIGNALS: The DLP status flow is designed to allow orderly message transfers. When it is said that the host system is "DLP status driven", this means that the DLP indicates its requirements to the host system by sending its status state signal. These status states are transmitted continuously by the DLP once it is connected to the host system. The host system examines these status lines at DLP "send-/acknowledge" time. Every DLP implements this common signal flow in a manner designed to provide as much commonality as possible so that each DLP will have a standardized routine. Status states are generated for host system usage only; they are not used logically by the DLP. They are used to make the host system aware of the internal operation routine of the DLP. Thus, this allows the host system to anticipate somewhat the requirements of the DLP.

Figure 6A:
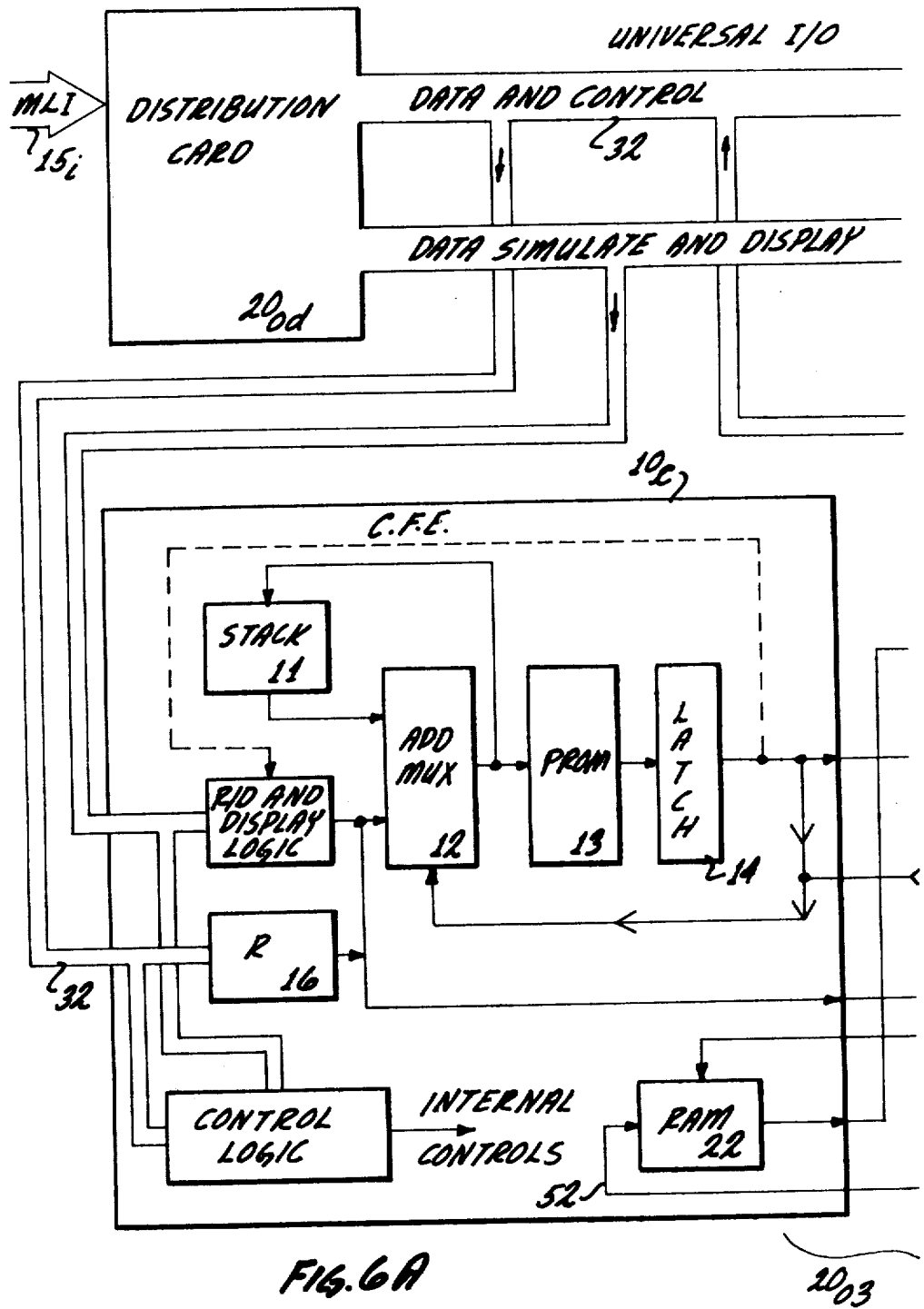
FIGS. 6A and 6B are a diagram of the Card Reader-Data Link Processor showing the two printed circuit cards $10_c$ and 80, and their relationship to the Distribution Card $20_{0d}$ and Maintenance Card $20_{0m}$.

STATUS STATE SIGNALS FOR THE DATA LINK PROCESSOR: As was previously described in U.S. Pat. No. 4,162,520 on column 70 and in connection with FIG. 6A and Table VII of that patent, each condition or situation of the operating routine of the DLP will have a Mnemonic and a "status state count number". In the present system which uses the data link processor and a host dependent port, HDP, rather than the input/output translator (IOT) of the above mentioned patent, the following Table 0-SS outlines the description of each of the status states of the data link processor in a generalized sense. It will be seen that each of the states follow the same routine pattern of that shown for the earlier line control processors. Slight variations in meaning occur for each type of DLP according to the type of peripheral it services. A specific table for the Card Reader DLP will be presented hereinafter.

TABLE O-SS

| | (Generalized Pattern) | |
|---|---|---|
| Status-Mnemonic | Status State Count | Usage or Meaning |
| Cleared | STC=0 | Entered by the DLP when it is cleared. This status is also shown if the DLP is not present, it has a PROM parity error, or it has been taken off-line by the Maintenance Card. |
| Disconnect | STC=1 | Used by the DLP to indicate that no more transfers are possible during the connection, or to indicate that the DLP is unable to accept a new I/O descriptor. |
| Reserved | STC=2 | Reserved for expansion. Detection of this status results in an error. |
| Idle | STC=3 | Indicates that the DLP can accept a new I/O descriptor, or that a DLP receiving this new descriptor requires additional descriptor words. |
| Read | STC=4 | Indicates that data is being transferred to the host system by the DLP. |
| Send Descriptor Link | STC=5 | Indicates that the descriptor link is being sent, to the host system. |
| Receive Descriptor Link | STC=6 | Indicates that the DLP needs to receive, or is receiving the descriptor link. |
| Result Descriptor | STC=7 | Indicates that the result descriptor is being sent |

TABLE O-SS-continued

| Status-Mnemonic | Status State Count | Usage or Meaning |
|---|---|---|
| | | (Generalized Pattern) |
| | | to the host system. |
| Write | STC=8 | Indicates that the DLP needs data from the host system. |
| Encoded Status | STC=9 | Indicates that the DLP is sending special status information on the data lines. |
| Port Busy | STC=10 | The host is waiting on port busy, but the LEM has a request from another DLP. |
| I/O Descriptor LPW | STC=11 | Indicates that the DLP requires the I/O descriptor LPW. |
| Break | STC=12 | Indicates the end of a data message, and the DLP now wants an LPW. |
| Break Enable | STC=13 | Indicates the desire by the DLP to transmit another message to the host system. The host system may accept or refuse this request. |
| Character Transfer | STC=14 | Used by certain DLPs to resolve the contents of the last data word that has been received from the host system. |
| Result Descriptor LPW | STC=15 | Indicates that the final word of the result descriptor is being sent to the host system and is followed by the appropriate LPW. |

INFORMATION TRANSFERS: All information transfers between the DLP I/O subsystem and the host system are asynchronous and accomplished by means of 25 control strobes. On the other hand, transfers between Distribution Card and the DLP are synchronous. The various types of information transfers are briefly described hereinunder.

SYSTEM TRANSMIT: When information is ready to be sent to the I/O subsystem, the host system emits a pulse (SIO) to the DLP I/O subsystem. When the subsystem has received data it then emits a pulse (LCPST) over to the host system. At this point the next transfer takes place beginning with a SIO signal. Resynchronizing of the asynchronous signals occurs in the Distribution Card (DC). Upon receipt of the host system strobe, the Distribution Card synchronously sets the STIOL level to the DLP. STIOL is synchronously reset when LCPSTL is "true" from the DLP. The answer to the host system occurs as soon as LCPSTL is "true" from the DLP. If this is the case, STIOL is "true" for only one clock period and the host system strobes are immediately answered. Data from this system is latched in the Distribution Card on the trailing edge of the host system strobe.

SYSTEM RECEIVE: When the host system can accept another word of data from the DLP I/O subsystem, it emits a pulse (SIO) to the subsystem. In turn, when the subsystem is capable of sending a new word it emits a pulse (LCPSTL) to the host system. Upon receipt of the host system strobe, the Distribution Card synchronously sets the STIOL "level" to indicate that a new cycle can begin. The new cycle is completed and the host system is strobed when LCPSTL is "true" and STIOL is synchronously reset. LCPSTL can be "true" before the SIO is received. If this is the case, STIOL is "true" for only one clock period and the host system's strobe pulses are immediately followed by subsystem strobe pulses with new data. Data to the host system is latched in the Distribution Card on the leading edge on the subsystem strobe pulse to the host system.

LINE TURN: In the course of a message transfer, it is sometimes necessary to change the information direction. The host system and the DLP coordinate in this turnaround of bi-directional lines. The DLP controls the data direction in the base module with a backplane line called I/O send (IOSND/). I/O send, when low, directs the data lines toward flow into the host system. The DLP initiates the "line turn" with a status transition that requires a change in information direction. Two situations occur here:

1. Host System Transmit to Host System Receive: If the host system detects a status change when it receives an acknowledge (on the information transfer that requires it to receive information) the host system sends another strobe to acknowledge the "status change". The DLP detecting the host systems "acknowledge" raises the I/O send and begins transmission to the host system.

2. Host System Receive to Host System Transmit: If the host system acknowledges an information transfer in conjunction with a status change that requires a line turnaround, the DLP inactivates the I/O send and sends another DLP strobe to the host system. When the host system receives the "acknowledge" (that the base lines have been turned), then the host system begins to transmit to the DLP.

DLP BASE ADDRESS: As the DLP base backplane is made up of common lines running the length of the base, the printed circuit cards, which form the DLP, can function in almost any set of slide-in card locations. The base address chosen for a DLP is "jumpered" on the DLP card (FIG. 3). The base address serves only to make the DLP unique within the base. The DLP's global priority is not affected by its base address. This priority is selected on the Distribution Card (DC).

There are two backplane line functions that are linear: the DLP request and the DLP address. They are allocated eight lines each (0–7). The request and address jumpers must correspond.

DLP ID (IDENTIFICATION): Upon receiving a TEST/ID OP code, the DLP returns a two-word result descriptor (R/D). The second word contains DLP ID information. Digits A and B of the ID word are a predetermined bit pattern specifying the type of DLP. Digits C and D of the ID word are a bit pattern specified by field-installed jumpers, and are used to uniquely identify the DLP. The ID word for the DLP is formatted as follows:

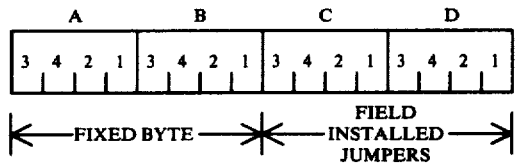
← FIXED BYTE → ← FIELD INSTALLED JUMPERS →

I/O DESCRIPTORS: The I/O descriptor is transmitted in 17 parallel bits including odd parity. The DLP OP codes are limited to the following four types:
1. Read
2. Write
3. Test
4. Echo Operations that do not transfer data are considered "test". Thus, a test is defined as an operation that results in the host system receiving a result descriptor only. Echo is a maintenance operation that causes the DLP to accept a buffer load of data from the host system, and then return it back to the host system. This allows a quick confidence check of the I/O data path as far as the DLP buffer is concerned. Also, the various translation logics can be checked by an echo operation.

DLPs that require further information associated with the basic operations obtain that information in the form of variants. The first I/O descriptor transfer contains the four OP code bits and up to 12 variant code bits. Further variants are transferred in 16 parallel bit increments and are not limited to any size.

RESULT DESCRIPTORS: A result descriptor is transmitted to the host system along 17 parallel bits including odd parity. The first four bits (one digit) of the first word of the DLP result descriptor are common for every DLP. These first four bits are shown as follows:

| Bit | Significance |
|---|---|
| A8 | Not ready peripheral |
| A4 | I/O Descriptor error |
| A2 | MLI Vertical parity error |
| A1 | MLI longitudinal parity error |

The B, C and D digits of the "DLP result descriptor" will vary according to the type of data link processor involved.

FIG. 4A shows a block diagram of the Common Front End, $10_c$, (which is sometimes designated as a "Common I/O" unit). The maintenance control bus 30, coming from the Maintenance Card $20_{om}$ provides input to a receiver 15 which has one output to the address multiplexer 12 and another output on bus 37 to the peripheral dependent board (PDB) 80.

The Distribution Card data bus 32 provides input to receiver 16 while line 31 provides another input (RCV/) to receiver 16 from the peripheral dependent board 80. One output of receiver 16 is fed to the address multiplexer 12; while the other output forms bus 38 as a data bus to the PDB 80.

Receiver 17 has one input from the Maintenance Card data bus 34 and another control, SIMRCV/ (simulate receive) input line 33 from the peripheral dependent board PDB 80. Receiver 17 provides an output to the address multiplexer 12 and an output to the data bus 38.

Bus 35 from PDB 80 provides another input to the address multiplexer 12, while the low order address bit (A0) from the PDB 80 on line 36 provides an input to the PROM 13. PROM 13 provides a bus to the PROM register 14, which register also has an input from AND gate 24 which has two inputs, one of which constitutes the PROMCLK/ line and the other input is from the parity check circuit 18 to signal whether or not a parity error has been detected.

PROM register 14 has an output on bus 40 for maintenance display signals and connects to the common backplane of the base module. Another output of the PROM register 14 connects to the Request Status Latches circuit 19 which feeds its output to drivers 20 to provide signals designated IOSF (I/O Send flip-flop) Status, REQ (request) and EMREQ (emergency request) which are interrupts to the host. This bus also connects to the common backplane.

The PROM register 14 outputs include: the control lines of bus 43, the PDB usage bus 44 and the multiplexer enable bus 45, all of which connect to the peripheral dependent board, PDB 80.

A Random Access Memory or RAM buffer storage 22 will be seen having four sets of inputs from the peripheral dependent board 80. These inputs are: the chip select line 50, the write enable line 51, the RAM data in-bus 52 and the RAM address bus 53. The output bus of RAM 22 is designated as the RAM data-out bus $22_a$ which connects to the peripheral dependent board 80.

COMMON FRONT END-CARD (CFE)

Referring to FIG. 4A which shows a block diagram of the Common Front End (CFE) $10_c$, the central operative element of the Common Front End is the PROM controller and storage unit 13. The PROM storage 13 consists of 13 separate PROM chips which may have a total storage capacity of 1024 52-bit words. This includes odd parity.

As seen in FIG. 4A, the Common Front End also contains the receivers 15, 16 and 17, for the data link processor (DLP) interfaces with the Distribution Card on data bus 32 and the maintenance card on control bus 30. The "enable" signals for these buses are driven by the peripheral dependent board (PDB) 80.

The data link processor RAM storage buffer 22 has a capacity of 1024 17-bit words which includes odd parity. The RAM storage unit 22 is controlled entirely by the peripheral dependent board 80. The following Table IA lists a glossary of various signals and terms used in the Common Front End. The Table IB is a glossary of terms used in the peripheral dependent board PDB 80 of the Card Reader-Data Link Processor.

TABLE IA

COMMON FRONT END CARD GLOSSARY OF TERMS
A0
  PROM address bit 0.
A1
  PROM address bit 1.
A2
  PROM address bit 2.
A3
  PROM address bit 3.
A4
  PROM address bit 4.
A5
  PROM address bit 5.
A6
  PROM address bit 6.
A7
  PROM address bit 7.
A8
  PROM address bit 8.

TABLE IA-continued

COMMON FRONT END CARD GLOSSARY OF TERMS

A9
PROM address bit 9.
ADLOC/
When high, DLP is MC addressed or DLP address is not valid.
ADRVLD/0
When low, LOCnn/.0 is valid.
AF
When high, strobe I/O has been received.
AF/
When low, strobe I/O is sent to the PDB.
BASLCL/0
When low, the base is in local.
BR6
A branch line from PDB for PROM address selection.
BROP
When high, a 16-way PROM address branch is selected.
BRST
When high, use stack register for PROM address.
BUFFEND/
Active low, from PDB, used to stop burst mode.
CLK8
8-megahertz clock.
CLK8/
8-megahertz clock not.
CLKEN
High active, clock conditioning level.
CLKEN/
Low active, used to enable clock on PDB and CFE.
CLKST
When high, PROM clock is disabled.
CLOCK..0
8-megahertz backplane clock from MC.
CLOCK/
CFE control logic clock.
CLR/
Active low, logic clear term.
CLRD
Active high, logic control term.
CLRLAT
Active high, logic term used to control SCLR.
CONECT/
Active low, DC is connected to DLP.
CS/
Active low, RAM chip select level.
DATAA8/0-DATAPR/0
17-bit data bus from DC.
DBUSA8-PARITY/0
17-bit data bus.
DBUSn
9-bit bus used as input to PROM address MPXs.
DIOSND/0
Active low, I/O SEND level to MC.
DLCPST/0
Active low, DLP strobe to MC.
DPLY01/0-DPLY10/0
Ten display lines to MC.
DSEL1/-DSEL4/
Multiplexor address lines for data selection to display lines.
DSEL8/
Active low, multiplexor chip select line for input to display lines.
DSIMA8/0-PARSIM/0
17-bit data bus from MC.
DSIMn
9 bits of DSIM lines, used to become DBUSn.
DSTAT1/0-DSTAT8/0
Four DLP status lines to MC.
EMREQ
Active high, DLP emergency request.
EMRREQ/0
Active low, DLP emergency request to DC.
GPRIF/
Peripheral bus control term to PDB.
GPRIF/.0
Active low, from MC, disconnects PDB peripheral cable.

TABLE IA-continued

COMMON FRONT END CARD GLOSSARY OF TERMS

GRP0/
Active low, controls 16-line display to MC.
INRAMA8-INRAMPR
17 RAM input data lines.
IOSF
I/O SEND flip-flop to PDB.
IOSND/.0
I/O SEND to DC.
LCLCLR/0
Active low, clear level from MC.
LCPAD
Active high, DLP is addressed by DC or MC.
LCPAD/
Active low, DLP is addressed by DC or MC.
LCPADF
Active high, DLP is addressed by DC or MC.
LCPCON/0
Active low, DLP is connected to DC.
LCPRQn/0
Active low, DLP request levels to DC.
LCPSTL
Active high, DLP strobe level.
LCPSTL/0
Active low, DLP strobe level to DC.
LCSTU1/0-LCSTU8/0
Four DLP status lines to DC.
LOCAL/
Active high, DLP is not MC addressed, or address is not valid.
LOCAL/.1
Active low, DLP is MC addressed.
LOCnn/.0
Local address lines from MC.
MLCPAD/0
Active low, DLP is addressed by MC.
MSTCLR/0
Active low, base power-up clear from MC.
MSTIOL/0
Active low, maintenance strobe I/O from MC.
MTERM/.0
Active low, maintenance terminate from MC.
OFFLN
Active high, MC has localized the CFE.
OFFLN/
Active low, the DLP is in local.
OFFLNE/0
Active low, off-line control level from MC.
OPDEC1
PROM address A0 bit from PDB when 16-way branching.
OPDECX
PROM address bits A1-A3 from PDB, when 16-way branching.
PARSIM/0
Data simulate parity line from MC.
PER
Active high, PROM output parity is even (an error).
PERF
Active high, PROM parity error is present.
PERF/
Active low, PROM parity error (disables clocks).
PROMCLK/
PROM clock.
RAM
17 bits of RAM addressed by RAMAD0 RAMAD9.
RAMA8-RAMPR
17 bits of RAM output information.
RCV/
Active low, enables data bus from DC.
REQ
Active high, DLP request for DC attention.
SCLR
Active high, synchronized clear, sets PROM address = 0.
SEL2/-SEL6/
Active lows, to PDB, for MPX enables.
SELCLR/0
Active low, clear line from DC.
SEMREQ/

TABLE IA-continued
COMMON FRONT END CARD GLOSSARY OF TERMS

Active low, an emergency request is present in the base.
SIMRCV/
Active low, enables MC DSIM lines, from PDB.
SP/....0
Active low, single-pulse mode from MC.
ST1-ST8
DLP status lines internal to CFE.
START/.0
Active low, from MC, allows clock in single-pulse mode.
STCKA8-STCKA0
PROM address lines used during stack branching.
STCLKEN
Active when going high, counts up the stack register +1.
STIOL/.0
Active low, strobe I/O from DC.
STOPB
Active high, used to stop burst mode.
STOPB/
Active low, stop burst mode to PDB.
STOPF
A 2-way PROM branching bit.
SW1/
Active low, used to do PROM maintenance read.
SWH.1/.0
Active low, SW1/ from MC.
TERMF
A 2-way PROM branching bit.
TERMF/
Active low, used to terminate burst mode.
TERM/..0
Active low, terminate level from DC.
TEST5 and TEST6
2-way PROM branching bits from PDB.
TEST8-TEST14
2-way PROM branching bits from PDB.
WE/
Active low, RAM write enable level.
BRANCH1-#BRANCH5
PROM branching control lines.
CONST0-#CONST7
Multipurpose PROM outputs, PDB-dependent.
G3-#L4
PDB dependent PROM outputs (see PDB Glossary of Terms).
LCPSTL/
Active low, DLP strobe level, from PROM controller to DC.
LDINT/
Active low, (load interface) PROM MLI bus control level.
LDSTK/
Active low, allows stack register load of current PROM address. This level is held high during all microcode subroutines.
NEXT0-#NEXT8
PROM address bits.
PARITY
PROM parity bit (odd).
+5V
VCC from power supply.

TABLE IB
Card Reader-Data Link Processor
PDB GLOSSARY OF TERMS

CONST7-#CONST0
8 logic lines which originate in the microcode. With #RDLT set, the #CONSTn lines are used to load the result descriptor register. With #LDADR, #INCUX and #INCX active, the #CONSTn lines are used to load or increment X or UX RAM address registers
C7RDL/
(#CONST7*RDLTS)/. Resets variant A of result descriptor register to 0 after an unsuccessful conditional cancel operation.
BINP/

TABLE IB-continued
Card Reader-Data Link Processor
PDB GLOSSARY OF TERMS The enable that places card row 12, 11, 0 and 1 information on the XDAT lines.
BRSTCON
A timing signal used to generate RDEN and WRTEN which disable the RAM address register from incrementing due to a possible glitch occuring when entering and leaving burst mode.
BRSTMXLL
Burst multiplexor control. STOPB/ delayed by two clocks. Allows setting up of the first word and completion of the last word during burst mode.
BULL/
Specifies the standard translation as BULL. If high, then ICT is specified. BCL can be used regardless of the jumper.
BUS1A8-BUS1D1,PAR
17 lines which can be driven by the RAM output, the reader, data, the DSIM lines or the ID. BUS1 data can be loaded into the data register.
BUS2A8-BUS2D1, PAR
17 output lines of the data register. They are used to drive data. DSIM, LPW, OP decode and/or input to the RAM.
CARDS
Specifies multiple card reads.
DATA8-DATD1
16 lines of output from the multiplexor choosing XDAT, BUS1, R/D, or LPW. They are inputs to the data register.
DBUSA8-DBUSD1,PAR
17 lines from the CFE which are changed to BUS1 inputs on the PDB.
ENADR
Enables addresses to both RAM address registers. It may be microcode driven or controlled by BRSTMXLL (delayed STOPB) during burst mode.
ID+EBCT/
This enable places IDxx jumpers on BUS1 and EBCDIC top translator (4) on XDAT.
IDA8-IDD1
16 lines of ID. For the CR-DLP, the assigned ID is 01XX. Variants C and D are jumpers. IDxn can drive BUS1.
INCUX
Increment untranslated RAM adress register. Microcode controlled.
INRAMPR
Generated vertical parity on BUS2. It is written into RAM when required.
INVEN
Invalid character enable (STND/*INVCHAR/)/. Disables invalid character detector for EBCDIC.
LEN1
Loads DATA8-DATA1 into the data register.
LEN2
Loads DATB8-DATB1 into the data register.
LEN3
Loads DATC8-DATC1 into the data register.
LEN4
Loads DATD8-DATD1 and BUS1PAR into the data register. It also causes the LPW to be clocked on the next clock (LPWCKL).
LPWA8-LPWD1
16 lines that make up the longitudinal parity word. They can be loaded into the data register.
PER12/-PER9
12 bits of row data from the card reader. Can drive BUS1.
PR+EBCB/
This enable term places PERxx on BUS1 and EBCDIC bottom translator (4) on XDAT.
RAMADZ0
Sets RAM address to 0 (scratchpad present OP) without disturbing the contents of the RAM address registers.
RAMA8-RAMD1,PAR
17 output lines of RAM from CFE. 12 bits are inputs to the translator. All 17 can drive BUS1.
RAMEN
Enables the RAM output bits on BUS1. All BUS1

TABLE IB-continued
Card Reader-Data Link Processor
PDB GLOSSARY OF TERMS enables are disabled if SW1/ is low.

RCV/
The enable that places the contents of the data lines onto BUS1.

RDA8-RDC2
11 lines for result descriptor bits. Can be loaded into the data register.

ROW12-ROW9
12 bits of card data. Outputs of translate shift register. Row 12, 11, 0, and 1 are used in binary packed operations.

SCCL
The clocked enable that starts a card cycle. It is held inactive if a microcode parity error occurs.

SIMRCV/
This enable places DSIM information on the BUS1 lines.

SIMSND/
This enable places BUS2 information on the DSIM lines.

SNDL/
The clocked enable that places BUS2 on the data lines.

STNDBOT/
This enable places standard bottom translator (4) on XDAT.

STNDTOP/
This enable places standard top translator (4) on XDAT.

SWH2/
Used to turn off BUFFEND thus allowing burst mode to continue indefinitely (for maintenance purposes).

VPER/
Vertical parity error. It may be set by the #CONSTn lines and RDLT, or by VPOK (automatic parity check) during burst mode.

WE/
Write enable to RAM on CFE. It may be microcode driven or controlled by WEBRST (AF/*CLKB8/)/ during burst mode.

XDAT8-XDAT1
4-bit output of translator. Can be loaded into any variant of data register.

TABLE IC
Card Reader-Data Link Processor:
Low Order Address Bit Selection
PDB A0 SELECTION

| #BRANCHn Bits 1 2 3 4 5 | Name | Description |
|---|---|---|
| 0 0 0 0 0 | #NEXT0 | LSB of next address to microcode. |
| 0 0 0 0 1 | RDA8 | Device not ready result descriptor bit. |
| 0 0 0 1 0 | IOSF | System read in progress. |
| 0 0 0 1 1 | COL1 | Column 1 of card image has been read and translated. |
| 0 0 1 0 0 | STOPF | Burst mod operation not. |
| 0 0 1 0 1 | RDB4 | Control character result descriptor bit. |
| 0 0 1 1 0 | LPWOK | LPW okay, all zeroes in data register. |
| 0 0 1 1 1 | BINPAK/ | Binary packed not. Translation bit. |
| 0 1 0 0 0 | TERMF | System terminate. |
| 0 1 0 0 1 | RDA2 | MLI vertical parity error result descriptor bit. |
| 0 1 0 1 0 | FLAG | One bit multi-purpose scratch memory. |
| 0 1 0 1 1 | RAMADONE | Second LSB of RAM address. Translated or untranslated, specified by ADRMX. |
| 0 1 1 0 0 | CSPL | Column strobe pulse synced from reader. |
| 0 1 1 0 1 | RDC8 | RAM parity error result descriptor bit. |
| 0 1 1 1 0 | CARDS | I/O descriptor bit. Specifies multiple or singular card read. |
| 0 1 1 1 1 | EBC/ | EBCDIC not. Translation bit. |
| 1 0 0 0 0 | AF | ASYNC flip-flop. Specifies host system strobe. |
| 1 0 0 0 1 | RDA4 | Descriptor error. Error on OP, OP LPW or decriptor link. |
| 1 0 0 1 0 | XEND | Translation end. BINUP = 80, BINPAK = 60, or STND+EBC = 40. |
| 1 0 0 1 1 | BOTINV | Bottom invalid. Invalid character in variant CD during STBD+EBC translation. |
| 1 0 1 0 0 | CCL | Card cycle level. Synced from reader. |
| 1 0 1 1 0 | TOPINV | Top invalid. Invalid character in variant AB during STND+EBC translation. |
| 1 0 1 1 1 | BINUP/ | Binary unpacked not. Translation bit. |
| 1 1 0 0 0 | LCPADF | DLP address flip-flop (LCPAD*CONECT). |
| 1 1 0 0 1 | RDB8 | Invalid character result descriptor bit. |
| 1 1 0 1 0 | VPOK | Vertical parity okay. The data word has correct parity. |
| 1 1 0 1 1 | RAMADZERO | LSB of the RAM address. Translated or untranslated, specified by ADRMX. |
| 1 1 1 0 0 | NWAY | NWAY branch. 16-way branch on OPDECn lines. |
| 1 1 1 1 0 | STND/ | Standard not. Translation bit. |

TABLE ID

CR-DLP Micro-Code Output Bits

| PROM | Word Bit No. | Foreplane Pin No. | Name | Description |
|---|---|---|---|---|
| Z 1 | 48 | | #NEXT9 | Specifies the next address unless |
| A 1 | 47 | | #NEXT7 | the branch bits multiplex a 16-way or |
| A 2 | 46 | | #NEXT6 | a 2-way branch. |
| A 3 | 45 | | #NEXT5 | |
| A 4 | 44 | | #NEXT4 | |

TABLE ID-continued

CR-DLP Micro-Code Output Bits

| PROM | Word Bit No. | Foreplane Pin No. | Name | Description |
|---|---|---|---|---|
| B 1 | 43 | | #NEXT3 | |
| B 2 | 42 | | #NEXT2 | |
| B 3 | 41 | | #NEXT1 | |
| B 4 | 40 | | #NEXT0 | |
| C 1 | 39 | | #NEXT8 | |
| C 2 | 38 | | #BRANCH1 | Specifies multiplexing |
| C 3 | 37 | | #BRANCH2 | of next address bits |
| C 4 | 36 | | #BRANCH3 | |
| D 1 | 35 | | #BRANCH4 | |
| D 2 | 34 | | #BRANCH5 | |
| D 3 | 33 | | #LCPSTL/ | DLP strobe control. |
| D 4 | 32 | | #PARITY | PROM word parity bit |
| E 1 | 31 | | #CONST7 | Multi-purpose constant lines. |
| E 2 | 30 | | #CONST6 | |
| E 3 | 29 | | #CONST5 | |
| E 4 | 28 | | #CONST4 | |
| F 1 | 27 | | #CONST3 | |
| F 2 | 26 | | #CONST2 | |
| F 3 | 25 | | #CONST1 | |
| F 4 | 24 | | #CONST0 | |
| G 1 | 23 | | #LDINT/ | Loads status, IOSF, and request. |
| G 2 | 22 | | #LDSTCK/ | Load stack with present address + 1. |
| G 3 | 21 | S66 | #MUXEN1 | 3 translator bits which are decoded to |
| H 1 | 19 | #64 | #MUXEN3 | enables, BUS2 enables, and SCCL. |
| H 2 | 18 | S64 | #OPLT | Loads OP decode and translation regs. |
| H 3 | 17 | #63 | #LPWPR | Along with low clock, presets LPW reg. |
| H 4 | 16 | #63 | #CLRRD/ | Clears result descriptor reg. |
| I 1 | 15 | #62 | #WE/ | Writes data in RAM if not in BURST. |
| I 2 | 14 | S62 | #SRS0 | Loads and shifts translate shift reg. |
| I 3 | 13 | #61 | #SRS1 | |
| I 4 | 12 | S61 | #ENAD | Enables load shift in xlate and unxlate RAM address counters if not in BURST. |
| J 1 | 11 | #60 | #LEN1 | Loads A var into data reg if not in burst. |
| J 2 | 10 | S60 | #LEN2 | Loads B var into data reg if not in BURST. |
| J 3 | 09 | #59 | #LEN3 | Loads C var into data reg if not BURST. |
| J 4 | 08 | S59 | #LEN4 | Loads D var into data reg if not BURST |
| K 1 | 07 | #58 | #Ramen | Enables RAM output onto BUS1. |
| K 2 | 06 | S58 | #LDADR | Loads #CONSTn lines to RAM address. |
| K 3 | 05 | #57 | #INCX/ | Loads or increments xlate RAM address. |
| K 4 | 04 | S57 | #INCUX | Loads or increments unxlate RAM address. |
| L 1 | 03 | #56 | #ADRMX | Multiplexes xlate or unxlate RAM address to RAM. |
| L 2 | 02 | S56 | #DMX1 | 2 bits which mutiplex the translator, |
| L 3 | 01 | #55 | #DMX2 | BUS1, result descriptor reg or LPW reg. |
| L 4 | 00 | S55 | #RDLT | Uses #CONSTn lines to set, reset or maintain bits in the result descriptor reg. |

DISTRIBUTION CARD INTERFACE: As previously indicated in FIG. 2, data link processors are housed in a base module unit. Each data link processor, consisting of two cards, slides into the base module housing having a common backplane to which the printed circuit boards of a data link processor are connected.

All communications between the Common Front End $10_c$ and the Distribution Cards such as $20_{0d}$, $20_{1d}$ are performed through the data link processor base module backplane as $20_{0B}$ of FIG. 3. The backplane is common to all cards that are installed in a base module.

Table II shows a list of all the backplane signals that occur on the Distribution Card interface to the Common Front End. The 17-bit wide data portion of the bus 32, FIG. 4A, is received from Distribution Card (DC) on the Common Front End (CFE). This same 17-bit bus is driven in the opposite direction (by drivers on the PDB) when the data link processor is sending data back to the Distribution Card. The enabling levels that control the direction of this bus are generated on the peripheral dependent board.

TABLE II

Distribution Card/CFE Interface

| Level | Pin # | Direction | Definition |
|---|---|---|---|
| LCSTU8/0 | 123 | to DC | DLP status bit 8 |
| LCSTU4/0 | 023 | to DC | DLP status bit 4 |
| LCSTU2/0 | 126 | to DC | DLP status bit 2 |
| LCSTU1/0 | 026 | to DC | DLP status bit 1 |
| LCPCON/0 | 074 | to DC | DLP is connected |
| IOSND/.0 | 124 | to DC | DLP is sending |
| EMRREQ/0 | 191 | to DC | DLP has emergency request |
| LCPRQ7/0 | 163 | to DC | DLP #7 has request |
| LCPRQ6/0 | 063 | to DC | DLP #6 has request |
| LCPRQ5/0 | 164 | to DC | DLP #5 has request |
| LCPRQ4/0 | 064 | to DC | DLP #4 has request |
| LCPRQ3/0 | 165 | to DC | DLP #3 has request |
| LCPRQ2/0 | 065 | to DC | DLP #2 has request |
| LCPRQ1/0 | 166 | to DC | DLP #1 has request |
| LCPRQ0/0 | 066 | to DC | DLP #0 has request |
| LCPSTL/0 | 024 | to DC | DLP strobe |
| STIOL/.0 | 127 | to CFE | Strobe I/O |
| TERM/..0 | 072 | to CFE | Terminate |
| SELCLR/0 | 167 | to CFE | Selective clear |
| LCPAD7/0 | 176 | to CFE | DLP #7 is addressed |
| LCPAD6/0 | 076 | to CFE | DLP #6 is addressed |
| LCPAD5/0 | 177 | to CFE | DLP #5 is addressed |
| LCPAD4/0 | 077 | to CFE | DLP #4 is addressed |
| LCPAD3/0 | 178 | to CFE | DLP #3 is addressed |
| LCPAD2/0 | 078 | to CFE | DLP #2 is addressed |
| LCPAD1/0 | 179 | to CFE | DLP #1 is addressed |

TABLE II-continued

Distribution Card/CFE Interface

| Level | Pin # | Direction | Definition |
|---|---|---|---|
| LCPAD0/0 | 079 | to CFE | DLP #0 is addressed |
| DATAA8/0 | 106 | Bi-Dir | Data bit |
| DATAA4/0 | 006 | Bi-Dir | Data bit |
| DATAA2/0 | 108 | Bi-Dir | Data bit |
| DATAA1/0 | 008 | Bi-Dir | Data bit |
| DATAB8/0 | 110 | Bi-Dir | Data bit |
| DATAB4/0 | 010 | Bi-Dir | Data bit |
| DATAB2/0 | 117 | Bi-Dir | Data bit |
| DATAB1/0 | 017 | Bi-Dir | Data bit |
| DATAC8/0 | 119 | Bi-Dir | Data bit |
| DATAC4/0 | 019 | Bi-Dir | Data bit |
| DATAC2/0 | 121 | Bi-Dir | Data bit |
| DATAC1/0 | 021 | Bi-Dir | Data bit |
| DATAD8/0 | 132 | Bi-Dir | Data bit |
| DATAD4/0 | 032 | Bi-Dir | Data bit |
| DATAD2/0 | 134 | Bi-Dir | Data bit |
| DATAD1/0 | 034 | Bi-Dir | Data bit |
| PARITY/0 | 136 | Bi-Dir | Data parity bit (odd) |

MAINTENANCE CARD INTERFACE: All communications between the Common Front End $10_c$ and the Maintenance Card (as $20_{0m}$) take place on the data link processor's base module backplane. Table III shows a list of all the backplane signals that occur between the Common Front End and the Maintenance Card.

TABLE III

Maintenance Card/CFE Interface

| Level | Pin # | Direction | Definition |
|---|---|---|---|
| DSTAT8/0 | 044 | to MC | DLP status bit 8 |
| DSTAT4/0 | 145 | to MC | DLP status bit 4 |
| DSTAT2/0 | 045 | to MC | DLP status bit 2 |
| DSTAT1/0 | 146 | to MC | DLP status bit 1 |
| DLCPST/0 | 140 | to MC | DLP strobe |
| DIOSND/0 | 144 | to MC | DLP is sending |
| MSTIOL/0 | 040 | to CFE | Strobe I/O |
| MTERM/.0 | 184 | to CFE | Terminate |
| MLCPAD/0 | 154 | to CFE | DLP is addressed |
| BASLCL/0 | 161 | to CFE | Base is in local |
| MSTCLR/0 | 172 | to CFE | Base clear |
| LCLCLR/0 | 174 | to CFE | Local clear |
| SWH.1/.0 | 058 | to CFE | Maintenance switch #1 |
| SP/....0 | 147 | to CFE | Single-pulse mode |
| START/.0 | 149 | to CFE | Allow clock(s) |
| CLOCK..0 | 048 | to CFE | 8 Mhz clock |
| ADRVLD/0 | 043 | to CFE | Local address is valid |
| LOC16/.0 | 187 | to CFE | Local address bit 16 |
| LOC08/.0 | 087 | to CFE | Local address bit 8 |
| LOC04/.0 | 188 | to CFE | Local address bit 4 |
| LOC02/.0 | 088 | to CFE | Local address bit 2 |
| LOC01/.0 | 189 | to CFE | Local address bit 1 |
| OFFLNE/0 | 073 | to CFE | DLP is off line |
| GPRIF/.0 | 061 | to CFE | Gate off peripheral interface |
| DSEL8/.0 | 060 | to CFE | Display select bit 8 |
| DSEL4/.0 | 085 | to CFE | Display select bit 4 |
| DSEL2/.0 | 186 | to CFE | Display select bit 2 |
| DSEL1/.0 | 086 | to CFE | Display select bit 1 |
| DPLY01/0 | 054 | to MC | Display line |
| DPLY02/0 | 155 | to MC | Display line |
| DPLY03/0 | 055 | to MC | Display line |
| DPLY04/0 | 156 | to MC | Display line |
| DPLY05/0 | 056 | to MC | Display line |
| DPLY06/0 | 157 | to MC | Display line |
| DPLY07/0 | 057 | to MC | Display line |
| DPLY08/0 | 067 | to MC | Display line |
| DPLY09/0 | 168 | to MC | Display line |
| DPLY10/0 | 068 | to MC | Display line |
| DSIMA8/0 | 112 | Bi-Dir | Data simulate line A8 |
| DSIMA4/0 | 012 | Bi-Dir | Data simulate line A4 |
| DSIMA2/0 | 113 | Bi-Dir | Data simulate line A2 |
| DSIMA1/0 | 013 | Bi-Dir | Data simulate line A1 |
| DSIMB8/0 | 114 | Bi-Dir | Data simulate line B8 |
| DSIMB4/0 | 014 | Bi-Dir | Data simulate line B4 |
| DSIMB2/0 | 115 | Bi-Dir | Data simulate line B2 |
| DSIMB1/0 | 015 | Bi-Dir | Data simulate line B1 |
| DSIMC8/0 | 027 | Bi-Dir | Data simulate line C8 |
| DSIMC4/0 | 128 | Bi-Dir | Data simulate line C4 |
| DSIMC2/0 | 028 | Bi-Dir | Data simulate line C2 |
| DSIMC1/0 | 129 | Bi-Dir | Data simulate line C1 |
| DSIMD8/0 | 029 | Bi-Dir | Data simulate line D8 |
| DSIMD4/0 | 130 | Bi-Dir | Data simulate line D4 |
| DSIMD2/0 | 030 | Bi-Dir | Data simulate line D2 |
| DSIMD1/0 | 131 | Bi-Dir | Data simulate line D1 |
| PARSIM/0 | 137 | Bi-Dir | Data simulate parity line (odd) |

MAINTENANCE FACILITIES: In FIG. 2 certain maintenance facilities are provided. These consist of a console $50_c$ (which may include a cathode ray tube CRT, a mini-disk, etc.) and the Maintenance Card, as $20_{om}$, plus other software packages and hardware which are included in the DLP. Under programmatic control, the console $50_c$ can be used to manipulate the DLP in such a manner as to determine its internal state for given operations and to compare it to a known correct state by use of the Maintenance Card $20_{0m}$. Thus, diagnosis of a failing DLP can be made.

The console is the interface between the host system and the host system operator, as well as being the maintenance interface to the I/O subsystem. Maintenance of the Card Reader-Data Link Processor originates at the console, when in the off-line mode; and from the host system, when in the on-line mode of operation. A data base can be supplied on flexible diskettes or magnetic tape to perform diagnosis of the data link processor (DLP). The selection of the test and type of module can be done at the host system by a field engineer or a host system operator.

DIAGNOSTIC TESTING MODES: There are two modes of diagnostic testing, (a) off-line and (b) on-line. In either mode the units undergoing tests are not available to the host system as a resource and must be placed off-line prior to running diagnostics. Diagnostic programs use the console-to-maintenance card interface in the diagnosis of the subsystem modules. These programs can perform a card test on the addressed unit by means of a maintenance data base that is stored on flexible diskettes or is resident in the host system.

OFF-LINE MODE: This mode implies the following:
1. The host systems resources are not available.
2. The test data base is console-diskette-resident.
3. The operator must supply control information.

ON-LINE MODE: This mode implies the following:
1. The host systems resources are available.
2. The test data base is host-system-resident.
3. A host resident program performs the diagnosis.

Confidence test programs can be developed which use the message level interface (MLI) to ascertain a confidence level of the I/O sybsystem unit or units under test. These tests may be used to isolate a failing unit so that maintenance can be invoked to determine if the cause of the failure is in an I/O subsystem module or in the peripheral device.

PERIPHERAL-DEPENDENT BOARD INTERFACE: As seen in FIG. 3 the peripheral dependent board (PDB) and the Common Front End card are provided with foreplane connectors $80_a$, $80_b$, $80_c$, $80_d$ and $80_{a1}$, $80_{b1}$, $80_{c1}$. The interface between the Common Front End and the peripheral dependent board is made of three 50-pin foreplane connectors $80_a$, $80_b$ and $80_c$.

Table IV lists the connectors and shows the pin numbers together with the logic names of the signals involved specifically for the Card Reader-Data Link Processor.

TABLE IV

| | CFE Foreplane Connectors: CR-DLP | | |
|---|---|---|---|
| Connector | Pin Number | #-Side Signal | $-Side Signal |
| | Element $80_{a1}$, FIG. 3 | | |
| 1 | 00 | RAMA4 | RAMPAR |
| 1 | 01 | RAMA1 | RAMA8 |
| 1 | 02 | RAMB4 | RAMA2 |
| 1 | 03 | RAMB1 | RAMB8 |
| 1 | 04 | GND | RAMB2 |
| 1 | 05 | RAMC4 | RAMC8 |
| 1 | 06 | RAMC1 | RAMC2 |
| 1 | 07 | RAMD4 | RAMD8 |
| 1 | 08 | RAMD1 | RAMD2 |
| 1 | 09 | INRAMB8 | INRAMA8 |
| 1 | 10 | INRAMB4 | INRAMA4 |
| 1 | 11 | INRAMB2 | INRAMA2 |
| 1 | 12 | INRAMB1 | INRAMA1 |
| 1 | 13 | INRAMC2 | INRAMC8 |
| 1 | 14 | INRAMC1 | INRAMC4 |
| 1 | 15 | SIMRCV/ | RCV/ |
| 1 | 16 | DBUSA4 | DBUSA8 |
| 1 | 17 | DBUSA1 | DBUSA2 |
| 1 | 18 | DBUSB4 | DBUSB8 |
| 1 | 19 | DBUSB1 | DBUSB2 |
| 1 | 20 | GND | DBUSC8 |
| 1 | 21 | DBUSC4 | DBUSC2 |
| 1 | 22 | DBUSC1 | DBUSD8 |
| 1 | 23 | DBUSD4 | DBUSD2 |
| 1 | 24 | DBUSD1 | DBUSPR |
| | Element $80_{b1}$, FIG. 3 | | |
| 2 | 25 | WE/ | GND |
| 2 | 26 | RAMAD9 | CS/ |
| 2 | 27 | RAMAD7 | RAMAD8 |
| 2 | 28 | RAMAD5 | RAMAD6 |
| 2 | 29 | GND | RAMAD4 |
| 2 | 30 | RAMAD3 | RAMAD2 |
| 2 | 31 | RAMAD1 | RAMAD0 |
| 2 | 32 | GPRIF/ | PERF/ |
| 2 | 33 | IOSF | DSEL8/ |
| 2 | 34 | DSEL4/ | DSEL2/ |
| 2 | 35 | DSEL1/ | SW1/ |
| 2 | 36 | GND | CONECT/ |
| 2 | 37 | GND | LOCAL/ |
| 2 | 38 | GND | CLR/ |
| 2 | 39 | GND | SEMREQ/ |
| 2 | 40 | INRAMD2 | INRAMD8 |
| 2 | 41 | INRAMD1 | INRAMD4 |
| 2 | 42 | TEST14 | INRAMPR |
| 2 | 43 | TEST12 | TEST13 |
| 2 | 44 | TEST10 | TEST11 |
| 2 | 45 | GND | TEST9 |
| 2 | 46 | TEST8 | TEST6 |
| 2 | 47 | TEST5 | OFFLN/ |
| 2 | 48 | AF/ | BUFFEND/ |
| 2 | 49 | GND | CLKEN/ |
| | Element $80_{c1}$, FIG. 3 | | |
| 3 | 50 | OPDEC4 | OPDEC8 |
| 3 | 51 | OPDEC1 | OPDEC2 |
| 3 | 52 | SEL6/ | TERMF/ |
| 3 | 53 | SEL4/ | SEL5/ |
| 3 | 54 | GND | BR6 |
| 3 | 55 | #L3 | #L4 |
| 3 | 56 | #L1 | #L2 |
| 3 | 57 | #K3 | #K4 |
| 3 | 58 | #K1 | #K2 |
| 3 | 59 | #J3 | #J4 |
| 3 | 60 | #J1 | #J2 |
| 3 | 61 | #I3 | #I4 |
| 3 | 62 | #I1 | #I2 |
| 3 | 63 | #H3 | #H4 |
| 3 | 64 | #H1 | #H2 |
| 3 | 65 | STOPB/ | #G4 |
| 3 | 66 | #CONST6 | #G3 |
| 3 | 67 | #CONST4 | #CONST7 |
| 3 | 68 | #CONST2 | #CONST5 |
| 3 | 69 | #CONST0 | #CONST3 |

TABLE IV-continued

| | CFE Foreplane Connectors: CR-DLP | | |
|---|---|---|---|
| Connector | Pin Number | #-Side Signal | $-Side Signal |
| 3 | 70 | GND | #CONST1 |
| 3 | 71 | #BRANCH3 | #BRANCH2 |
| 3 | 72 | BRANCH1 | SEL3/ |
| 3 | 73 | SEL2/ | GND |
| 3 | 74 | GND | A0 |

The following Table V is a listing of the signal lines connecting the Peripheral (Card Reader) to the peripheral-connector on the PDB card 80.

TABLE V

| Signal Lines Between Card Reader and Peripheral Dependent Board (PDB 80) | | |
|---|---|---|
| Peripheral Connector On PDB | 20-Conductor Coax Cable | Signal Name |
| $75 | | |
| $76 | | |
| $77 | $C | INFO04/ |
| $78 | $D | INFO12/ |
| $79 | $E | CSP/ |
| $80 | $F | INFO02/ |
| $81 | $G | INFO10/ |
| $82 | $H | CRRL/ |
| $83 | $I | "FLOATING" |
| $84 | $J | SCCL/ |
| $85 | $K | CREL/ |
| $86 | $L | INFO01/ |
| $87 | $M | INFO08/ |
| $88 | $N | INFO03/ |
| $89 | $P | INFO06/ |
| $90 | $Q | INFO11/ |
| $91 | $R | INFO05/ |
| $92 | $S | INFO09/ |
| $93 | $T | CCL/ |
| $94 | $U | INFO07/ |
| $95 | $V | "FLOATING" |
| $96 | $W | "FLOATING" |
| $97 | | |
| $98 | | |
| $99 | | |

NOTES
1. #75 thru #99 are grounded.
2. $75 thru $76 and $97 thru $99 are grounded.

THE PROM CONTROL-STORE: The PROM control-store 13 shown in FIG. 4A is made up of 13 PROM chips located on the CFE card $10_c$. These chips are combined to make up a 52-bit micro-code instruction word. The address lines of the 13 PROM chips are bused together so that all of the individual address lines are common to every single chip. The chip select on each PROM chip is always enabled (grounded).

The data output of the 13-chip PROM matrix forms the 52-bit word. This word is read out of the address that is present on the common input address line A0–A9 (FIG. 4A). The PROMs herein are basically unclocked devices so that means are required to synchronize their outputs with an eight megahertz clock which feeds through gate 24. This is done by making use of register chips 14. The register chips contain eight flip-flops each. Thus, seven chips are used to synchronize and latch the 52-bit micro-code word. This latched microcode instruction word is used to control the operation of the entire data link processor. Every eight megahertz clock pulse latches the next subsequent word into the register chip 14.

Different types of data link processors require their own unique micro-code. Thus, all Common Front End cards will contain identical hardware except for the 13 PROM chips. Although the PROM word physically contains 52-bits, only 49 bits are used by the micro-code program. The remaining three bits are not parity checked. Tables VIa and VIb indicate the 49-bit micro-code word, by bit position and name. All PROM output signal names are preceded by a "pound sign" (#) so that they are easily recognizable. Bit 32 of the micro-code word is the odd parity bit. The CFE card is made to continually check for odd parity and it halts the micro-code program if a parity error (even parity) occurs on any 49-bit PROM micro-code word.

TABLE VIa

| PROM Output Signals |||||
|---|---|---|---|
| Bit | Name | Bit | Name |
| 48 | #NEXT9 | | |
| 47 | #NEXT7 | 23 | #LDINT/ |
| 46 | #NEXT6 | 22 | #LDSTK/ |
| 45 | #NEXT5 | 21 | #G3 |
| 44 | #NEXT4 | 20 | #G4 |
| 43 | #NEXT3 | 19 | #H1 |
| 42 | #NEXT2 | 18 | #H2 |
| 41 | #NEXT1 | 17 | #H3 |
| 40 | #NEXT0 | 16 | #H4 |
| 39 | #NEXT8 | 15 | #I1 |
| 38 | #BRANCH1 | 14 | #I2 |
| 37 | #BRANCH2 | 13 | #I3 |
| 36 | #BRANCH3 | 12 | #I4 |
| 35 | #BRANCH4 | 11 | #J1 |
| 34 | #BRANCH5 | 10 | #J2 |
| 33 | #LCPSTL/ | 09 | #J3 |
| 32 | #PARITY | 08 | #J4 |
| 31 | #CONST7 | 07 | #K1 |
| 30 | #CONST6 | 06 | #K2 |
| 29 | #CONST5 | 05 | #K3 |
| 28 | #CONST4 | 04 | #K4 |
| 27 | #CONST3 | 03 | #L1 |
| 26 | #CONST2 | 02 | #L2 |
| 25 | #CONST1 | 01 | #L3 |
| 24 | #CONST0 | 00 | #L4 |

TABLE VIb

| CR-DLP CFE/PDB PROM Name Cross-Reference Table |||
|---|---|---|
| CFE Name | PROM Word Bit | PDB Name |
| #G3 | 21 | #MUXEN1 |
| #G4 | 20 | #MUXEN2 |
| #H1 | 19 | #MUXEN3 |
| #H2 | 18 | #OPLT |
| #H3 | 17 | #LPWPR |
| #H4 | 16 | #CLRRD/ |
| #I1 | 15 | #WE/ |
| #I2 | 14 | #SRS0 |
| #I3 | 13 | #SRS1 |
| #I4 | 12 | #ENAD |
| #J1 | 11 | #LEN1 |
| #J2 | 10 | #LEN2 |
| #J3 | 09 | #LEN3 |
| #J4 | 08 | #LEN4 |
| #K1 | 07 | #RAMEN |
| #K2 | 06 | #LDADR |
| #K3 | 05 | #INCX/ |
| #K4 | 04 | #INCUX |
| #L1 | 03 | #ADRMX |
| #L2 | 02 | #DMX1 |
| #L3 | 01 | #DMX2 |
| #L4 | 00 | #RDLT |

MAINTENANCE CONTROL: As seen in FIG. 4A, the Common Front End contains receivers 15, 16, 17 which include decoding logic. Receiver 17 is used for operation of the maintenance control lines 33, 34. Table VII shows the addressing signals for maintenance mode of the data link processor. Thus, this Table lists all possible Maintenance Card to Common Front End addressing codes with the response of any given data link processor. The Maintenance Card (MC) has the ability to address any one of eight DLPs in the base module.

TABLE VII

| Address Codes: DLP Maintenance Mode Addressing (Maintenance Card to CFE) ||||
|---|---|---|---|
| Base Local (BASLCL/0) | Address Valid (ADRVLD/0) | Address Equal (LOCnn/.0) | Action Produced |
| 1 | 1 | X | Normal on-line mode |
| 1 | 0 | 1 | |
| 1 | 0 | 0 | Standard local mode, all maintenance available |
| 0 | 0 | 0 | Local mode with base in local |
| 0 | 0 | 1 | Base in local and the DLP clocks are disabled |
| 0 | 1 | X | Base single-pulse |

1 = high.
0 = low.
X = don't care.

The high order address line from the Maintenance Card (LOC 16/.0) must be "high" in order to address a DLP. It will be seen that all backplane signals are low active. The other four address lines provide encoding for DLP selection. The CFE does not decode the maintenance address until the Maintenance Card indicates the address is valid and stabilized by driving ADRVLD/0 low.

The Maintenance Card drives four lines which are used to enable unique maintenance features in any given DLP or connection module.

When in local mode, the CFE uses one of these lines (SWH./1.0) for allowing the Maintenance Card to drive the address lines of the CFE PROM 13. When this line (SWH.1/.0) is low, the peripheral dependent board drives RCV/high and drives SIMRCV/low, as well as not driving the 17-line data bus 32.

Table VIII shows a list of the Maintenance Card lines which drive the PROM address lines in this local mode. This feature of the maintenance operation is used to verify PROM controller 13 integrity.

TABLE VIII

| Maintenance Lines Driving PROM Address |||
|---|---|---|
| PROM Address Line | Maintenance Line | (Data Simulation) |
| A9 | DSIMC8 | |
| A8 | DSIMC4 | |
| A7 | DSIMA8 | |
| A6 | DSIMA4 | |
| A5 | DSIMA2 | |
| A4 | DSIMA1 | |
| A3 | DSIMB8 | |
| A2 | DSIMB4 | |
| A1 | DSIMB2 | |
| A0 | DSIMB1 | |

RAM BUFFER: The Common Front-End $10_c$ of FIG. 4A contains a random access memory buffer (RAM) 22. This buffer memory 22 has a specifically designed organization (FIG. 4F) for use in storage of data from the Card Reader mechanism. This RAM buffer (data RAM) consists of 1,024 17-bit words. All inputs and outputs to this RAM are received by or driven by the peripheral dependent board PDB 80. The designation for the open collector line (60 nanosecond read access RAM) is RWON. This storage area is used to store the data, the OP code, the descriptor links, the descriptor links longitudinal parity word (LPW) and the various flags that are required to properly control the operation of the data link processor.

DLP ADDRESS AND REQUEST JUMPERS: There are eight backplane lines which are used by the Distribution Card(s) to address any one given data link processor (DLP). Likewise, eight backplane lines are used by the data link processors (DLPs) to indicate a service request to the Distribution Cards. The 16 lines are unique in that only one data link processor (DLP) can use a given request line. Further, the request lines are graded by priority. Once the priority of a data link processor is determined, that priority request line is "jumpered" for use on the Common Front End Card (FIG. 3). The request and the address lines are identically numbered and operate as pairs. Therefore, once a request priority level is determined and jumpered, the corresponding address line is jumpered on the Common Front End Card.

DLP LOCAL ADDRESS JUMPERS: The Common Front End Card requires a minimum of two and a maximum of three jumpers (FIG. 3) to implement its local maintenance address. This address is used by a Maintenance Card, as $20_{0m}$, to address a data link processor as $20_{00}$. The data link processor's local address must always correspond to its on-line DLP address.

STACK REGISTER: The stack register 11 consists of three binary counter chips. This register contains the value of the current PROM address, or the value of the address to be used when returning from a subroutine by way of a stackbranch operation.

The Card Reader-Data Link Processor will be seen to be made of two slide-in printed circuit cards. These are the Common Front End (CFE) card and the Peripheral Dependent Board (PDB). Each of these two boards are totally different in function and structure; however, when they are used together they make up the totality of the Card Reader DLP.

The primary function of the CFE 10 is to provide a device in which to store and execute the applicable micro-code. The micro-code is used to sequence the operation of the data link processor (DLP). The Random Access Memory ($RAM_{22}$) is housed on the Common Front End Card and provides internal data link processor storage for various uses such as data storage, translation storage, etc.

The peripheral dependent board (PDB), on the other hand, contains the necessary logic to interface the peripheral device (as, for example a Card Reader) to the host system through the message level interface (MLI). (The message level interface $15_i$ will also be seen in U.S. Pat. No. 4,162,520 in FIGS. 1A, 2 and 3). The logical elements of the PDB are controlled by using the micro-code coming from the Common Front End (CFE). However, also, many signals are passed from the peripheral dependent board to the Common Front End to allow logical decision-making by the micro-code.

As seen in FIG. 4A there are interfaces to the front plane (double arrow) and to the backplane (single arrow) which involve the Maintenance Card. These MC lines will be seen as lines 30, 34 and 40.

MAINTENANCE CARD CONNECTION: There is a Maintenance Card Common Front End interface (MC/CFE) which is used when the Maintenance Card (MC) requires connection to a data link processor in order to perform normal maintenance functions. The maintenance card tries to connect to a DLP by driving the appropriate local maintenance address line (LOCnn/.0) and the signal ADRVLD/O (address valid) low. This action causes the addressed CFE $10_c$ to recognize the MC connection and to drive the logic term LOCAL/.1 low. The LOCAL/.1 term is used to enable a backplane receiver chip which allows the MC to take the DLP off-line (OFFLNE/O signal coming from the MC goes low).

If the MC takes a DLP off-line, it is unavailable to the host system. If the DLP is off-line it does not see any DC (Distribution Control Card) attempts at connection, and all DLP requests to the DC are inhibited.

The Maintenance Card always takes the data link processor off-line when maintenance routines are called for. This is done so that maintenance functions (such as single-pulse, and PROM verification) do not interfere with normal distribution control card operations to the on-line data link processors. The logic term LOCAL/.1, when low, is also used to enable the following functions:

1. It allows GPRIF/.0 (from the Maintenance Card) to turn off the data link processors peripheral interface.
2. It becomes LOCAL/ which is used by the peripheral dependent board PDB for bus interface directional control logic.
3. It is used to allow the Maintenance CARD (MC) local clear and PROM verification (SW1/) function.
4. It is used by the Common Front End Card (CFE) for the development of the clock-enable term CLKEN.

DISTRIBUTION CARD CONNECTION: The following discussion involves the connection mechanism as used by the Distribution Control Card/Common Front End Card interface (DC/CFE) when the Distribution Control Card requires connection to a data link processor. This connection will be initiated by a Distribution Control Card (DC) poll test or by a data link processor (DLP) initiated poll request. The connection logic is shown in FIG. 4D.

The CONST lines 4–7 are fed as input to a 4-bit binary counter J3-C. The output of this counter is fed to a tri-state inverter C4-C to provide, as output, the "status" lines LCPSTU--. The data link processor address LCPADn/O and the off-line signal OFFLN provide inputs to buffer chip M5-C whose output is fed through inverter P4-C to form the LCPAD signal to NAND gate M3-C. NAND gate M3-C also has signal inputs for parity error (PERF/) and off-line (OFFLN/). The output of NAND M3-C is the signal CONECT/ which connects to the PDB bus directional control PROM and also provides inputs to inverters C4-C, C4-C1, E4-C and also to the buffer F4-C. The CONECT/ also is formed as input to NAND B3-C having an output which is fed to NOR gate A4-C. The NOR gate A4-C is fed to inverter B4-C to form the logic control signal CLRD. The outputs of the inverter C4-C1 form the signal IOSND/.O (input-output send) and the signal LCPCON/O (data link processor connected). The buffer F4-C provides a distribution card strobe output and a distribution card terminate signal. The inverter E4-C provides a strobe level signal LCPSTL/O (data link processor strobe level).

The Distribution Control Card (DC) will attempt to connect to a data link processor (DLP) by driving the appropriate DLP address line (LCPADn/O) low. This backplane signal is applied to a buffer chip (M5-C)

which is enabled when the data link processor (DLP) is on-line. The output of the buffer chip is then fed through an inverter (P4-C) and applied to a 3-legged NAND gate (M3-C) to become the term-CONECT/. This CONECT/ term is used to enable the following set of signals on the DC/CFE interface:

1. LCPCON/O. This line goes low when the DLP is connected.
2. LCPSTUn/O. These are the four data link processors status lines.
3. IOSND/.O. This is the state of the I/O-send flip-flop.
4. LCPSTL/O. This is the data link processor strobe signal.
5. STIOL/.O. This is the host system strobe signal.
6. TERM/.O. This is the host system terminate signal.
7. SELCLR/O. This is the Distribution Card (DC) to the data link processor (DLP) selective clear signal.
8. DATAxn/O. This is the 17-bit data bus.

All these backplane signals are low active and are enabled only when (a) the CFE is properly addressed by the Distribution Control Card (DC) and (b) a connection is possible, that is, when the data link processor is on-line, and there is no PROM parity error. The actual state of the enabled lines is dependent upon the logical condition of the data link processor and the Distribution Control Card (DC) at the time of the connection.

DATA LINK PROCESSOR REQUESTS: A DLP request is the method by which a data link processor can notify the Distribution Control Card that it needs host system attention. A request can be considered to be a DLP interrupt (REQ) to the Distribution Card (DC).

A DLP request is made to the Distribution Control Card when the DLP drives it jumpered request line (LCPRQn/O) low, or when the DLP drives its jumpered request line and EMRREQ/O (emergency request) low. Both types of these requests can be generated on the Common Front End Card (CFE) by the PROM stored micro-code program. When the micro-code program drives the PROM output line #LDINT/ (load interface) low, the signals #CONST1 (for emergency request), and #CONST2 (for request) are loaded into a register called the request latch 19 (FIG. 4A) at CLK8/time. Combinational type logic on the Common Front End allows "emergency request" to be enabled on the backplane anytime it occurs, if the data link processor is "on-line". If a DLP issues an emergency request, it also issues a non-emergency request. This is done so that the Distribution Control Card can determine which DLP is doing the emergency-requesting.

The backplane line EMRREQ/O is common to all data link processors in the base module, and the LCPRQn/O lines are each unique. If a data link processor issues a non-emergency request, it is "enabled" on the backplane only if the data link processor is on-line and no other data link processors in the base module are doing any emergency requesting.

DATA LINK PROCESSOR DATA TRANSFER RATE: Two possible modes of operation govern the data transfer rate between the data link processor DLP and the main host system 10. These modes are called (a) demand mode and (b) burst mode.

Demand mode causes data transfers to occur at a rate of less than four megahertz. Burst mode permits data word (16-bit) transfers to occur at a four megahertz rate, that is, 64 megabits per second.

The data link processor (DLP) and the Distribution Control Card (DC) send "strobe acknowledge" signals back and forth to each other when they present or accept data. The DLP sends the term LCPSTL/O (DLP strobe level) to the Distribution Control Card, and the Distribution Control Card sends STIOL/.O to the data link processor. These strobing signals are exchanged during both the demand mode and the burst mode operations. The data transfer rate is determined by the speed at which these strobe signals are exchanged. FIG. 4E shows a data transfer timing diagram from the Distribution Control Card (DC) to the data link processor. The Common Front End Card (CFE) receives a STIOL/.O signal from the Distribution Control Card, and synchronizes it with the 8-megahertz clock by the use of a Schottky J-K flip-flop whose outputs are named AF (asynchronous flop) and AF/. The synchronized strobe level AF is used on the Common Front End Card for PROM address bit A0 micro-code testing. The AF/ signal is available for use on the peripheral dependent board (PDB) by way of a foreplane connector pin.

DEMAND MODE: During buffer loading operations, the Distribution Card (DC) informs the data link processor that data is available by driving STIOL/.O low. The data link processor micro-code program informs the Distribution Card that it has accepted the data that is on the Distribution Card interface line by driving the PROM logic term #LCPSTL/ low.

LCPSTL/ becomes LCPSTL/O to the Distribution Card and causes the Distributon Card (DC) to drive the STIOL/.O high until the next new word of data is available.

During buffer read operations, the Distribution Card informs the data link processor that it is ready to accept new data by driving STIOL/.O low. That data link processor micro-code instructions inform the Distribution Card that new data is available on the Distribution Card interface line by driving the PROM logic term #LCPSTL/ low. #LCPSTL/ becomes LCPSTL/O to the Distribution Control Card. The Distribution Card informs the data link processor that it has accepted the data by driving the STIOL/.O high.

The direction of the data flow is controlled by the PROM output term #CONST3. The term #CONST3 is clocked into the request latch 19 at PROM signal #LDINT/ (Load system interface) time and becomes IOSF (I/O send flop). The state of IOSF is sent to the Distribution Control Card as IOSND/.O, and is used to inform the Distribution Control Card of the interface bus line direction. The state of IOSF is also sent to the peripheral dependent board (PDB) 80. The PDB 80 uses IOSF to assist in developing the interface bus line directional control logic. This logic determines which data link processor bus is active and what drivers or receivers must be used.

CLEAR FUNCTIONS: The CFE card $10_c$ makes use of combinational type logic to implement its clearing functions. A description of clearing functions applicable to all data link processors using the Common Front End Card follows: Power-up Clear: A power-up clear signal is provided to the base module from either the power supply of the cabinet or from some external source as determined by the host system 10. This signal is attached via coaxial cable to a pin of the maintenance card backplane connector. The Maintenance Card uses this signal to create the master clear, MSTCLR/O. The signal MSTCLR/O clears all data link processors that are on-line.

Base Clear: The base clear function is provided by a pushbutton switch located on the Maintenance Card foreplane connector. The switch is ORed with the power-up clear and performs the same function as a power-up clear.

Maintenance Local Clear: If the Maintenance Card is connected to a data link processor, the Maintenance Card can clear the data link processor by driving LCLCLR/O low (clear level from Maintenance Card).

Host System Master Clear: The host system 10 can issue a master clear signal across its message level interface 15$_i$ (MLI). The Distribution Control Card (DC) contains a host system jumper option which, if installed, causes the master clear (MSTCLR/O) to go "low". This signal clears all the data link processors that are not addressed by the Maintenance Card. If the Distribution Control Card host system option jumper is not installed, then the host master clear signal is not passed through the Distribution Control Card to the backplane.

Host System Selective Clear: The host system 10 can clear a single data link processor during a standard poll test operation by driving the message level interface (MLI) line TRM+Mc/1 low. This action causes the Distribution Card to drive SELCLR/O low. The SELCLR/O being "low" causes the connected data link processor to clear.

FIG. 3 shows in schematic form the physical structure of the Common Front End (CFE) card 10$_c$ while FIG. 4A shows the basic circuit block diagram of the Common Front End Card. Included in the CFE is the clear circuitry shown in FIG. 4B. It will be seen that NOR gate 113 has inputs from NAND gates 110 and 111 in addition to an input from inverter 114 which is fed by buffer 112. The output of gate 113 is fed to buffer 115 and also to inverter 116. Inverter 116 feeds its signal to a Schottky data register chip 117 which provides an output to the PROM address multiplexer 12 of FIG. 4A. The output of data register 117 is also used to provide one of the inputs to NAND gate 118.

A "low" signal which results on the output of the NOR gate 113 occurs if any one of the following conditions is met:
1. MSTCLR/O and OFFLN are both "low".
2. SELCLR/O and CONECT/ are both low.
3. LCLCLR/O and LOCAL/ are both low.

The "low" output of NOR gate 113 is used to perform the following functions:
1. The output is fed through a buffer chip 115 to become signal CLR/. CLR/ clears the PROM parity error flip-flop (and flip-flops SOTB, AF, and TERMF) on the CFE 10$_c$.
2. CLR/ is sent to the peripheral dependent board (PDB) 80 to clear the specific peripheral-dependent logic.
3. The low output signal of NOR gate 113 is sent through an inverter 116 and is applied to one input of the data register chip 117. It is sent as the logic term CLRD. The signal CLRD is double synchronized with CLOCK/ and becomes the signal SCLR (synchronized clear).
4. The signal SCLR from register 117 is used to force the PROM clock-disabling term CLKST (clock stop) "low". This is done in the event that a PROM parity error may have caused CLKST to go high.
5. The SCLR signal is used to disable the PROM address multiplexer chips 12. This forces the PROM address lines to all zeros. Address zero is the starting address of all data link processor micro-code programs.

CFE CLOCK CONTROL: The clock control logic in the CFE 10$_c$ uses combinational type logic (NAND gates, NOR gates, inverters, buffers, and a Schottky data register chip), in order to enable or disable the always-present 8-megahertz backplane clock (CLOCK...O). The circuitry for the CFE clock control is shown in FIG. 4C. The CFE clock control logic constantly monitors the state of the maintenance bus 30 to determine how it should supply clock signals to the data link processor. In Table VII there was shown the available clock control options and the maintenance bus line states that are necessary to cause the various options to be active. Table VIII showed the maintenance lines for driving the PROM address lines A0-A9.

In the CFE clock control circuitry shown in FIG. 4C, it will be seen that the NAND gate A3 has three inputs and the NAND gate 13-1 has four inputs. The first input to NAND gate A3 is from the data register C3 along the SCLR line. The second input to gate A3 is the line PERF/. The PERF signal is the PROM parity flip-flop signal. When "high", it indicates that an error has been detected on the PROM output register 14, thus stopping the DLP clock. The PERF/ signal is the complement of PERF. The third input to gate A3 is from the PROMCLK/ output of NOR H4-1.

The first input to gate 13-1 is the SCLR line. The second input to gate 13-1 is the PERF/ line. The third input to gate 13-1 is from the CLKEN line and the fourth input to gate 13-1 is the output of the buffer N5-1.

The NAND gate M3 has one input from inverter P4 (ADLOC) and another input coming from the inverter B4-1 (BASLCL/O).

The input for the data register C3 comes from NOR gate A3-2 which has one input from inverter B4, one input coming from NOR gate A3-1, and one input coming from the line START/.O. The NOR gate A3-1 has two inputs, one of which is the line BASLCL/O and the other input is the line LOCAL/.1.

The output of gate A3 is fed to the input of NOR gate H4-1. The output of NAND gate 13-1 is fed to the input of NAND gate H4-13. The output of inverter H5 (CLOCK...O) is fed to both the input of gate H4-2 and gate H4-13.

The output of gate A3 is fed to the input of NOR gate H4-1 to form the signal line PROMCLK/. The output of NAND gate H4-13 is fed to buffer 14-1 and to buffer G4. NORMAL ON-LINE MODE: When certain of the following conditions are met, then all data link processor clocks are active at the 8-megahertz rate. These conditions are:
1. BASLCL/O is high (the base module is not in local).
2. LOCAL/.1 is high (the DLP is not Maintenance Card (MC) addressed).
3. PERF/ is high (no PROM parity error). The signals BASLCL/O and LOCAL/.1, both being "high", causes a "high" on to one input of the Schottky data register C3. This register chip is clocked by the always-present signal CLOCK/. This signal is derived from the backplane clock signal CLOCK...O after a triple inversion. One output of the register chip C3 becomes the logic term clock enable (CLKEN). The signal clock enable is NANDed on two gates (A3-4 and 13-1) using the signals FERF/, SW1/, and the output of NAND gate M3. Gate M3 has inputs which are:

a. The signal ADLOC/ (after inversion). The ADLOC/ is low when the DLP is not addressed by the MC, or when ADRVLD/O is high.

b. The backplane signal BASLCL/O (after inversion).

The output of NAND gate A3-4 becomes the signal logic term B (P-CLKEN) and this is NANDed with the signal CLOCK...O (after inversion by inverter H5 which is fed as one input to gate H4-2). The output of gate H4-2 is fed through a NOR gate H4-1 to form the signal PROMCLK/. This signal PROMCLK/ is used to clock the PROM date registers 14 and the stack register 11 of FIG. 4A.

The output of NAND gate 13-1 becomes the signal CLKEN/. This signal CLKEN/, when "low", enables the 8-megahertz backplane clocks on the peripheral dependent board, PDB 80.

The CLKEN/ signal is NANDed with the signal CLOCK...O (after inversion) at the gate H4-13. The output of gate H4-13 is fed through one inverter buffer 14-1 and also through one non-inverting buffer G4 to become the signals respectively CLK8/ and CLK8 (8-megahertz clock). These clock signals are used in the Common Front End Card 10$_c$. STANDARD LOCAL MODE: The standard local mode of "maintenance" is operative under the following conditions: (Also see Table VII).

1. BASLCL/O is high (base is not in local).
2. ADRVLD/O (address valid) is low: and the LOCnn/.O lines on the maintenance bus are valid.
3. The LOCnn/.O lines equal the local address jumpers on the CFE 10$_c$. This equal comparison together with the ADRVLD/O being low, forces LOCAL/.1 into low. LOCAL/.1 low means that the DLP is "Maintenance Card addressed".

In this mode all the maintenance functions are available; for example, the Maintenance Card can now:

1. Select the single-pulse mode.
2. Perform PROM micro-code verification.
3. Set up known conditions by manipulating the PROM address during single-pulse operations, and test for known predicts results by sampling the maintenance bus display (DPLY) and the data simulate (DSIM) lines.

SINGLE-PULSE MODE: After the Maintenance Card has localized the data link processor (DLP), it can place the DLP in a single-pulse mode by driving the signal SP...O into "low". This action forces the logic term CLKEN into "low" because the NOR gate A3-2 of FIG. 4C is disabled by the following logic:

1. Signal SP/...O is inverted into "high" and disables the top input line of gate A3-2.
2. The signal LOCAL/.1 is low because the DLP is not Maintenanced Card addressed. This action disables the middle input line of gate A3-2 because of the high signal output of gate A3-1. The signal START/.O is high and disables the third input of gate A3-2. When gate A3-2 is disabled, a low signal is set into the data register C3 at CLOCK/time. The output signal CLKEN, when low, turns off NAND gates A3-4 and 13-1, and causes their outputs to go high and to disable the NAND gates H4-2 and H4-13. When these two gates are disabled, the DLP clocks are turned off.

Once the DLP is placed into a single-pulse mode, the Maintenance Card can issue from 1 to 4,096 clocks by driving the START/.O low. START/.O is a pulse which effectively is a window around a desired number of clocks that the Maintenance Card wants issued. During the time frame when START/.O is low, the high signal output of gate A3-2 is clocked into the data register C3 by the always-present clock signal CLOCK/. The CLKEN now becomes a pulse rather than a level, and the DLP clocks are enabled only during the low active time span of START/.O.

After the data link processor (DLP) has been placed into the single-pulse mode, the Maintenance Card can take the DLP out of it by driving SP/...O high. The signal SP/...O, when high, forces a high level input into register C3 as follows (FIG. 4C): The signal SP/...O is inverted low by the inverter B4. This low signal is fed into NOR gate A3-2 and causes its output to go high. This high level is clocked into data register C3 with CLOCK/ and becomes CLKEN. The signal CLKEN, when high, enables all the data link processor's clocks.

PROM MICRO-CODE VERIFICATION: If the Maintenance Card has localized and placed the data link processor into the single-pulse mode, it can read any Common Front End PROM micro-code word by driving the signal SWH.1/.O low. The signal SWH.1/.O is routed through the buffer N5-1 (FIG. 4C) to become the logic term SWa/. This signal SW1/ is sent to the peripheral dependent board PDB 80 and is used in the bus interface directional control logic in order to develop the logic term SIMRCV/, (Simulate Receive, FIG. 4A, line 33). When SIMRCV/ is low, the maintenance bus lines DSIMnn/O of Table III are gated into the inputs of PROM address multiplexer chips 12 of FIG. 4A. The SW1/ also forces the PROM address multiplexers 12 to select the DSIMnn/O data as the actual PROM address. This way the Maintenance Card controls the current PROM address. SW1/ is also tied to one of the inputs of NAND gate 13-1, FIG. 4C, and is used to keep the clock signals CLK8/, CLK8, and the clock-enable signal CLKEN/ (to the peripheral dependent board 80) turned off:

When the Maintenance Card issues a single pulse clock, the PROMCLK/ latches the addressed PROM data into the PROM registers 14 (FIG. 4A) because SW1/ is not tied to the NAND gate A3. The Maintenance Card now has the current PROM word available for sampling. The Maintenance Card can now read the PROM data (8-bits at a time) by driving the maintenance bus lines DSELn/.O. The DSELn/.O lines 34, FIG. 4A and Table III, are used on the CFE 10$_c$ to select which 8 data bits will be enabled onto the maintenance bus lines DPLYnn/O, at 40 of FIG. 4A. Seven reads are required to sample one entire micro-code address.

LOCAL MODE WITH BASE IN LOCAL: Under certain conditions the maintenance mode is operatively in effect; these conditions are:

1. BASLCL/O is low (the base is in local).
2. ADRVLD/O is low (that is, the LOCnn/.O lines on the maintenance bus are valid).
3. The LOCnn/.O lines equal the local address jumpers on the CFE 10$_c$. This equal comparison, along with ADRVLD/O low, forces LOCAL/.1 low also. LOCAL/.1, when low, means that the data link processor DLP is being Maintenance Card addressed. This mode of operation causes the addressed data link processor to function in exactly the same manner as the standard local mode. All unaddressed DLPs disable their own clocks.

BASE MODULE IN LOCAL MODE AND DLP CLOCKS DISABLED: This is a mode of operation which takes place when the following conditions are satisfied:
1. BASLCL/O is "low" (the base is in local).
2. ADRVLD/O is low (the LOCnn/.O lines are valid).
3. The LOCnn/.O lines do not equal the CFE local address jumpers. This "unequaled" comparison along with ADRVLD/O being low, forces LOCAL/.1 high and ADLOC/ low. The LOCAL/.1 when high, means that the DLP is not Maintenanced Card address.

In this mode all the DLP clocks are disabled because the BASLCL/O low level is inverted by the inverter B4-1 (FIG. 4C). This level "high" is NANDed by gate M3 with the inverted ADLOC/ signal (inverted by P4). When both inputs to gate M3 are "high", the output goes low and disables the NAND gate A3-4 and 13-1. The outputs of these gates both go high and disable the gate H4-1 and H4-13. When these two gates are disabled, all the DLP clocks are inhibited.

BASE SINGLE-PULSE: The single-pulse maintenance mode is in effect when the following conditions occur:
1. BASLCL/O is "low" (the base is in local).
2. ADRVLD/O is high (that is, the LOCnn/.O lines on the maintenance bus are invalid).

In this mode of operation the Maintenance Card can place the entire base in a single-pulse mode by driving the logic as follows:
1. SP/...O low -- this action disables the top input of the NOR gate A3-2.
2. BASLCL/O is low. This action puts the base in local and causes the output of NOR gate A3-1 to go high. This high level disables the middle input line of NOR gate A3-2.
3. START/.O high disables the bottom input of NOR gate A3-2.

When NOR gate A3-2 (FIG. 4C) is disabled, its output goes low. This low output is latched into the data register C3 and becomes the logic term CLKEN. This clock enable line, when low, disables NAND gates A3-4 and 13-1. The outputs of these NAND gates go high and disable the gates H4-1 and H4-13. When the gates H4-1 and H4-13 are disabled, then all DLP clocks are inhibited.

The "base single-pulse" maintenance mode of operation will make all data link processors respond to single-pulse because ADRVLD/O is high and BASLCL/O is low. The signal ADRVLD/O when high, disables the tri-state 8-2-1 multiplexer chip (12, FIG. 4A) on the CFE that is used to generate the logic terms LOCAL/.1 and ADLOC/. When this multiplexer chip is disabled, both signals are pulled up high with 1100 ohm resistors to +5 volts. ADLOC/, when high, (after inversion to "low" by the inverter P4, FIG. 4C) disables the NAND gate M3. The high level output of gate M3 allows the single-pulse clock to be enabled when the Maintenance Card drives the signal START/.O low. Further description of the single-pulse operation has been previously described in the "standard local mode" of operation.

STACK REGISTER OPERATION: The operation of the stack register 11 (FIG. 4A) is controlled by the state of a PROM 13 output signal line #LDSTCK/. The signal #LDSTCK/ is held low during non-subroutine micro-code instructions. This low level is applied to the low-enable inputs of the 3 stack register chips 11. This action causes the stack register 11 to load and hold the current PROM micro-code address.

All micro-code programs have the ability to enter one level of subroutine by driving and holding the signal #LDSTCK/ high. With #LDSTCK/ going high, the following actions will occur:
1. The stack register load function is disabled.
2. The stack register count function is enabled.

The signal #LDSTCK/ of FIG. 4A is also routed through a Schottky data register chip to become the logic term STCLKEN/. This signal is then inverted and used to count up the stack register plus one. This address is held in the register until the subroutine is completed. This updated address is used when the subroutine does a stack branch to return to the main body of the micro-code instructions. The non-subroutine code is then re-entered and the signal #LDSTCK/ goes low.

MAINTENANCE DISPLAY LINES OF COMMON FRONT END (CFE): The CFE 10c contains standard items such as inverting tri-state buffers and eight-to-one multiplexer chips that are used to enable the maintenance display lines 40 of FIG. 4A (DPLY01-/O-DPLY10/O). The lines 40 are shown with a /10 to indicate the 10 individual lines which compose this group of lines. Table IX lists the various individual display lines (DPLY01/O-DPLY10/O).

TABLE IX

| | CFE Signals Displayed with Given Display Select Codes | | | | | | | | |
|---|---|---|---|---|---|---|---|---|---|
| Maintenance | DSEL8/,DSEL4/,DSEL2/,DSEL1/Values* | | | | | | | | |
| Display Lines*** | (GRPO/ = 0) 1111** | 0111 | 0110 | 0101 | 0100 | 0011 | 0010 | 0001 | 0000 |
| DPLY01/0 | STCKA9 | * | * | * | * | * | * | * | * |
| DPLY02/0 | STCKA8 | * | * | * | * | * | * | * | * |
| DPLY03/0 | STCKA7 | AF | #LDINT/ | #K1 | #NEXT8 | PER | #CONST7 | #I1 | #NEXT7 |
| DPLY04/0 | STCKA6 | TERMF | #LDSTCK/ | #K2 | #BRANCH1 | PERF | #CONST6 | #I2 | #NEXT6 |
| DPLY05/0 | STCKA5 | REQ | #G3. | #K3 | #BRANCH2 | SCLR | #CONST5 | #I3 | #NEXT5 |
| DPLY06/0 | STCKA4 | EMREQ | #G4 | #K4 | #BRANCH3 | CLKEN | #CONST4 | #I4 | #NEXT4 |
| DPLY07/0 | STCKA3 | A3 | #H1 | #L1 | #BRANCH4 | NEXT9 | #CONST3 | #J1 | #NEXT3 |
| DPLY08/0 | STCKA2 | A2 | #H2 | #L2 | #BRANCH5 | LCPADF | #CONST2 | #J2 | #NEXT2 |
| DPLY09/0 | STCKA1 | A1 | #H3 | #L3 | #LCPSTL/ | STOPB | #CONST1 | #J3 | #NEXT1 |

TABLE IX-continued

| Maintenance Display Lines*** | CFE Signals Displayed with Given Display Select Codes DSEL8/,DSEL4/,DSEL2/,DSEL1/Values* | | | | | | | |
|---|---|---|---|---|---|---|---|---|
| | (GRP0/ = 0) 1111** | 0111 | 0110 | 0101 | 0100 | 0011 | 0010 | 0001 | 0000 |
| DPLY10/0 | STCKA0 | A0 | #H4 | #L4 | #PARITY | CLKST | #CONST0 | #J4 | #NEXT0 |

NOTES:
1 = HIGH
0 = LOW
*Maintenance display line not driven by CFE with this display select code.
**With this display select code, the CFE also drives DSTAT8/0-DSTAT1/0,DLCPST/0, and DIOSND/0 (MC Group 24).
***Signals are low true on backplane.

The Common Front End also has the ability to display signals on the lines DSTAT8/0-DSTAT1/0 (Glossary Table I), which are the data link processor "status lines" to the Maintenance Card. The CFE also can display DLCPST/0 (the data link processor strobe to the Maintenance Card) and also the DIOSND/0 (which is the SEND level of I/O to the Maintenance Card). All of these lines are used by the Maintenance Card (as 20$_{0m}$) to test and verify the operation of the CFE card. The DSEL8/0 lines (multiplexer chip select line for input to the display lines)--DSEL1/O (multiplexer address line for data selection to display lines) are sent to the Common Front End card from the Maintenance Card and are used to select the CFE internal signals that are enabled on to the display lines after the data link processor has been addressed by the Maintenance Card. The Table IX shows a list of the displayable CFE signals and also the DSELn/O line codes that are required to enable them on to the maintenance display bus. PROM ADDRESS SELECTION: Referring to Tables Xa and Xb, the selection of micro-code addresses is implemented on the Common Front End card 10$_c$ which uses circuitry that employs standard logic gates, multiplexer chips, register chips and a decoder chip. The multiplexers 12 drive PROM address lines A0-A9 (FIG. 4A). This causes the micro-code data to be latched into the registers 14 with every 8-megahertz clock pulse.

TABLE Xa

| CFE PROM Address Selection | | | | |
|---|---|---|---|---|
| PROM Output Branch Lines (#BRANCHn) | | PROM Input Address Lines (An) | | See |
| BR6 | 54321 | 9-4 | 3-1 | % | Note |
| 0 | 00000 | #NEXTn | #NEXTn | #NEXT0 | 1 |
| 0 | 00001 | #NEXTn | #NEXTn | AF | 2 |
| 0 | 00010 | #NEXTn | #NEXTn | TERMF | 2 |
| 0 | 00011 | #NEXTn | #NEXTn | LCPADF | 2 |
| 0 | 00100 | #NEXTn | #NEXTn | STOPF | 2 |
| 0 | 00101 | #NEXTn | #NEXTn | TEST5 | 2 |
| 0 | 00110 | #NEXTn | #NEXTn | TEST6 | 2 |
| 0 | 00111 | #NEXTn | OPDECn | OPDEC1 | 3 |
| 0 | 01000 | #NEXTn | #NEXTn | TEST8 | 2 |
| 0 | 01001 | #NEXTn | #NEXTn | TEST9 | 2 |
| 0 | 01010 | #NEXTn | #NEXTn | TEST10 | 2 |
| 0 | 01011 | #NEXTn | #NEXTn | TEST11 | 2 |
| 0 | 01100 | #NEXTn | #NEXTn | TEST12 | 2 |
| 0 | 01101 | #NEXTn | #NEXTn | TEST12 | 2 |
| 0 | 01110 | #NEXTn | #NEXTn | TEST14 | 2 |
| 0 | 01111 | STCKAn | STCKAn | STCKA0 | 4 |
| - | 1--- | #NEXTn | #NEXTn | PDB MX | 5 |
| 1 | --- | #NEXTn | #NEXTn | PDB MX | 5 |
| SW1/ = 0 | | Maintenance Data Bus | | | 6 |

TABLE Xa-continued

| CFE PROM Address Selection | | | | |
|---|---|---|---|---|
| PROM Output Branch Lines (#BRANCHn) | | PROM Input Address Lines (An) | | See |
| BR6 | 54321 | 9-4 | 3-1 | % | Note |
| CLEAR | 0 | 0 | 0 | | 7 |

NOTES
1 = Unconditional branch.
2 = 2-way branch (TEST5-TEST14 from PDB).
3 = 16-way branch (OPDEC from PDB).
4 = Stack branch.
5 = 2-way branch (A0 is driven directly from the PDB).
6 = Maintenance Card PROM read mode.
7 = Clear forces zeros onto the PROM address lines.
1 = high.
0 = low.
- = don't care.

TABLE Xb

| Enable Lines for Expanded A0 Selection | | |
|---|---|---|
| PROM output branch lines (#BRANCHn) | | Enable line to Peripheral Dependent board for expanded |
| BR6 | 5 | 4 | selection of A0 |
| 0 | 0 | 0 | ... A0 is driven by multiplexors on CFE card |
| 0 | 0 | 1 | |
| 0 | 1 | 0 | SEL2 |
| 0 | 1 | 1 | SEL3 |
| 1 | 0 | 0 | SEL4 |
| 1 | 0 | 1 | SEL5 |
| 1 | 1 | 0 | SEL6 |

With reference to Table Xa showing the CFE signals, the primary multiplexer input-select lines are the current latched PROM outputs of #BRANCH1-#BRANCH5, Table IX and the signal term BR6 (Branch Line from PDB 80 for PROM address selection).

In order to accomplish Address Bit A0 Selection (at line 36, FIG. 4A): #BRANCH1-#BRANCH3 will select the input lines to two separate multiplexer chips. #BRANCH4, #BRANCH5 and BR6 is peripheral-type dependent and may be driven either by the PDB logic or by one of the latched PROM outputs. If a PROM output line is used to drive BR6 (Table Xb), it is sent over to the peripheral dependent board PDB 80 and then is returned as the BR6 line. There are 22 such lines, #G3-#L4, Table IX, which are available to the peripheral dependent board, PDB 80. These lines are primarily used for controlling the peripheral dependent logic on the PDB 80.

The #BRANCHn bits and BR6 are also used for the generation of PROM address lines A0-A9 (FIG. 4A). This is accomplished by the use of the term BROP (PROM address branch) and BRST (use stack register for PROM address). BROP is "high" whenever the #BRANCHn bits and the BR6 select a branch to one of 16 addresses (16-way branch). BRST is high when the #BRANCHn bits and BR6 select a branch that uses the stack register 11 as the address. If neither a 16-way or a stack register branch is selected, then either an unconditional or a two-way branch is performed.

PROM address selection can also be achieved by the use of the maintenance term SW1/, (FIG. 4C).

When the CFE $10_c$ is under the control of the Maintenance Card and the MC drives SW1/ "low", the MC can address and read any micro-code address. This feature is utilized to read and verify the contents of the PROM matrix and to test the integrity of its associated registers.

The #BRANCHn bits and the BR6 are overridden whenever a master, selective, or local clear is issued to the CFE $10_c$. Any clear condition forces the PROM address bus (A0–A9, FIG. 4A) to equal 0. The address bus A0–A9 is defined in Glossary Table I. Address 0 is the starting point of all micro-code programs.

As will be seen in Table Xa, there is a listing of all the possible branching conditions that can be used for the generation of the next PROM address. Table Xb shows a list of five CFE generated enable lines that can be used for an expanded selection of PROM address bit A0. These enable lines are activated when the PDB 80 requires additional two-way branching capabilities.

PROM PARITY CHECKING: The CFE card $10_c$ performs an odd parity check on every 49-bit PROM micro-code word. The total word length is actually 52-bits but the three most significant bits are not used by the micro-code program. These three bits are not parity checked.

The currently addressed micro-code word is latched into the register chips 14 and from these register chips is fed into cascaded parity checking chips 18 of FIG. 4A. Thus, this circuitry allows the CFE $10_c$ to examine the entire 49-bit word at one time. If the sum total of the word equals "even" parity, then the logic term PER (parity error) goes high. PER going "high" causes the parity error flip-flop of 18 to be set on the next 8-megahertz clock pulse. The setting of the parity error flip-flop causes the logic term PERF/ to go "low".

PROM PARITY ERROR: If "even" PROM parity is detected by the CFE card, the logic term PER goes "high" and causes the PROM parity error flip-flop to set. At the same time that PER goes high, then PER/ goes low. PER/ going low causes the logic term CLKST (clock stop) to go high. CLKST going "high" disables the clock that controls the latching of the PROM register chips (PROMCLK/). The disabling of PROMCLK/ causes the data (that caused the parity error) to remain in the registers 14. The disabling of PROMCLK/ also locks the stack register 11 to its current value. If the parity error flip-flop gets set, then the logic term PERF/ goes low on line 41 of FIG. 4A. The PERF/ going "low" causes the following actions to occur.

1. PERF/ is routed to the peripheral dependent board PDB 80 to turn off the peripheral device. The PERF/ "low" signal disables SCCL (Start Card Cycle Level, Table V) to Card Reader 50C. This insures that no more cards will be read until the CR-DLP has been cleared by instructions from the host system 10. PROM register 14 is disabled by PERF/ via AND gate 24 as seen in FIG. 4A so that the micro-code comes to a stop.
2. The request latch 19 on the CFE card is cleared. This action causes the I/O SEND flip-flop, REQ (request), and EMRREG (emergency request) signals from Drivers 20 to turn "off".
3. The logic term CONECT/ is forced high. This action prevents any distribution card (DC) connection and severs any DC connection that may have been in progress at the time of the error.
4. The peripheral dependent board 8-megahertz clock is turned off. PERF/ going low forces the logic term CLKEN/ high. CLKEN/ is used by the PDB 80 to permit 8-megahertz clocks.
5. The CFE 8-megahertz clocks (CLK8 and CLK8/) are turned off.

If a PROM parity error disables (locks up) a data link processor, the error condition can be removed through the use of a base power-up clear, a Maintenance Card base clear, a Distribution Card Master Clear or a Maintenance Card initiated DLP local clear.

The Card Reader-Data Link Processor (CR-DLP) controls information transfer between card readers such as the Burroughs 300/600/800 card per minute 80 column card reader and a main host computer system. This data link processor is compatible with systems which use the message level interface ($15_i$, FIG. 1) as described in detail in the cases mentioned under the heading of Cross References to Related Applications.

The Card Reader-Data Link Processor receives I/O descriptors (commands) from a main host system 10 (FIG. 1) and executes the operation described by the I/O descriptor. After completion of the operation, a result descriptor (R/D) is returned to the host system for reporting the status of the operation. Vertical and longitudinal parity checks are made on all descriptor information transmitted. If a parity error is detected on transmission of the descriptor information, the DLP (data link processor $20_{03}$, FIG. 1) branches to the result descriptor status in order to report a descriptor error and the appropriate parity errors.

The Card Reader-Data Link Processor accepts card image data from the card reader (50 C, FIG. 1) and stores this data in its memory buffer. The data link processor then does all the required validity checking and then translates the received card data into 8-bit EBCDIC code, or else formats the binary data for transmission to the host system 10. In the EBCDIC read mode, the 12-bit EBDCIC card code is translated into 8-bit EBCDIC.

In the standard "read" mode, one of the following optional card codes is translated into 8-bit EBCDIC:
1. BCL card code
2. ICT card code
3. BULL card code Each of the above codes are optional installations and any single Card Reader-Data Link Processor will contain one and only one of these options.

In the binary "read" mode, the data link processor accepts card image data and transmits either contiguous binary or two 8-bit binary characters with the two most significant bits of each character being zero.

In the EBCDIC and the standard read modes, the data link processor recognizes any invalid character in card column one as a "control" character and sets the control character bit in the result descriptor.

As a result of receiving I/O command descriptors from the host system, the Card Reader-Data Link Processor is capable of executing a number of I/O operations. The four digits of the I/O descriptors provide a bit format which is shown in Table XI herein below.

TABLE XI

| Operation | Digit Bit | A 8 | 4 | 2 | 1 | B 8 | 4 | 2 | 1 | C 8 | 4 | 2 | 1 | D 8 | 4 | 2 | 1 |
|---|---|---|---|---|---|---|---|---|---|---|---|---|---|---|---|---|---|
| Read DLP Buffer | | 1 | 0 | 0 | 0 | 0 | 1 | X | X | 0 | 0 | 0 | 0 | Reserved | | | |
| Binary Unpacked | | 1 | 0 | 0 | 0 | 0 | 1 | X | X | 0 | 0 | 0 | 1 | Must be "0" | | | |
| Binary Packed | | 1 | 0 | 0 | 0 | 0 | 1 | X | X | 0 | 0 | 1 | 0 | | | | |
| Standard | | 1 | 0 | 0 | 0 | 0 | 1 | X | X | 0 | 1 | 0 | 0 | | | | |
| EBCDIC | | 1 | 0 | 0 | 0 | 0 | 1 | X | X | 1 | 0 | 0 | 0 | | | | |
| Read Card Standard | | 1 | 0 | 0 | 0 | 1 | 1 | 0 | 1 | 0 | 0 | 0 | 0 | | | | |
| Read Cards Standard | | 1 | 0 | 0 | 0 | 1 | 1 | 1 | 1 | 0 | 0 | 0 | 0 | | | | |
| Read Card Binary Unpacked | | 1 | 0 | 0 | 0 | 1 | 0 | 0 | X | 0 | 0 | 0 | 0 | | | | |
| Read Cards Binary Unpacked | | 1 | 0 | 0 | 0 | 1 | 0 | 1 | X | 0 | 0 | 0 | 0 | | | | |
| Read Card Binary Packed | | 1 | 0 | 0 | 0 | 1 | 0 | 0 | X | 0 | 0 | 1 | 0 | | | | |
| Read Cards Binary Packed | | 1 | 0 | 0 | 0 | 1 | 0 | 1 | X | 0 | 0 | 1 | 0 | | | | |
| Read Card EBCDIC | | 1 | 0 | 0 | 0 | 1 | 1 | 0 | 0 | 0 | 0 | 0 | 0 | | | | |
| Read Cards EBCDIC | | 1 | 0 | 0 | 0 | 1 | 1 | 1 | 0 | 0 | 0 | 0 | 0 | | | | |
| ECHO/Standard | | 0 | 0 | 0 | 1 | 1 | 1 | X | 1 | 0 | 0 | 0 | 0 | | | | |
| ECHO/Binary Unpacked | | 0 | 0 | 0 | 1 | 1 | 0 | X | X | 0 | 0 | 0 | 0 | | | | |
| ECHO/Binary Packed | | 0 | 0 | 0 | 1 | 1 | 0 | X | X | 0 | 0 | 1 | 0 | | | | |
| ECHO/EBCDIC | | 0 | 0 | 0 | 1 | 1 | 1 | X | 0 | 0 | 0 | 0 | 0 | | | | |
| Test | | 0 | 0 | 1 | 0 | 1 | 0 | 0 | 1 | 0 | 0 | 0 | 0 | | | | |
| Test/Ignore Data To EOF (Standard) | | 0 | 0 | 1 | 0 | 1 | 0 | 1 | 1 | 0 | 0 | 0 | 0 | | | | |
| Test/Ignore Data To EOF (EBCDIC) | | 0 | 0 | 1 | 0 | 1 | 0 | 1 | 0 | 0 | 0 | 0 | 0 | | | | |
| Test/Wait For Ready | | 0 | 0 | 1 | 0 | 0 | 0 | X | X | 0 | 0 | 0 | 0 | | | | |
| Test/Wait For Not Ready | | 0 | 0 | 1 | 0 | 0 | 1 | X | X | 0 | 0 | 0 | 0 | | | | |
| Test/Conditional Cancel | | 0 | 0 | 1 | 0 | 1 | 0 | 0 | 0 | 0 | 0 | 0 | 0 | | | | |
| Test/I.D. | | 0 | 0 | 1 | 0 | 1 | 1 | X | 0 | 0 | 0 | 0 | 0 | | | | |

NOTE
X = "don't care"

The OP codes and variants for valid operations of the Card Reader-Data Link Processor (CR-DLP) are provided for as follows:

Read: Any operation where data is transmitted from the DLP memory buffer to the main host system.

Test: Any operation where no data transfer takes place between the DLP and the host system.

Echo: This is an operation which permits the DLP to receive a buffer full of data from the host system and to immediately return this data in order to permit a confidence check of the data transmission path.

It should be noted that a "write" operation is invalid for the Card Reader-Data Link Processor since only "read" operations are used. Any attempt to "write" or execute other invalid operations will cause the data link processor to advance to the result descriptor status and to report a descriptor error.

Card Read Operations: The reading of cards is initiated by the descriptor from the main host system and is then terminated upon occurrence of conditions as follows:

1. Single Card Read: When 80 columns have been read and transferred; or when the specified buffer area in the host system has been filled.
2. Multiple Card Read: Upon recognition of a control character or a validity check error, then the reading is terminated at the end of the current card cycle in using EBCDIC or standard reads. Reading terminates in all cases if a peripheral device error occurs or if the allocated host system memory area is filled.

Read Card(s) EBCDIC: The data link processor for the card reader receives hole position data from the card reader. There are 256 valid codes including the punched card code for the graphic symbol "?".

The received card image data is translated into 8-bit internal EBCDIC for transmission to the host system 10. Each card column occupies one alphanumeric character position for DLP storage. 80 card columns are translated and transmitted as 40 words to the host system 10. If the DLP recognizes a "control character" in column 1, it will translate the character to an EBCDIC "?" for transmission to the host system and set the control character bit in the result descriptor (R/D). Should the DLP recognize an invalid character anywhere else on the punched card, it also translates the character to EBCDIC "?" and sets the validity check bit in the result descriptor. The reading of one or multiple cards is determined by the B2 variant, Table XI. Read Card(s) Standard: The data link processor receives hole position data from the card reader, translates it to 8-bit EBCDIC, and then transmits the data to the host system 10. One and only one of the standard code translators is installed (BCL, ICT, or BULL). A read of one or of multiple cards is determined by the B2 variant. Each card column occupies one alphanumeric character position in the DLP memory buffer, which is seen as RAM 22 in FIGS. 4A, 5 and 6. 80 card columns are translated and packed into 40 16-bit words to be sent to the host system 10. If an invalid character is recognized in card column 1, the control character result descriptor bit is set, and the EBCDIC "?" is stored. At any other card column position, recognition of an invalid character by the DLP causes the validity check bit of the result descriptor to be set and an EBCDIC "?" to be stored.

Read Card(s) Binary: All binary codes are valid in a binary read. Each card column contains two 6-bit binary characters. The DLP receives card image data from the card reader and stores this data into one of two formats as determined by the variant C2 of the I/O descriptor, Table XI.

Binary Unpacked or Binary Packed: For binary unpacked data, the two high order bits of each character sent to the host system 10 are always 0. The remaining 6-bits contain the binary image from the punched card. For binary packed data, 80 card columns of data are packed contiguously into sixty 16-bit words to be transmitted to the host system. There is no control character recognition or validity error check in the binary read mode. A read of one or of multiple cards is determined by the B2 variant. For binary unpacked data, 80 card columns are stored in eighty 16-bit words to be sent to the host system. For binary packed data, 80 card columns of data are packed contiguously into sixty 16-bit words to be transmitted to the host system.

Readout of the DLP Memory Buffer: The data link processor contains both untranslated and translated data from the last card read in its buffer memory storage area after the translated data has been sent to the host system. The "read DLP buffer" operation permits the host system to request the data to be retranslated as specified by the variant digit C. If the variant digit C is non-zero, the DLP retranslates the stored untranslated data and sends the retranslated data to the host system. For readout of the DLP buffer (in standard or in EBCDIC), the control characters and the invalid characters are flagged in the result descriptor (R/D). If the variant digit C is equal to zero, the data is not retranslated, but the translated data from the last card read that is in the DLP buffer storage area is sent to the host system. No card cycle occurs. Echo Operations: Echo operations receive data from the host system, translate the data into various formats, and then return the translated data back to the host system. This allows a degree of confidence in the data path to be programmatically built. It is also used to check the accuracy of the translator logics in the data link processor. Vertical parity on the data is checked, and also a full longitudinal parity check is made on all data by use of the longitudinal parity word (LPW).

Echo Standard: The Card Reader-Data Link Processor receives 80 data words and also the longitudinal parity word (LPW) from the main host system 10. The 80 data words are treated as 80 columns of standard card code (BCL, ICT, or BULL) and these are translated into 8-bit EBCDIC. The original 80 data words received are formatted like binary card read unpacked data. The two most significant bits of both characters are ignored, leaving the remaining 12 bits to correspond to the 12 card rows. The translated data, now 40 words, is returned to the host system.

Echo Binary: The Card Reader-Data Link Processor receives 80 data words plus the LPW from the host system in a binary unpacked format. The data words being returned to the host system can be formatted in 60 packed binary words or in 80 unpacked binary words depending upon the condition of the variant C2, Table XI.

Echo EBCDIC: The Card Reader-Data Link Processor receives 80 data words and also the LPW from the main host system. The 80 data words are treated as if they were 80 columns of EBCDIC card code and are translated into an 8-bit EBCDIC. The original 80 data words received are formatted like binary card read unpacked data. The two most significant bits of both characters are ignored leaving the remaining 12 bits to correspond to the 12 card rows. The translated data, now 40 words, is then returned to the host system.

Test Operations: A result descriptor (R/D) is returned to the host system 10 to indicate the condition of the data link processor and the card reader (ready, not ready, etc.).

Test Ignore Data To End-Of File (EOF): The data link processor causes multiple cards to be read but does not transfer the data to the main host system. The operation is terminated when the host system cancels the operation or when a card reader "exception condition" occurs (control character, validity check, not ready, read check). This operation allows a deck of cards to be cleared from the hopper by the execution of a single operation. The last card image read and its translation are retained in the DLP buffer storage.

Test Wait Ready: The data link processor is placed in an "enable" state and remains in this state until the card reader is made ready by the operator or until the operation is cancelled. If a card reader is in a ready state on receipt of this operation, the DLP branches and write an "operation complete" result descriptor. If the operator makes a peripheral ready when the DLP is in a test-wait-ready condition, the DLP reports that the operation is complete in its result descriptor. If the DLP receives a "conditional cancel" descriptor, the test operation is cancelled and the conditional cancel complete bit is set in the result descriptor.

Test Wait Not Ready: The "test wait not ready" operates the same as the "test wait for ready" except that the DLP waits for the "not ready" condition and then reports a "not ready" result descriptor.

Test Conditional Cancel: The conditional cancel operation cancels any operation and is used in test operations to cancel a test-wait-ready, test-wait-not ready, or test-ignore data to EOF (end of file) operation. If a valid conditional cancel operation is received while one of the above test operations is in progress, the test operation is terminated and the conditional cancel completed bit is set in the result descriptor. If one of the above test operations is in progress and an operation is received which is not a valid conditional cancel, the test operation continues and the descriptor bit is set in the result descriptor that is sent back to the main host system. Test ID: Upon receiving the test ID descriptor, the data link processor responds with one word of result descriptor followed by one word of ID and then the LPW for both words. On successful execution of the test ID operation, the "Result Descriptor" word will look as shown in the format below and is designated as the Test ID Result Word.

| DIGIT: | A | B | C | D |
|---|---|---|---|---|
| BITS: | 8 4 2 1 | 8 4 2 1 | 8 4 2 1 | 8 4 2 1 |
| CARD READER RESULT DESCRIPTOR | X 0 0 0 | 0 0 0 0 | 0 0 0 0 | 0 0 0 0 |

ID Word: The ID word is composed of a fixed byte for digits A and B in order to identify the "type" of DLP being used. Field-installed jumpers are used for digits C and D to uniquely and specifically identify the particular data link processor (DLP) to the main host system 10. The format of the ID word is shown hereinbelow:

```
        DIGIT:    A    B    C    D
         BITS: 8 4 2 1 8 4 2 1 8 4 2 1 8 4 2 1
CARD READER ID [0 0 0 0 0 0 0 1][* * * *][* * * *]
               └──────┬──────┘ └───┬───┘          ID Word
                  FIXED BYTE    FIELD JUMPERS
```
*JUMPERS Error Recovery: The Card Reader-Data Link Processor indicates error condition information in its result descriptor (R/D) sent to the main host system. Errors are logged in the host system maintenance log. Actual error recovery is dependent upon the type of failure; for example, a card jam requires operator intervention. A parity error on the message level interface $15_i$ may be recoverable by a reread of the data link processor buffer. The host system will determine which is to be done.

Result Descriptors: At the completion of each operation, the Card Reader-Data Link Processor formulates and transmits a result descriptor (R/D) to the main host system 10 describing the results of the operation. The following (Table XII) result descriptor bits are generated by the CR-DLP:

TABLE XII

| Bit Position | Description |
|---|---|
| A8 | Device not ready |
| A4 | Descriptor error |
| A2 | MLI vertical parity error |
| A1 | MLI longitudinal parity error |
| B8 | Validity check |
| B4 | Control character |
| B2 | Read check |
| B1 | Not used, is equal to zero |
| C8 | RAM parity error |
| C4 | Conditional cancel complete |
| C2 | Incomplete card read |

Note:
All other bits are reserved and are equal to zero.

The following items will indicate each of the above result descriptor bits with a brief explanation of their significance.

Device Not Ready (A8): For read card(s) and the test wait EOF operations, the CR-DLP reports "not ready" if the card reader is not ready, before reading any cards. If any cards are read, the CR-DLP reports "ready" unless the CR-DLP has stopped reading cards due to the ready line going "not ready" at the completion of a card. If a card reader goes "not ready" while the CR-DLP is reading a card, the data link processor reports "not ready" and any other descriptor information on the partially read card. In all other cases, the Card Reader-Data Link Processor reports the status of the card reader as designated by the ready line.

Descriptor Error (A4): An OP code or a descriptor link is not valid at this time, or it has had bad vertical or longitudinal parity.

Vertical Parity (A2): An even parity condition has been detected on the host system interface.

Longitudinal Parity (A1): The longitudinal parity word from the host system did not compare with the one generated by the data link processor.

Validity Check (B8): A card code, which is invalid for the specified translation, was detected other than in column 1. This bit is not set in the binary mode.

Control Character (B4): An invalid character in column 1 was detected in a non-binary card read, an echo, or a "read DLP buffer" in the situation where a translation was required.

Read Check (B2): The card reader indicated that the card was improperly read.

Bit (B1): This is not used and is equal to zero.

RAM Parity Error (C8): An even parity condition was detected on the output of the DLP RAM buffer (22, FIGS. 4A, 5, 6).

Conditional Cancel Complete (C4): A conditional cancel operation, which was issued by the host system, was accepted and thereby cancelled one of the following operations: test wait ready, test wait not ready, or test ignore data to EOF.

Global Priority Designation: As previously discussed in regard to I/O systems using data link processors, a global priority number signal is given to data link processors in the system to determine priority of access to the main host computer system. In the data link processor system usage, various global priority designations have been established for different types of card reader units. These priority designations are shown in the following Table XIII.

TABLE XIII

| | CR-DLP Global Priority Recommendations | |
|---|---|---|
| Unit | Transfer Rate | Global Priority |
| 300 cards/min | 6.4K bits/sec | 1 |
| 600 cards/min | 12.8K bits/sec | 2 |
| 800 cards/min | 17K bits/sec | 2 |

Off-Line Host System Interface Simulation: When in the off-line mode, the host system interface is simulated. This simulation is accomplished by providing alternate sources for lines such as the STIOL, TERM (Table IA, CFE Glossary) and the data lines. STIOL and TERM can be set and cleared, simulating their host system counterparts. The data lines can also be set when the data link processor is in the "receive" mode.

Local Peripheral Simulation: When in the "local" mode and the line GPRIF is enabled, the PRIF lines (FIG. 6) from the maintenance card $20_{0m}$ are treated exactly as if they were the card reader interface of 101, FIG. 1 (except that the card reader data lines are taken from the SIMRCV-enabled DSIM lines).

Physical Embodiment: The Card Reader-Data Link Processor consists of two 96-chip multi-layered printed circuit cards which plug into adjacent slots in the data link processor Base Module backplane (FIG. 3). The boards are referred to as the Common Front End (CFE) card and the Peripheral-Dependent Board (PDB). As seen in FIG. 3, these two boards are connected together by three 50-pin foreplane connectors. Table IV shows the connectors by number and also the signal names associated with each pin.

Common Front End Card (CFE): FIG. 4A shows a basic block diagram of the Common Front End Card (CFE). The heart of the CFE is the PROM controller and storage section 13. The PROM storage consists of 13 separate PROM chips giving a total storage capacity of 1,024 52-bit words. OP parity is included. The CFE $10_c$ also contains the receivers for the data link processor interfaces with the Distribution ($20_{0d}$) and Maintenance ($20_{0m}$) cards. The "enable" signals for these buses are driven by the peripheral dependent board PDB 80. The data link processor RAM storage buffer 22, which has a capacity of 1,024 17-bit words (including OP parity), is also located on the CFE $10_c$. The RAM storage unit 22, however, is controlled entirely by signals from the peripheral board PDB 80. The glossary Table IA contains a listing of the CFE terms as they appear in the drawings. Glossary Table IA gives a list of the CFE schematic term names for all non-PROM generated terms. Table IB lists the terms, and definition thereof, which are used in the PDB 80 for the Card Reader.

Figure 6B:
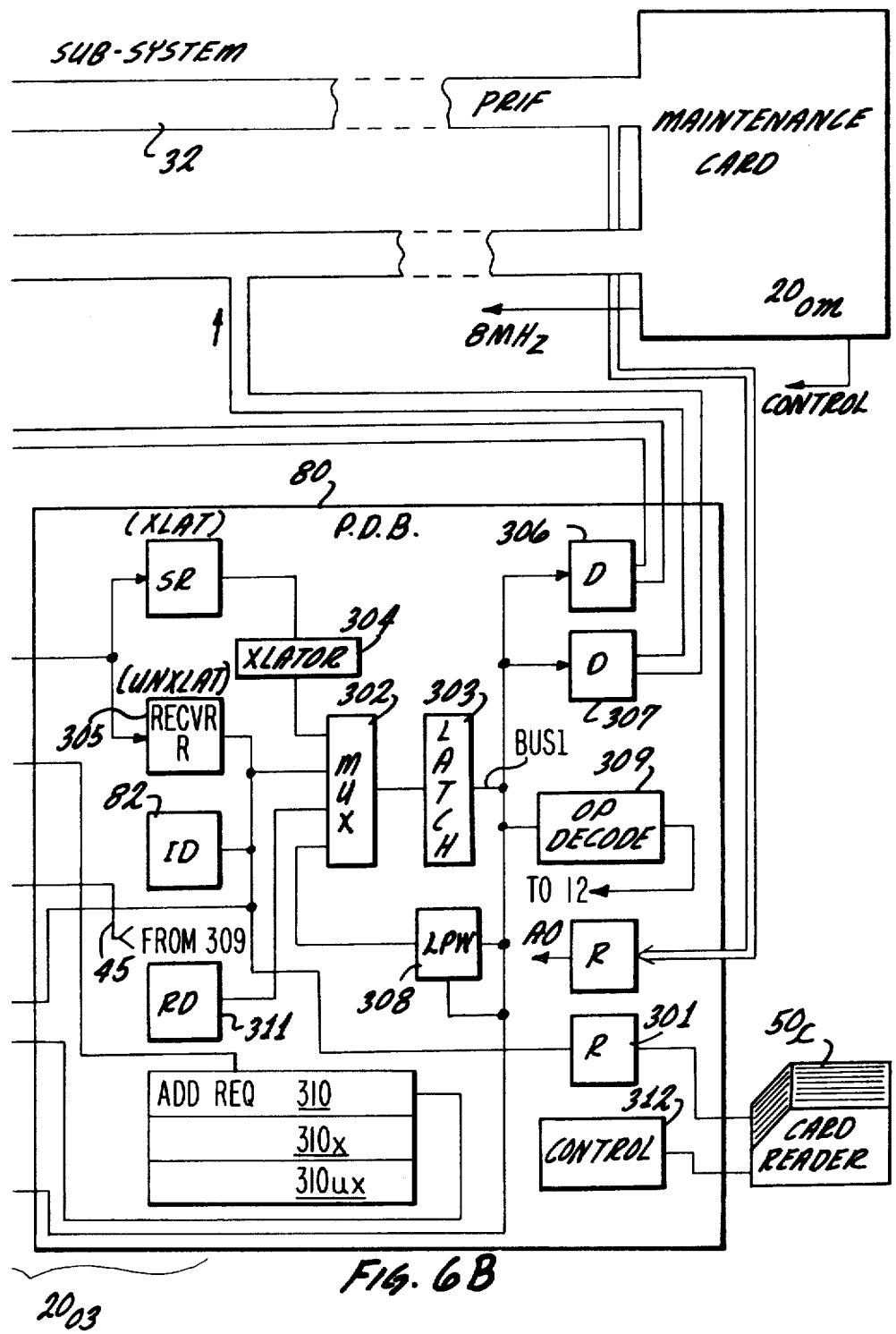

FIG. 6 is a block diagram of the I/O subsystem which connects the main host computer to the card reader 50C.

As seen in FIG. 6, the main host system 10 is connected through a message level interface bus $15_i$ over to the Distribution Card $20_{0d}$. The Maintenance Card $20_{0m}$ has bus connections such as bus 32, over to the Distribution Card. The Distribution Card $20_{0d}$ has buses such as the data and control bus 32 and the data simulate and display bus which connect to the Common Front End Card 10$_c$ and the Peripheral Dependent Board PDB 80. The Common Front End Card 10$_c$ and the Peripheral Dependent Board 80 together constitute the substance of the Data Link Processor 20$_{O3}$. The Peripheral Dependent Board 80 will be seen to have a control circuit connection 312 for initiation and cessation of operation of the card reader peripheral unit while the card reader unit will have an output line over to receiver 301 for data being transferred out from the card reader 50C.

The elements of the operation of the Common Front End 10$_c$ have been previously described in connection with FIGS. 4A through 4E. The elements of and the operation of the Peripheral Dependent Board 80 for the Card Reader-Data Link Processor are subsequently described herein below.

DESCRIPTION OF PERIPHERAL DEPENDENT BOARD

Figure 5B:
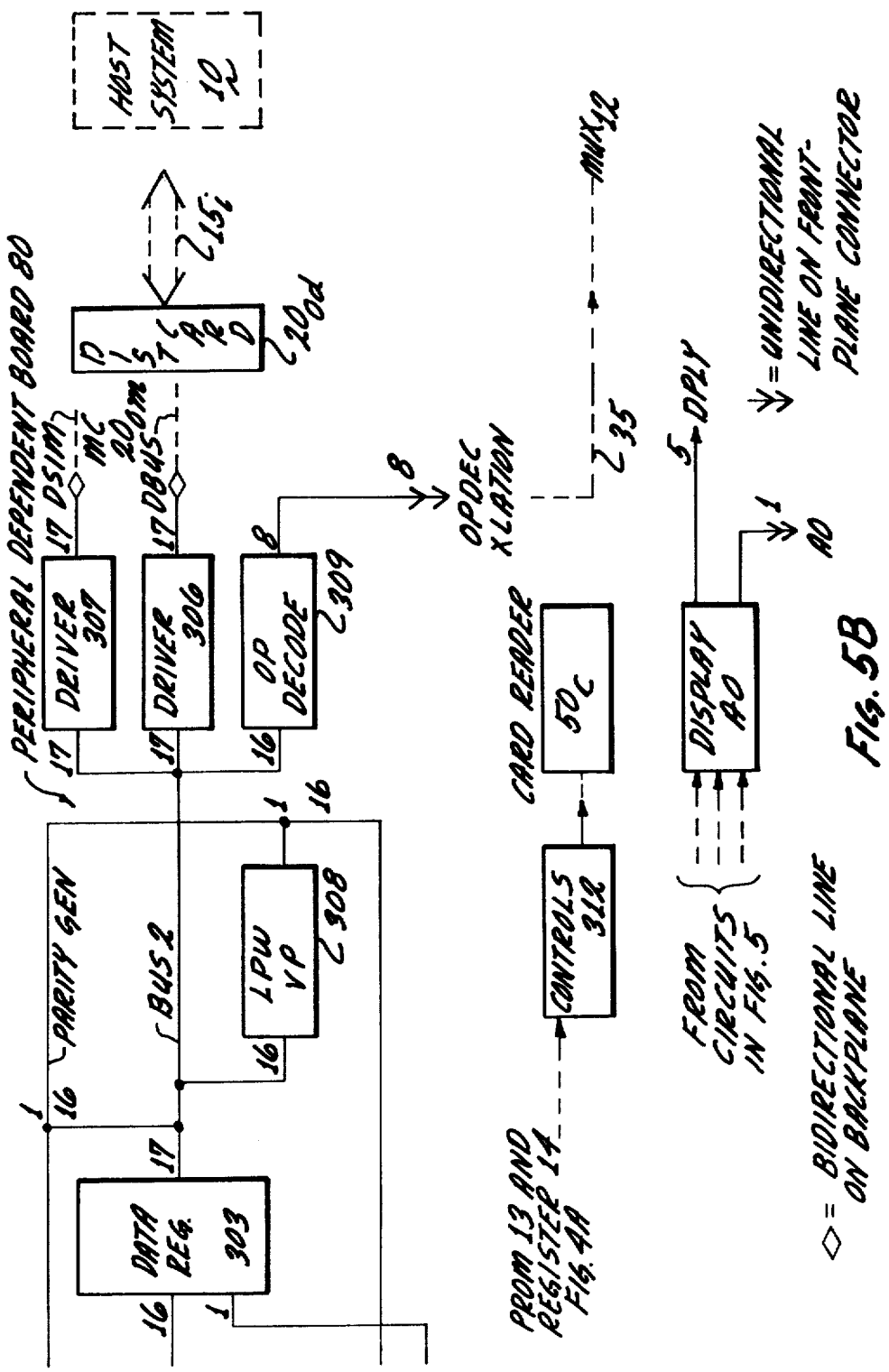

The peripheral dependent board 80, in its preferred embodiment, and its relationship to certain elements of the Common Front End Card 10$_c$ is shown in FIG. 5. Thus, FIG. 5 basically shows the logical block diagram for the Card Reader-Data Link Processor in regard to the peripheral dependent board (PDB 80). The elements which are shown inside the dashed lines are physically contained on the Common Front End (CFE) Card 10$_c$. The numbers above the various lines denote how many actual schematic lines make up the bus shown as a line on the diagram. This block diagram shows the data path only. The control signals and micro-code are indicated in other diagrams and tables. It should be noted that a single-headed arrow denotes a backplane connection, while a double arrow denotes a foreplane connection; and a diamond denotes a bi-directional line and a backplane connection.

The channel of data flow starts when the card reader peripheral device 50C presents data on the 12 card reader data lines (one line for each row of card information). The tri-state receiver 301 is enabled and the information is placed on BUS 1. The data multiplexer 302 selects the BUS 1 inputs and passes the data onto the data register 303. The data register 303 places the data on the line BUS 2. When data is presented on the BUS 2 lines, the parity generator (PARITY GEN) is activated and correct parity is added before information is stored in the RAM 22.

After proper parity has been added, the information is stored at RAM addresses 127–206, FIG. 4F, (decimal). These addresses are commonly referred to as the "upper" RAM. At this point, no translation has taken place. However, necessary translation can now be done if required by the I/O descriptor command from the main host system 10.

The previously stored information is read from the RAM 22 and is placed on the inputs to the translator 304. The translator 304 executes the proper translation according to the I/O descriptor command and places the translated information on the XDAT lines as input information to the data multiplexer 302. The data multiplexer 302 selects the XDAT lines and presents the information to the data register 303. The data register places the information on BUS 2 and again the proper parity is added. The translated information is then stored at RAM 22 at the addresses 1–80 (decimal). This is generally referred to as the "lower" RAM.

The Card Reader-Data Link Processor is now ready to transmit the card information to the main host system 10. The translated information is read from the RAM addresses 1–80 and then loaded onto the BUS 1 via the tri-state receivers 305.

The data multiplexer 302 selects the BUS 1 inputs and passes this information onto the data register 303. The parity bit does not go through the data multiplexer 302; instead it goes directly from BUS 1 to the input of the data register 303 via the line PARITY RECV. The data register 303 then sends the information to the tri-state drivers 306 and 307, via the BUS 2, which in turn transmits it to the DBUS lines. The DBUS lines are on the base backplane and connect to the Distribution Card (20$_{Od}$) which then sends the information via the message level interface 15$_i$ to the main host system 10.

HARDWARE FUNCTIONS: As seen in the block diagram of FIG. 5, various hardware elements perform particular functions in the circuit of the Card Reader-Data Link Processor. The data register 303 is a holding register which is used to latch the output of the data multiplexer and to output information onto the BUS 2. It should be noted that the data register 303 can be loaded from the following sources:

1. XDAT--which are the translator 304 output lines.
2. BUS 1. This may involve the RAM 22 output, or the Card Reader data from the Card Reader via Receiver 301, the DBUS, the DSIM (simulated data) from the Maintenance Card 20$_{Om}$, or the ID signal from Receiver 82.
3. Result descriptor (R/D). These would be the result descriptor bits from Receiver 311.
4. LPW which is the longitudinal parity word. Element 308 represents the longitudinal parity word generator and the vertical parity generator.

The data register parity (PARITY RECV) may be loaded from the RAM 22 outputs, from the DBUS, or from the DSIM lines.

The output of the data register 303 is designated as BUS 2 and it can drive the following logic:

1. The DBUS
2. The DSIM
3. The LPW (longitudinal parity word)
4. VP (vertical parity, generated and checked)
5. The OP decoder 309 which stores the OP code and translation introductions.

RAM ADDRESS REGISTERS: There are two RAM address registers, (FIG. 5) 310$_x$ and 310$_{ux}$, designated "X" for translated and designated "UX" for untranslated. UX is used for host system reads and writes of the "untranslated" card data and other random addressing. X is used for the "translated" card data addressing. The OP code is stored in a scratch pad at RAM address 0. The RAM address registers are designated as 310$_x$ and 310$_{ux}$ on FIG. 5.

TRANSLATOR: The translator 304 has a shift register at its input. Twelve bits of card data in binary unpacked format are loaded into this register. Rows 1–7 are encoded by the translate decoder and, along with rows 12–8, are translated four bits at a time for both EBCDIC and for standard translations. For binary packed format, rows 12, 11, 0, and 1 drive the XDAT lines. A single shift-up places rows 2–5 on the XDAT lines. Another single shift-up places rows 6–9 onto the XDAT lines. The XDAT lines can be loaded into any variant of the data register 303. The Card Reader-Data Link Processor is capable of executing the following translations into a 16-bit word (A, B, C, and D):

1. Binary unpacked format
2. Binary packed format
3. EBCDIC or standard translation.

The translated buffer (addresses 1–80, called Lower RAM) contains the following number of 16-bit words for each translation:

Binary unpacked—80 words
Binary packed—60 words
EBCDIC—40 words
Standard—40 words BINARY UNPACKED FORMAT: In the binary unpacked format, the card image information is put lower-justified directly into the bit positions of the DLP 16-bit words. Card rows 9–4 are placed in bit positions D1 through C2, respectively. Refer to Table XIV herein below. Bit positions C4 and C8 are set to zero. Card rows 3–12 are set into bit positions B1-A2, respectively. A4 and A8 are set to zero. This results in one card column (12 bits) being set into one DLP 16-bit word. The DLP word bits A8, A4, C8, and C4 are not used (made into zeros).

TABLE XIV

| CR-DLP Translations-Binary Unpacked Format | |
|---|---|
| Row | Bit |
| 0 | A8 |
| 0 | A4 |
| Row 12 | A2 |
| Row 11 | A1 |
| Row 10 | B8 |
| Row 1 | B4 |
| Row 2 | B2 |
| Row 3 | B1 |
| 0 | C8 |
| 0 | C4 |
| Row 4 | C2 |
| Row 5 | C1 |
| Row 6 | D8 |
| Row 7 | D4 |
| Row 8 | D2 |
| Row 9 | D1 |

BINARY PACKED FORMAT: This translation packs the information from the card reader (12 bits) into a 16-bit DLP word. Unlike the unpacked format, no zeros are loaded into a 16-bit word. All information in the DLP word is card information. Four card columns become three-16-bit words as can be seen in Table XV herein below. Thus, 4×12 is equal to 48 bits and 16×3 equals 48 bits also.

TABLE XV

| CR-DLP Translation-Binary Packed Format | | | |
|---|---|---|---|
| Card | | Data | |
| 1X | 2X | 3X | 4X |
| 1Y | 2Y | 3Y | 4Y |
| 1Z | 2Z | 3Z | 4Z |

| Theses columns are packed into 16-bit words as follows: | | | |
|---|---|---|---|
| Translated Data | | | Variant |
| 1X | 2Y | 3Z | A |
| 1Y | 2Z | 4X | B |
| 1Z | 3X | 4Y | C |
| 2X | 3Y | 4Z | D |

NOTES
X = Rows 12, 11, 10, and 1.
Y = Rows 2, 3, 4, and 5.
Z = Rows 6, 7, 8, and 9.
Arabic numerals refer to card column numbers.
Four card columns are packed into three 16-bit DLP words and there are no wasted bit positions as in the unpacked format.

EBCDIC OR STANDARD TRANSLATIONS: These types of translations take a card column and make a straight translation into the 8-bit code. A 16-bit word, therefore, contains two columns of information.

LPW AND VP CHECKER/GENERATOR: The longitudinal parity word (LPW) and the vertical parity (VP) elements will check and generate both types of parity. When the logic term CHECK is low, the LPW is generated and stored in the LPW register 308. When the term CHECK is "high", the LPW register 308 is tested for all zeros (LPWOK), and BUS 2 is tested for invalid characters, and the variants C and D are tested for all zeros in order to aid in decoding an operation in the data register 303.

OP DECODER: The OP decoder 309 uses the data supplied from the LPW register 308, and also VP (VARC equal to 0/ and VARD equal to 0/ ), and the variants A and B from BUS 2 in order to encode four bits (OPDEC 8, 4, 2, and 1) into the correct operation. The OP decoder 309 encodes the echo EBCDIC and the echo standard, for example, differentially, and the micro-code sends both to an echo subroutine. The read cards and clear hopper are also encoded by translation but use the same micro-code. The four translations (EBCDIC, Standard, Binary Unpacked, and Binary Packed) are decoded by the OPDECn bits, the variant C, and the logic term FLAG. The four translation bits are micro-code inputs and separate the read card(s), echo, and the clear hopper operations by translation only when needed. The four translation bits also control the RAM address ending conditions. The logic term FLAG is a general purpose flag settable and readable by the micro-code. FLAG is used to determine different paths within the same firmware routines.

RAM CONTROL: The RAM address ending conditions are XEND and BFND. The term XEND is a micro-code term which means that the translation is complete if the untranslated data came from the reader (as in a "read card(s)" operation) or from untranslated RAM in a "read DLP buffer" operation with translation specified. The term BFND is ANDed with a timing and disable signal in order to become the term BUFFEND. The term BUFFEND (buffer end) clears the STOPB flip-flop on the Common Front End Card $10_c$.

BURST MODE CONTROLS: The burst mode controls multiplex the micro-code output bit controls with signals that are generated from the host system strobes (AF). This allows the micro-code to set the term BURST and wait for BURST to end while AF writes or reads the translated buffer to or from the host system 10. Eight signals are multiplexed in this way: four signals load the data register 303 (LEN1, 2, 3 and 4); the signal ENADR enables the RAM address so that the command INCUX can increment the RAM address; the term VPER/ sets the vertical parity result descriptor bit; and the term (write enable) WE/ writes information from BUS 2 into the RAM 22. The LEN commands are for loading data into the data register 303 while the INCUX is for incrementing the untranslated RAM address register $310_{ux}$. The term ENADR is for enabling addresses to both RAM address registers $310_x$ and $310_{ux}$. It (ENADR) may be micro-code driven or controlled by the term BRSTNXLL (a delayed STOPB) during the BURST mode. RAM USAGE: The Card Reader-Data Link Processor uses 256 RAM addresses for storage of data (both untranslated and translated), for storage of I/O descriptors, and various other information needed for operation. Each address contains 17 bits of storage. The following Table XVI shows the usage of the various decimal RAM addresses. Refer also to FIG. 4F.

TABLE XVI
CR-DLP RAM Addresses

| RAM Address | Description |
|---|---|
| 0 | Scratchpad. Used to store the present OP code and to obtain the vertical parity on a word before sending it to the host system. |
| 1–80 | These addresses are commonly referred to as "lower" RAM. The translated data is stored in this area. The last translated card is stored in RAM and may be retrieved by a read DLP buffer operation with no translation specified. |
| 127–206 | These addresses are commonly referred to as "upper" RAM. The untranslated data is stored in this area. The last untranslated card image is stored in RAM. A card may be retranslated by using the read DLP buffer operation and specifying the translation. |
| 250 | The ID word is stored at this address when any clear function takes place. |
| 251 | Last translation operation. The last operation requiring a translation is stored at this address. This operation contains the type of translation used to obtain the card presently translated and stored in RAM addresses 1 thru 80. |
| 252 | Present operation. The operation presently in progress or the last operation sent by the host system. When the CR-DLP receives the operation, it is immediately stored in this address. The exception is a conditional cancel OP code. |
| 253–255 | Descriptor links. The descriptor links for the operation presently in progress or the last operation sent by the host system. When the CR-DLP receives the OP code and descriptor links, the descriptor link are immediately stored in these addresses. The exception is the conditional cancel OP code. |

Card image information is received via Receiver 301, FIG. 5, and placed on BUS 1. The Data Multiplexer 302 sends it to the Data Register chips 303, which then place it on BUS 2. The RAM 22 is addressed sequentially from addresses 127 to 206 to store the "untranslated" card image. This, thus, also permits retrieval of this information by the host system 10 in case of a malfunction.

This information is then (when requested by command from the host computer) sent through the translator 304, then back through the Data Multiplexer 302 and Data Register 303 to be stored, then in RAM 22 at addresses 1 through 80. This also insures that translated information is also available for a retry, if necessary.

FLAG BITS: The FLAG bit is a multipurpose bit used as a logical bit by the hardware and the micro-code. This description makes several references to micro-code subroutines. The various usages of the FLAG bits are as follows:

1. When loading an operation into the OP decoder 309, the FLAG is set low. If the operation is an ECHO, the translation bit specifies the length of the buffer and is set to be binary unpacked (80 words). The Card Reader-Data Link Processor receives 80 words from the host system 10 (determined by BFND which sets STOPB) and stores them. The OP decoder is reloaded with FLAG high in order to obtain the correct buffer end (BFND) for sending data to host 10 in the echo operation; that is, when the CR-DLP sends 80, 60, or 40 characters back to the host computer 10, the FLAG bit is set so that BFND occurs after 80 or 60 or 40 characters have been sent, depending on what particular translation was requested by the host 10.
2. During the WRITE subroutine for an echo, the FLAG is set high if the host system terminates the operation.
3. During the READ subroutine, the FLAG is set high if the host system terminates the operation.
4. During the CHECKS subroutine, the FLAG is set high if any one of the following conditions are met:
   (a) Control card
   (b) Not ready
   (c) Read check
   (d) Invalid character
   (e) RAM parity error.
   It should be noted that this subroutine is used for all "read card(s)" and for the "test-wait" for EOF (End of File) operations.
5. For a "read DLP buffer operation" with no translation specified, the Card Reader-Data Link Processor finds out the buffer length by reading the last translation operation from the RAM 22 (address 251) and storing this in the OP decoder 309. FLAG must be high at this time because the last translation operation has been an echo.
6. During the PRIFXLATE (translate from maintenance card) subroutine, the FLAG is high if a test-wait for EOF operation is in progress and "low" if a read card operation is in progress.
7. During the "read card" and the "test-wait" for EOF operation, the Card Reader-Data Link Processor receives a new column from the reader during the column strobe pulse (CSP) time. A new column is represented by the FLAG and the CSP pulse both being "high".
8. Subroutines designated SYSWATR and SYSWARD wait for a host system strobe or a new column pulse from the card reader. This can only occur during a test-wait for EOF and a conditional cancel. If a new column is specified by the reader (FLAG*CSP) while in these subroutines, the FLAG is set high. After the translation is complete, control is returned to SYSWATR if the ISOF/*FLAG is low; also control is returned to SYSWARD if the ISOF*FLAG is low; also control is returned to the main micro-code program if just FLAG is low.
9. When returning a result descriptor (R/D) to the host system, the "not ready" (RDA8) bit is set to 0 if the FLAG is set.

STATUS STATES FOR THE CARD READER-DATA LINK PROCESSOR: The Card Reader-Data Link Processor sends status information to the host system 10 in order to advise the host of its progress and/or its requirements. Each state denotes a different type of operation so that the host system can anticipate what is required. The status signal sent to the host system does not affect the logic of the data link processor and is not used internally by the unit. The status signals reflect only what the data link processor is doing.

Table XVII describes each of the status state conditions used in the Card Reader-Data Link Processor and which are used to inform the host system as to what operations are occurring in the data link processor.

The actual status state signals which are used in the Card Reader-Data Link Processor are shown in the following Table XVII. The left column shows the operation that is being executed while the middle column shows the status state signal or count number. These count numbers follow a standard pattern from 0-15. The final or rightmost column of Table XVII explains the operation for that particular status count.

TABLE XVII

| Status Mnemonic | Status State Count | Usage or Meaning |
|---|---|---|
| | Status State Descriptions | |
| Cleared | STC = 0 | Entered by the DLP when it is cleared. This status is also shown if the DLP is not present, it has a PROM parity error, or it has been taken off-line by the Maintenance Card. |
| Disconnect | STC = 1 | Used by the DLP to indicate that no more transfers are possible during the connection or to indicate that the DLP is unable to accept a new I/O descriptor. |
| Reserved | STC = 2 | Reserved for expansion. Detection of this status is an error. |
| Idle | STC = 3 | Indicates that the DLP can accept a new I/O descriptor or that the DLP receiving this new descriptor requires additional descriptor information. |
| Read | STC = 4 | Indicates that data is being tranferred to the host by the DLP. |
| Send Descriptor Link | STC = 5 | Indicates that the descriptor link is to be sent, or is being sent, to the host. |
| Receive Descriptor Link | STC = 6 | Indicates that the DLP needs to receive, or is receiving the descriptor link. |
| Result Descriptor | STC = 7 | Indicates that the result descriptor is to be sent, or is being sent, to the host system. |
| Write | STC = 8 | Indicates that data is being transferred from the host to the DLP. |
| Encoded Status | STC = 9 | Indicates that the DLP needs to send special status information on the data lines. |
| Port Busy | STC = 10 | The host is waiting on port busy, but the LEM has a request from another DLP. |
| I/O Descriptor LPW | STC = 11 | Indicates that the DLP requires the descriptor LPW. |
| Break | STC = 12 | Indicates the end of a data message and the DLP now wants an LPW. |
| Break Enable | STC = 13 | Indicates the desire by the DLP to transmit another message to the host. The host may accept or refuse this request. |
| Character Transfer | STC = 14 | Used by DLPs which can handle single-character-per-transfer mode to resolve the contents of the final data word. |
| Result Descriptor LPW | STC = 15 | Indicates that the final word of the result descriptor is being sent to the host and will be followed by the appropriate LPW. |

For example, referring to FIG. 7, there is shown the sequence of status states involved in the operation of "Read Card(s)". Likewise, FIG. 8 shows the operation of the "Read Buffer" operation which involves reading out and making use of the data residing (at that time) in the RAM buffer memory 22.

It will be understood that the preferred embodiments described herein are only exemplary and are susceptible of many modifications and variations in construction, arrangement and use without departing from the spirit of the invention as defined by the appended claims.

What is claimed is:

1. In a peripheral controller which interfaces a card reader peripheral mechanism to a host computer wherein said peripheral controller provides logic means to execute commands from said host computer and to return signals as to completion/incompletion of each command operation, said logic means including microcode sequencing means, and address data means, and wherein said card-reader peripheral mechanism reads cards having punched data in 12 rows and 80 columns, a memory buffer-translator circuit means comprising:
   (a) op-decoder means for receiving command and control data from said host computer, said op decoder functioning to select microcode routines from said microcode sequencing means;
   (b) means for receiving card data from said card-reader peripheral mechanism, said card data being stored in a first dedicated portion of a RAM buffer memory;
   (c) a RAM buffer memory for temporary storage of data from said card-reader and/or from said host computer; said buffer memory including:
      (i) a first dedicated portion of memory for storage of raw untranslated data received from said card-reader mechanism and for later transmittal to a translation means;
      (ii) a second dedicated portion of memory for storage of translated data received from a translation means and for later transmittal to said host computer;
      (iii) a third portion of memory for storage of data from said host computer;
   (d) means to receive address data to address selected areas of said RAM buffer memory, said address data provided from said logic means;
   (e) translation means to translate data from said first dedicated portion of said RAM buffer memory into a selected format for placement in said second dedicated portion of said buffer memory.

2. The circuit means of claim 1 wherein said translation means includes:
   (e1) a shift register which simultaneously receives sequences of 12-bits of card-data in sections, each section representing one column of data from a data-card, said shift register providing an output to a translator-decoder;
   (e2) translator-decoder means including 16 output lines which sequentially provide a 16-bit output word having four 4-bit characters designated A, B, C, D, for placement in said second dedicated portion of buffer memory;
   (e3) said shift register and said translator decoder means being controlled by said microcode sequencing means.

3. The circuit means of claim 2 which includes:
   (f) a data multiplexor for receiving data from said translator-decoder means or for receiving data directly from said RAM memory buffer or for receiving data from said host computer, said data multiplexor providing its output to a data latch register;

(g) a data latch register functioning for temporary data storage and to provide output data transfer lines to:
  (i) said RAM buffer memory;
  (ii) said host computer;
  (iii) said op-decoder.

4. The circuit means of claim 1 wherein said op-decoder means includes:
  (a) means to read card-code data which is coded in:
    (i) BCL code; or
    (ii) ICT code; or
    (iii) BULL code.

5. The circuit means of claim 1 wherein said means to address selected areas includes:
  (d1) first address register means for addressing said first dedicated portion of said RAM buffer memory;
  (d2) second address register means for addressing said second dedicated portion of said RAM buffer memory;
  (d3) said first and second address register means receiving address data from said logic means.

6. The circuit means of claim 1 wherein said third portion of said RAM buffer memory includes:
  (c1) a single dedicated memory location for storing the last translated op-code as data which can be accessed by said logic means to establish the number of words to be transferred from said second portion of said buffer memory to said host computer on the next data transfer operation.

7. The circuit means of claim 2 wherein said shift-register and translator-decoder means function to receive 12 bits of columnar data, from said first dedicated portion of said buffer memory, to format said 12-bits of columnar data from said data-card into a 16-bit output word ABCD, for placement into successive address locations in said second dedicated portion of said buffer memory.

8. The circuit means of claim 2 wherein said translation means includes:
  means to format each four columns of 48 bits of received card-data, residing in said first dedicated portion of said buffer memory, into three 16-bit output words.

9. The circuit means of claim 2 wherein said translation means includes:
  means to translate the raw data, residing in said first dedicated portion of said buffer memory, from said card-reader into output words of EBCDIC format where each EBCDIC character consists of 8 bits, and each two EBCDIC characters are used to form a 16-bit word of the ABCD format for storage in successive locations of said second dedicated portion of said buffer memory, whereby said 16-bit words may be later transferred to said host computer.

10. In a peripheral controller which interfaces a card reader peripheral mechanism to a host computer wherein said peripheral controller is organized into a common front end circuit for providing common logic functions suitable for all types of peripheral devices and into a peripheral dependent circuit tailored to control a specific type of peripheral mechanism under instructions provided by said common front end, and wherein a common logic means includes micro-code sequencing control means and address data means which operates to execute I/O commands initiated by said host computer for the reading out of data from a card reader peripheral mechanism which reads data cards having punched data in 12 rows and 80 columns, a memory buffer-translator circuit means comprising:
  (a) OP-decoder means for receiving command and control data from said host computer said OP-decoder functioning to select micro-code routines from said micro-code sequencing means;
  (b) means for receiving card data from said card-reader peripheral mechanism said card data being stored in a first dedicated portion of a RAM buffer memory;
  (c) a RAM buffer memory for temporary storage of data from said card-reader and/or from said host computer;
  said buffer memory including:
    (i) a first dedicated portion of memory for storage of raw untranslated data received from said card reader mechanism and for later transmittal to a translation means;
    (ii) a second dedicated portion of memory for storage of translated data received from a translation means and for later transmittal to said host computer;
    (iii) a third portion of memory for storage of data from said host computer;
  (d) means to receive address data to address selected areas of said RAM buffer memory said address data provided from said common logic means;
  (e) translation means to translate data from said first dedicated portion of said RAM buffer memory into a selected format for placement in said second dedicated portion of said buffer memory.

11. The circuit means of claim 10 wherein said selected formats translatable by said translation means for transfer to said host computer include:
  (a) 16 bit words in binary unpacked format;
  (b) 16 bit words in binary packed format;
  (c) 16 bit words consisting of two 8-bit EBCDIC characters;
  (d) 16 bit words consisting of two 8-bit Standard characters.

* * * * *

UNITED STATES PATENT AND TRADEMARK OFFICE
CERTIFICATE OF CORRECTION

PATENT NO. : 4,377,853
DATED : March 22, 1983
INVENTOR(S) : Ronald J. Dockal

It is certified that error appears in the above-identified patent and that said Letters Patent is hereby corrected as shown below:

```
Col.  9, line 13, change "receovery" to --recovery--.
Col. 11, line 33, change "makes" to --masks--.
Col. 26, line 57, change "sybsystem" to --subsystem--.
Col. 37, line 45, change "predicts" to --predicted--.
Col. 39, line 15, change "address." to --addressed.--.
Col. 52, line 46, change "introductions." to
                  --instructions.--.
Col. 53, line 14, change "words." to --word.--.
Col. 55, line 12, change "addressed" to --addresses--.
```

Signed and Sealed this

Twenty-fourth Day of May 1983

[SEAL]

Attest:

DONALD J. QUIGG

Attesting Officer    Acting Commissioner of Patents and Trademarks